(12) United States Patent
Okamoto et al.

(10) Patent No.: US 6,620,392 B2
(45) Date of Patent: Sep. 16, 2003

(54) CATALYST FOR PURIFYING EXHAUST GAS AND METHOD FOR PURIFYING EXHAUST GAS WITH THE CATALYST

(75) Inventors: Kenji Okamoto, Hiroshima (JP); Akihide Takami, Hiroshima (JP); Hiroshi Yamada, Hiroshima (JP); Seiji Miyoshi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 156 days.

(21) Appl. No.: 09/788,506

(22) Filed: Feb. 21, 2001

(65) Prior Publication Data

US 2001/0022956 A1 Sep. 20, 2001

(30) Foreign Application Priority Data

Feb. 22, 2000 (JP) ........................ 2000-043969
Dec. 28, 2000 (JP) ........................ 2000-402467

(51) Int. Cl.$^7$ .................. B01J 23/04; B01J 23/02; C01B 21/20
(52) U.S. Cl. ................ 423/213.5; 423/213.2; 423/239.1; 423/239.2; 502/304
(58) Field of Search ............... 423/213.2, 213.5, 423/239.1, 239.2, 245.1, 246, 247; 502/304, 328, 349

(56) References Cited

U.S. PATENT DOCUMENTS 5,248,650 A * 9/1993 Sekiba et al. .............. 502/303
5,260,249 A * 11/1993 Shiraishi et al. ........... 502/304
5,958,828 A * 9/1999 Murakami et al. .......... 502/333

FOREIGN PATENT DOCUMENTS

| EP | 126676 A | * 11/1984 | ......... B01D/53/36 |
| EP | 0 532 024 | 3/1993 | |
| EP | 0613714 A2 | * 9/1994 | ......... B01D/53/36 |
| EP | 0669157 A1 | * 8/1995 | ......... B01D/53/94 |
| EP | 0706980 A1 | * 4/1996 | ......... C04B/35/486 |
| EP | 0 716 876 | 6/1996 | |
| EP | 0801972 A1 | * 10/1997 | ......... B01D/53/94 |
| EP | 0 905 354 | 3/1999 | |
| EP | 0 968 763 | 1/2000 | |
| GB | 1425631 | * 2/1976 | ......... C04B/35/80 |
| JP | 05277369 A | * 10/1993 | ......... B01D/23/46 |
| JP | 06296869 A | * 10/1994 | ......... B01D/23/89 |
| JP | 06-315634 A | 11/1994 | |
| JP | 06315634 A | * 11/1994 | ......... B01D/29/36 |
| JP | 101228118 A | * 5/1998 | ......... B01J/23/70 |
| JP | 10216519 A | * 8/1998 | ......... B01J/23/66 |

OTHER PUBLICATIONS

European Search Report, Dated: Jul. 13, 2001.

* cited by examiner

Primary Examiner—Wayne A. Langel
Assistant Examiner—Jonas N. Strickland
(74) Attorney, Agent, or Firm—Nixon Peabody LLP; Donald R. Studebaker

(57) ABSTRACT

The present invention provides a catalyst for purifying an exhaust gas having excellent heat resistance and a small level of deterioration of the purifying ability of the exhaust gas even if the catalyst is exposed to a high temperature atmosphere for a long time. The catalyst for purifying an exhaust gas comprises a catalytic metal for oxidizing HC and CO and reducing $NO_x$ for purification, and a mixed oxide containing Ce, Zr and Sr.

7 Claims, 39 Drawing Sheets

CATALYST FOR PURIFYING EXHAUST GAS AND METHOD FOR PURIFYING EXHAUST GAS WITH THE CATALYST

BACKGROUND OF THE INVENTION

The present invention relates to a catalyst for purifying an exhaust gas and a method for purifying an exhaust gas with the catalyst.

Three way catalysts, which can purify HC (hydrocarbon), CO and $NO_x$ simultaneously in an exhaust gas in the vicinity of the theoretical air-fuel ratio very effectively, are known as a catalyst for purifying an exhaust gas from an engine. Also known is a so-called lean $NO_x$ purifying catalyst, which is as follows. At a lean air-fuel ratio, $NO_x$ contained in the exhaust gas is stored in a $NO_x$ storage material such as Ba, and at the theoretical air-fuel or a rich air-fuel ratio, the stored $NO_x$ is migrated onto a precious metal and is reacted with a reducing gas such as HC, CO and $H_2$ contained in the exhaust gas to reduce $NO_x$ to $N_2$ for purification, and to oxidize and purify the reducing gases at the same time.

Generally, these catalysts contain an oxygen storage material that stores and releases oxygen by changing the oxidation number, and $CeO_2$ or a $CeO_2 \cdot ZrO_2$ mixed oxide is commonly used as the oxygen storage material. In the three way catalysts, these oxides serve to correct a deviation from the theoretical air-fuel ratio by storing or releasing oxygen. In the lean $NO_x$ purifying catalyst, these oxides serve as an oxygen supply source for oxidizing a large amount of NO contained in an exhaust gas to $NO_2$, which can easily be stored in the $NO_x$ storage material.

Japanese Patent Laid-Open Publication NO.6-315634 discloses a catalytic structure for nitrogen-oxygen catalytic reduction comprising a carrier, an inner layer on the carrier and a surface layer on the inner layer, the inner layer comprising a catalytic component expressed by a general formula $A_xB_{1-x}CO_3$, (where A is at least one element selected from the group consisting of La, Y, Ce and the like, B is at least one element selected from the group consisting of Na, K, Sr and the like, and C is at least one element selected from the group consisting of Mn, Co, Zr and the like, and $0 \leq x \leq 1$), the surface layer comprising a catalyst component where an active component comprising an oxide of an element of Group Ib, IIa or IIb of the periodic table is supported by a support such as aluminum oxide, titanium dioxide, and zirconium oxide. In this catalytic structure, hydrocarbon is adsorbed by the surface layer for activation, whereas a nitrogen oxide is adsorbed onto the inner layer for activation, so that the activated hydrocarbon and the activated nitrogen oxide are reacted at the interface therebetween. High activity and selectivity for reduction of the nitrogen oxide are expected from this structure.

However, when a catalyst is exposed to a high temperature atmosphere for a long time, an oxide constituting the oxygen storage material is deteriorated, so that oxygen is not stored or released properly. As a result, the performance of the catalyst for purifying an exhaust gas is deteriorated.

The object of the present invention is to provide a catalyst for purifying an exhaust gas whose performance for purifying an exhaust gas is not significantly deteriorated at exposure to a high temperature atmosphere for a long time and that has excellent heat resistance.

Another object of the present invention is to improve the sulfur poisoning resistance and the regeneration properties from sulfur poisoning.

Furthermore, another object of the present invention is to provide a method for purifying an exhaust gas using such a catalyst.

SUMMARY OF THE INVENTION

The present invention uses a Ce—Zr—Sr mixed oxide containing Ce, Zr and Sr as constituent elements (which may be referred to as a $CeO_2 \cdot ZrO_2 \cdot SrO$ mixed oxide in the following description).

A catalyst for purifying an exhaust gas of the present invention includes a catalytic metal that serves for oxidation of HC and CO in the exhaust gas containing oxygen and reduction of $NO_x$ in the exhaust gas, and a mixed oxide comprising Ce, Zr and Sr.

According to this embodiment, the mixed oxide that acts as an oxygen storage material contains Sr in addition to Ce and Zr, so that the oxygen storage function of the catalyst is not significantly deteriorated even if the catalyst is exposed to a high temperature atmosphere for a long time. Moreover, a catalyst having an excellent heat resistance can be obtained. The reason for this is not clear, but it may be as follows.

An analysis indicates that when a Ce—Zr mixed oxide ($CeO_2 \cdot ZrO_2$ mixed oxide) is heated, $ZrO_2$ is separated. However, in a Ce—Zr—Sr mixed oxide, such separation of $ZrO_2$ hardly occurs, and the Ce—Zr—Sr mixed oxide is highly crystalline. Therefore, even if it is exposed to a high temperature, it hardly is degraded so that the oxygen storage function is not deteriorated. It seems that Sr contributes to this high crystallinity.

An analysis indicates that since the primary particles of the Ce—Zr—Sr mixed oxide have a small particle size, it is difficult that sintering due to heat proceeds. It seems that Sr contributes to the fact that the particles are fine.

An analysis indicates that since the secondary particles of the Ce—Zr—Sr mixed oxide have a large particle size, mesopore is also large which makes it easy that the exhaust gas is diffused to the inside. This advantageously serves for storage and release of oxygen, and therefore high oxygen storage ability can be exerted at a relatively high temperature as well. Furthermore, it seems that the fact that Sr activates oxygen advantageously serves for storage and release of oxygen.

Therefore, the catalyst of the present invention can be provided at an exhaust pipe in which the temperature of the catalyst is constantly or temporarily at 700° C. or more or in a place where the temperature of the catalyst is at 800° C. or more, or at further higher 900° C. or more, such as a site immediate downstream of an exhaust manifold.

Furthermore, when the present invention is used to a ternary catalyst, even if the catalyst is exposed to a high temperature atmosphere for a long time, the mixed oxide effectively can function as the oxygen storage material that corrects a deviation of the air-fuel ratio from the theoretical air-fuel ratio by storage and release of oxygen. Thus, high HC purification performance can be obtained.

When the present invention is used as a lean $NO_x$ purifying catalyst, even if the catalyst is exposed to a high temperature atmosphere for a long time, the mixed oxide effectively can function as the supply source that supplies oxygen having high activity for oxidation of NO. Thus, at a lean air-fuel ratio, NO is oxidized to $NO_2$, which is readily stored by the $NO_x$ storage material, so that high lean $NO_x$ purification performance can be obtained.

$NO_x$ storage materials have a problem of so-called sulfur poisoning that deprives a $NO_x$ storage material of its function as a $NO_x$ storage material, because of its formation of a salt by reacting with a sulfur oxide contained in exhaust gases. However, the Ce—Zr—Sr mixed oxide makes it possible that deterioration of the lean $NO_x$ purification performance due to sulfur poisoning can be suppressed to a small level, and provides a catalyst having excellent sulfur poisoning resistance. The reason for this is not clear, but it seems that the presence of Sr provides fine particles of the $NO_x$ storage materials and the surface area of the $NO_x$ storage materials becomes large, so that the $NO_x$ storage materials are unsusceptible to sulfur poisoning. In addition, the catalyst can be regenerated by raising the temperature of the sulfur-poisoned catalyst, and in the catalyst of this embodiment, the Ce—Zr—Sr mixed oxide has high heat resistance so that very high regeneration performance can be obtained.

The Ce—Zr—Sr mixed oxide is advantageous for sulfur poisoning resistance when the content of Zr becomes large, and the heat resistance thereof is improved when the content of Ce becomes large. However, the content of Sr is too excessive, the heat resistance is deteriorated.

In the Ce—Zr—Sr mixed oxide, the amount of released oxygen is not very large when the air-fuel ratio of the engine is the stoichiometric or rich ratio at a regular temperature of the exhaust gas of around 350° C. Therefore, the period of time during which the air-fuel ratio is kept stoichiometric or rich to release $NO_x$ absorbed in the $NO_x$ storage materials for reduction and purification can be shortened, or the degree of the rich ratio can be reduced.

More specifically, when the amount of released oxygen is large, even if the reduction components (HC, CO, $H_2$, etc.) in the exhaust gas for purification of $NO_x$ is made large by making the air-fuel ratio stoichiometric or rich, the amount of the reduction components consumed by reaction with the released oxygen also becomes large. Therefore, a larger amount of reduction components is required for reduction and purification of $NO_x$. In other words, it is necessary to prolong the period of time during which the air-fuel ratio is kept stoichiometric or rich or to raise the degree of the rich ratio. On the other hand, the Ce—Zr—Sr mixed oxide has a small amount of released oxygen, so that the amount of consumed reduction components is small. Therefore, the period of time during which the air-fuel ratio is kept stoichiometric or rich for reduction and purification of $NO_x$ can be shortened, or the degree of the rich ratio can be reduced. Consequently, the amount of fuel consumption for the stoichiometric or rich air-fuel ratio can be reduced.

A method for producing the Ce—Zr—Sr mixed oxide may be, but not limited to, coprecipitation in which alkali is dropped to a mixed aqueous solution comprising salts of Ce, Zr and Sr dissolved to precipitate a mixed oxide; a solid phase reaction in which a mixture of particles of oxides of Ce, Zr and Sr is melted at a high temperature to produce a mixed oxide; evaporation to dryness in which an aqueous solution containing ions of one or two metals of Ce, Zr and Sr is prepared, oxide powder of the remaining metal of Ce, Zr and Sr is placed in the aqueous solution, the aqueous solution is stirred, and the aqueous solution is dried and calcined to form a mixed oxide; a method for obtaining crystals of a mixed oxide by boiling a mixed solution comprising salts of Ce, Zr and Sr dissolved to remove water; or the like.

When a precious metal is used as the catalytic metal, activated oxygen is supplied from the mixed oxide, and $NO_x$ and HC in the exhaust gas can be activated on the surface of the precious metal. Therefore, an oxidation reaction of NO in the exhaust gas to $NO_2$, and partial oxidation reaction of HC proceeds smoothly. Since $NO_2$ and the partially oxidized HC are highly reactive in terms of energy, reduction of $NO_x$ and oxidation of HC proceed efficiently.

The catalyst of the present invention can contain a $NO_x$ storage material that absorbs $NO_x$ in the exhaust gas in an oxygen-excessive atmosphere in which an oxygen concentration in the exhaust gas is high (lean air-fuel ratio), and releases the absorbed $NO_x$ by reduction of the oxygen concentration (rich air-fuel ratio). Thus, the catalyst can act as a so-called lean $NO_x$ purifying catalyst. In this case, as described above, the mixed oxide effectively can function as a supply source that supplies oxygen for oxidation of NO, even if the catalyst is exposed to a high temperature atmosphere for a long time. Therefore, the present invention provides high lean $NO_x$ purification performance by oxidizing NO to $NO_2$ and absorbing the $NO_2$ in the $NO_x$ storage materials at a lean air-fuel ratio.

A specific embodiment of such a lean $NO_x$ purifying catalyst includes a carrier; an inner catalytic layer disposed on the carrier containing a precious metal, a $NO_x$ storage material and the Ce—Zr—Sr mixed oxide; and an outer catalytic layer disposed on the inner catalytic layer containing a precious metal and zeolite, the inner catalytic layer and the outer catalytic layer being laminated on the carrier in this order.

According to this embodiment, at a lean air-fuel ratio, in the outer catalytic layer, HC that has been stored in zeolite is released and reacted with NO in the exhaust gas for purification of $NO_x$. In the inner catalytic layer, $NO_2$ generated by oxidation of NO in the outer catalytic layer is stored in the $NO_x$ storage materials, and apparently $NO_x$ is purified. $NO_2$ stored in the $NO_x$ storage materials is reacted with activated partially oxidized HC on the precious metals of the outer catalytic layer when the air-fuel ratio is turned to be rich so that $NO_2$ is degraded and purified. These effects of the two layers are combined so that very high lean $NO_x$ purification performance can be exhibited. Therefore, the outer catalytic layer exerts a function as a catalyst for selective reduction $NO_x$ purification, and the inner catalytic layer exerts a function as a catalyst for lean reduction $NO_x$ purification.

As the $NO_x$ storage material, it is preferable to use a combination of Ba, K, Sr, and Mg. Thus, deterioration of the $NO_x$ absorption ability of the $NO_x$ storage material due to sulfur poisoning can be suppressed. Moreover, the heat resistance of the $NO_x$ storage material can be improved. The reason for this is not clear, but it seems as follows.

First, it seems that the elements (K, Sr, Mg) other than Ba are more susceptible to sulfur poisoning than Ba, so that the degree of sulfur poisoning of Ba is made relatively small. More specifically, Ba has higher $NO_x$ absorption ability than those of the other elements, but the presence of the other elements makes the degree of sulfur poisoning of Ba relatively small. Therefore, the degree of decrease of the $NO_x$ absorption ability is small.

According to an analysis, it appears that Ba and Sr (at least a part of each of them) form a compound (a mixed oxide or a double salt) constituted by these two elements. It seems that such a Ba—Sr compound is less susceptible to sulfur poisoning than Ba alone, so that deterioration of the $NO_x$ absorption ability can be suppressed.

According to an analysis, it appears that Ba and Mg (at least a part of each of them) come close to each other or are combined to be nearly amorphous, although it is not crystalline. Such a Ba—Mg coexisting substance suppresses sulfur poisoning of Ba (production of barium sulfate) more than in the case of Ba alone, so that deterioration of the $NO_x$ absorption ability can be suppressed.

According to an analysis, it appears that K is not combined with or not be compatible with Ba, Sr or Mg, and is dispersed around the Ba—Sr compound or the Ba—Mg coexisting substance. It seems that since K is relatively highly reactive with sulfur, K prevents the Ba—Sr compound or the Ba—Mg coexisting substance from being sulfur-poisoned. Furthermore, K facilitates crystallinity of the Ba—Sr double carbonate, and activates the $NO_x$ storage material. Therefore, K contributes to improvement of the heat resistance of the catalyst.

It seems that the quaternary material of Ba—K—Sr—Mg as the $NO_x$ storage material has weakened bonding to $SO_x$ because of an interaction between the four elements, so that even if $SO_x$ binds thereto, it can be detached readily.

When Ba is an only element constituting the $NO_x$ storage material and the amount thereof is increased, only the particle size is increased, and the specific surface area is not significantly increased. However, when Ba is combined with the other elements (K, Sr, Mg) and the amount thereof is increased, the particle size is not significantly increased, and the specific surface area or the active site is increased. Therefore, it seems that the volume of absorbed $NO_x$ and $SO_x$ is increased. Therefore, even if more or less sulfur poisoning occurs, the $NO_x$ absorption ability is not significantly deteriorated.

As described above, the combination of Ba and the other elements (K, Sr, Mg) is advantageous to provide fine particles of the $NO_x$ storage materials. In particular, Sr has a significant function to make Ba and Mg particles fine. Thus, high dispersibility on the support of the $NO_x$ storage materials can be achieved, and heat sintering hardly occurs. In other words, the heat resistance of the catalyst can be high.

When the Ce—Zr—Sr mixed oxide and alumina are used together as the $NO_x$ storage material and the support material of the precious metal, the heat deterioration of the catalyst advantageously can be prevented, because the alumina hardly is sintered or broken even at a high temperature. However, in the case of alumina, when the catalyst has a high temperature, Ba is reacted with the support and this facilitates deterioration. On the other hand, Mg serves to suppress the reaction of the support and Ba and prevents the heat deterioration of the catalyst.

As the alumina, for a ternary catalyst, an addition alumina added with Ba, Zr, La, or the like to suppress reduction of the specific surface area when the catalyst is exposed to high temperatures may be used. However, it is advantageous to use a non-addition alumina that does not contain these additional elements for $NO_x$ purification at a lean ratio. More specifically, at a lean ratio, the precious metal acts as a catalyst for oxidizing NO in the exhaust gas to $NO_2$, and assists the absorption of $NO_x$ by the $NO_x$ storage materials. The alumina serves to assist the catalytic reaction of the precious metal. When an additive as described above is present, the function of the alumina as a cocatalyst is deteriorated, although the heat resistance is improved. Therefore, a non-addition alumina is advantageous for $NO_x$ purification at a lean ratio.

It is preferable to combine alumina and a Ce—Zr—Sr mixed oxide at a mass ratio of 1:1 or more or less 1:1. This is advantageous for both improvement of the heat resistance of the catalyst and improvement of the sulfur poisoning resistance.

As the precious metal, it is preferable to use Pt, which has a high catalytic function for oxidation of NO to $NO_2$ at a lean ratio and reduction of $NO_2$ to $N_2$ at the stoichiometric or rich ratio. It is more preferable to use both Pt and Rh. Rh serves to assist a catalytic reaction of Pt, namely, promotes the ternary reaction described above at the stoichiometric or rich ratio, and promotes a reduction and degradation reaction of $NO_x$ released from the $NO_x$ storage material. When the Rh support amount per L of the carrier is in the range from about 0.1 to 1.0 g, the Rh support amount does not significantly affect the $NO_x$ purification ratio. Therefore, the Rh support amount can be small.

It is preferable that the Pt support amount per L of the carrier is 1 to 15 g. Amounts of less than 1 g do not allow sufficient reduction and purification. Amounts of more than 15 g provide no improvement in the $NO_x$ purification ratio, leading to high cost. The Rh support amount is preferably, for example, about 1/10 to 1/100 of the Pt support amount.

In the catalyst for purifying an exhaust gas, the support amount of Sr as the $NO_x$ storage material per L of the carrier is preferably 8 to 20 g, and the support amount of Mg per L of the carrier is preferably 5 to 15 g, more preferably, 8 to 12 g.

Thus, the effect of Mg on improvement of the heat resistance can be obtained, and at the same time, the effect of Mg and Sr on improvement of the sulfur poisoning resistance can be obtained. The Ba support amount per L of the carrier is 25 to 60 g.

In the catalyst for purifying an exhaust gas, the mass ratio of Ba, Sr and Mg in the catalytic layer is preferably Ba:Sr:Mg=30:(8 to 20):(8 to 12).

This is advantageous for improvement of the heat resistance of the $NO_x$ storage material while suppressing the sulfur poisoning of the $NO_x$ storage material.

In the catalyst for purifying an exhaust gas, the mass ratio of Ba, K, Sr and Mg in the catalytic layer is preferably Ba:K:Sr:Mg=30:(2 to 12):(8 to 20):(8 to 12).

This is advantageous for improvement of the heat resistance of the $NO_x$ storage material while suppressing the sulfur poisoning of the $NO_x$ storage material.

In the catalyst for purifying an exhaust gas, the support amount of K per L of the carrier is preferably 2 to 12 g.

More specifically, promotion of the crystallinity of the Ba—Sr double carbonate by K and the resulting improvement of the heat resistance of the catalyst can be achieved when the K support amount is 2 g/L or more. However, when the K support amount exceeds 12 g/L, the effects are weakened. In this case, the K support amount is more preferably 4 to 10 g/L.

In the catalyst for purifying an exhaust gas, the support amount of K per L of the carrier is preferably 2 to 6 g.

More specifically, since the support amount of K per L of the carrier is 6 g or less in the present invention, deterioration of the oxidation and purification ability of HC due to the precious metal can be suppressed when the oxygen concentration in the exhaust gas decreases after exposed to a high temperature atmosphere (when an atmosphere with reductants ($\lambda \leq 1$) is reached).

Since the support amount of K per L of the carrier is 2 g or more in the present invention, the effect of K on preventing sulfur poisoning of Ba, Mg and Sr can be obtained, and $NO_x$ released from the $NO_x$ storage material can be reacted with HC sufficiently for purification when switching a lean combustion operation to a theoretical air-fuel ratio combustion operation or a rich combustion operation.

When the support amount of K per L of the carrier is 2 g to 6 g, the mass ratio of Ba and K in the catalytic layer is preferably Ba:K=(5 to 15):1.

More specifically, since the mass ratio of the Ba support amount to the K support amount is 5 or more, the $NO_x$ absorption ability never becomes insufficient, which might occur when the Ba support amount is small. Since this mass ratio is 15 or less, the $NO_x$ absorption site of Ba never decreases, which might be caused by sintering during catalyst calcining because the Ba support amount is large. Moreover, there is no occurrence of detachment of Ba as a result of crystallization of Ba on the support.

Therefore, when the oxygen concentration in the exhaust gas is high (during lean combustion operation of the engine), the $NO_x$ absorption properties of Ba are not deteriorated. When the oxygen concentration in the exhaust gas becomes low (during theoretical air-fuel ratio combustion or rich combustion operation of the engine), the $NO_x$ released from Ba can be reacted with HC sufficiently. Thus, such a function can be performed more properly.

In the catalyst for purifying an exhaust gas, "when the oxygen concentration in the exhaust gas is high" refers to, for example, when the oxygen concentration is at least 5%.

In the catalyst for purifying an exhaust gas, the engine can be a gasoline engine for lean burning or a diesel engine.

The catalyst for purifying an exhaust gas that is provided in the passage of exhaust gases from the engine and reduces the $NO_x$ concentration in the exhaust gas containing $NO_x$, sulfur and oxygen can be produced by a method comprising the steps of:

coating a carrier with a Ce—Zr—Sr mixed oxide and alumina as a support; and impregnating the coating layer with a Ba solution, a K solution, a Sr solution, a Mg solution and a solution of a precious metal.

This embodiment provides a catalyst for purifying an exhaust gas comprising a carrier and a catalytic layer on the carrier, the catalytic layer comprising Ba, K, Sr and Mg as $NO_x$ storage materials and a precious metal for reducing $NO_x$ that are supported on a support (Ce—Zr—Sr mixed oxide and alumina). Thus, the heat resistance of the $NO_x$ storage material can be improved while suppressing sulfur poisoning of the $NO_x$ storage materials.

In the method for producing the catalyst for purifying an exhaust gas, all of the Ba solution, the K solution, the Sr solution, and the Mg solution are preferably acetate solutions.

In the method for producing the catalyst for purifying an exhaust gas, it is preferable to form the coating layer in the form of a multiple layer by coating the carrier with the support by two operations, and then impregnating the two layers with the Ba solution, the K solution, the Sr solution, the Mg solution, and the precious metal solution.

More specifically, in forming a thick catalytic layer on a carrier, when the carrier is coated with the support by one operation, the thickness of the support layer tends to be non-uniform because the amount of the support is large. In addition, drying and calcining of the support layer takes a long time. On the other hand, coating by two operations, as described above, is advantageous for achieving a uniform thickness of the support layer, and time for drying and calcining can be shortened. Furthermore, when the support layer is constituted by two layers, and the support layer is impregnated with the $NO_x$ storage materials, the concentration of the $NO_x$ storage materials in the outer support layer is higher than that of the inner support layer. Therefore, $SO_x$ is trapped primarily by the $NO_x$ storage materials of the outer support layer, and this ensures that the inner support layer can be provided with the $NO_x$ storage materials that are sulfur-poisoned only in a small level. This is advantageous for maintaining the $NO_x$ purification performance.

In the method for producing the catalyst for purifying an exhaust gas, it is preferable to mix the Ba solution, the K solution, the Sr solution, the Mg solution and the solution of a precious metal so that the support is impregnated with the solutions simultaneously.

More specifically, when the solution of a precious metal solution and the solution of the $NO_x$ storage materials are separated and the support is impregnated with the solution of a precious metal first, the precious metal is covered by the $NO_x$ storage materials used later for impregnation, and tends to be buried therein. On the other hand, when the support is impregnated with the solution of a precious metal later, the $NO_x$ storage materials, especially Ba, are eluded in the solution of a precious metal so that the dispersibility becomes poor.

On the other hand, simultaneous impregnation allows the precious metal to be arranged close to the $NO_x$ storage materials without the precious metal being buried. In addition, simultaneous impregnation does not lead to poor dispersibility of Ba, so that this is advantageous for $NO_x$ reduction and purification. Furthermore, simultaneous impregnation of four kinds of $NO_x$ storage material solutions efficiently forms the Ba—Sr compound and the Ba—Mg coexisting substance and allows K to be dispersed around them. This is advantageous for suppressing sulfur poisoning of the $NO_x$ storage materials, and for providing fine particles of the $NO_x$ storage materials, in particular, fine particles of Ba and Mg provided by an action of Sr. Thus, the heat resistance of the catalyst becomes high.

In the method for producing the catalyst for purifying an exhaust gas, when the Ba solution, the K solution, the Sr solution, the Mg solution are divided into two groups, one for the earlier impregnation of the support layer and one for the later impregnation, it is preferable to use the K solution in the later impregnation.

More specifically, in the case where the Ba solution, the K solution, the Sr solution, and the Mg solution are used to impregnate the support simultaneously, when the amounts of Ba, K, Sr and Mg to be supported are large, the concentrations of the metals in the impregnation solution become high, and therefore for example Ba, which has a low solubility, remains in the impregnation solution without being dissolved. In this case, in the metal components are non-uniform in impregnation, so that the catalyst performance may be reduced.

On the other hand, if the impregnation solution is heated, the solubility is increased so that all the metal components can be dissolved without increasing the total amount of the impregnation solution. However, the heating process is required. Therefore, it is preferable that the Ba solution, the K solution, the Sr solution, the Mg solution are divided into two groups, one for the earlier impregnation of the support and one for the later impregnation, and the K solution is used in the later impregnation.

In this case, since K is not combined with or not compatible with the other $NO_x$ storage materials, it is not necessary to use the K solution for impregnation at the same time with the other $NO_x$ storage materials. On the contrary, using the K solution in the later impregnation is advantageous In the method for producing the catalyst for purifying an exhaust gas, when the Ba solution, the K solution, the Sr solution, the Mg solution are divided into two groups, one for the earlier impregnation of the support and one for the later impregnation, it is preferable to use the Sr solution in the earlier impregnation.

More specifically, since it seems that Sr serves to make the particles of Ba and Mg fine, the particles of Ba and Mg are made fine by Sr being supported earlier, which is advantageous for enhancing the heat resistance of the catalyst.

Furthermore, an apparatus for purifying an exhaust gas can be constructed as shown in FIG. 1. More specifically, the apparatus includes:

a catalyst 25 for purifying an exhaust gas provided in a passage 22 for an exhaust gas from an engine 1 or the like, comprising a $NO_x$ storage material that absorbs $NO_x$ and a sulfur component in the exhaust gas in an oxygen-excessive atmosphere in which an oxygen concentration in the exhaust gas is high, and releases the absorbed $NO_x$ by reduction of the oxygen concentration;

sulfur-excessive absorption determining means a for determining a excessive absorption state of the sulfur component in the $NO_x$ storage material; and sulfur detaching means b for detaching the sulfur component from the $NO_x$ storage material by raising the temperature of the catalyst 25 and lowering the concentration of oxygen, when the sulfur-excessive absorption determining means a determines that the absorption of the sulfur component is in an excessive state.

wherein the $NO_x$ storage material is constituted by Ba and at least one element selected from the group consisting of K, Sr, Mg and La.

In such an embodiment, the sulfur detaching means b is operated after the sulfur component ($SO_x$) in the exhaust gas has been absorbed in the $NO_x$ storage material excessively. This embodiment makes it easy to regenerate the $NO_x$ storage material almost to the $NO_x$ absorption ability before the sulfur component is absorbed. In other words, the $NO_x$ absorption ability of the $NO_x$ storage materials after regeneration (which means regeneration from sulfur poisoning, which also applies to the following) is higher than that the $NO_x$ storage material comprising Ba alone, or the degree of deterioration of the $NO_x$ absorption ability when exposed to a high temperature is smaller. In other words, the heat resistance is higher. This improvement of the heat resistance is advantageous for regeneration of the $NO_x$ storage materials. The relationship between the improvement of the heat resistance and the regeneration of the $NO_x$ storage materials is as follows.

The sulfur detaching means b detaches the sulfur component from the $NO_x$ storage materials not only by lowering the concentration of oxygen in the exhaust gas, but also by raising the temperature of the catalyst 25. Therefore, for a catalyst comprising $NO_x$ storage materials having a low heat resistance, it is difficult to raise the temperature of the $NO_x$ storage materials to detach the sulfur component, which prevents achievement of the original object of the present invention. On the other hand, as in the present invention, when the heat resistance of the $NO_x$ storage materials is high, the sulfur detaching means b can be effectively used for regeneration of the $NO_x$ absorption ability. In other words, deterioration of the $NO_x$ storage materials due to heat during sulfur detaching treatment can be avoided.

Thus, the $NO_x$ absorption ability after regeneration is higher than that the $NO_x$ storage material comprising Ba alone, or the heat resistance is higher. The reason for this is not clear, but it seems to be as follows.

First, it seems that the elements (K, Sr, Mg or La) other than Ba are more susceptible to sulfur poisoning than Ba, so that the degree of sulfur poisoning of Ba is made relatively small. Therefore, the degree of a decrease of the $NO_x$ absorption ability after sulfur poisoning is small. More specifically, Ba has higher $NO_x$ absorption ability than those of the other elements, but the presence of the other elements makes the degree of sulfur poisoning of Ba relatively small. Therefore, the degree of decrease of the $NO_x$ absorption ability is small.

Furthermore, it seems that the elements (K, Sr, Mg or La) other than Ba are more readily to be regenerated from sulfur poisoning than Ba, so that the $NO_x$ absorption ability after regeneration is higher. In other words, a sulfate in which Ba is combined with $SO_x$ is stable. However, sulfates of the other elements is unstable compared with the sulfate of Ba, and therefore, $SO_x$ can be easily detached in an atmosphere at a high temperature and a low oxygen concentration.

Furthermore, it seems that Ba is combined with the other elements (Sr, Mg or La) except K (forming a mixed oxide or a double salt, or being close or binding to each other to be nearly amorphous), which makes it difficult for sulfur poisoning to occur.

Furthermore, when the $NO_x$ storage material is constituted only by Ba, and the amount thereof is increased, the $NO_x$ absorption ability before sulfur poisoning and after regeneration is not significantly improved. This seems to be because when the amount of Ba exceeds a certain amount, only the particle size is increased, and the specific surface area is not increased. However, when Ba is combined with the other elements (at least one selected from K, Sr, Mg and La), each is present separately because of the difference in the nature between the elements, and the specific surface area or the active site is increased. In addition, sintering due to heat hardly occurs. Furthermore, the interaction between the different elements constituting the $NO_x$ storage materials facilitate the detachment of the sulfur component.

As described above, the combination of Ba and the other elements (at least one selected from K, Sr, Mg and La) is advantageous to provide fine particles of the $NO_x$ storage materials. In particular, Sr has a significant function to make Ba and Mg particles fine. Thus, high dispersibility on the support of the $NO_x$ storage materials can be achieved, and heat sintering hardly occurs. In other words, the heat resistance of the catalyst can be high.

When the support is alumina, Ba is reacted with the support when the catalyst reaches at a high temperature, which is likely to lead to deterioration. However, Mg serves to suppress the reaction between the support and Ba, so that the heat resistance of the catalyst can be high.

When Ba and the other elements (at least one selected from K, Sr, Mg and La) is supported by a carrier having a honeycomb shape or other shapes, the Ba support amount per L of the carrier is preferably about 10 to 50 g, more preferably 20 to 40 g. The support amounts of the other elements are preferably equal to or less than the support amount of Ba.

The exhaust gas with excessive oxygen having a high concentration of oxygen corresponds to an exhaust gas (a concentration of oxygen of about 4 to 20%) when the engine is operated in a lean air-fuel mixture having an air-fuel ratio A/F>16 (in particular, A/F=18 to 50).

It is preferable that the elements constituting the $NO_x$ storage materials include K in addition to Ba. This achieves a high $NO_x$ absorption ability before sulfur poisoning. Furthermore, K is not combined with Ba, but is highly reactive with sulfur, so that K is present around Ba and prevents Ba from sulfur-poisoned, and suppresses deterioration of the $NO_x$ absorption ability due to sulfur poisoning of Ba. Furthermore, it seems that K is more readily to detach the sulfur component than Ba, so that the $NO_x$ absorption ability after regeneration is higher. The mass ratio of Ba and K is preferably, for example, Ba:K=30: (1 to 30).

It is preferable that the elements constituting the $NO_x$ storage materials include at least one selected from Sr, Mg and La, in addition to Ba and K. This is advantageous for a high heat resistance of the $NO_x$ storage materials and prevention of heat deterioration during sulfur detachment treatment.

According to an analysis, it appears that Ba and Sr (at least a part of each of them) form a compound (a mixed oxide or a double salt) constituted by these two elements. It seems that such a Ba—Sr compound is less susceptible to sulfur poisoning than Ba alone, so that deterioration of the $NO_x$ absorption ability can be suppressed.

According to an analysis, it appears that Ba and Mg (at least a part of each of them) come close to each other or are combined to be nearly amorphous, although it is not crystalline. Such a Ba—Mg coexisting substance suppresses sulfur poisoning of Ba more than in the case of Ba alone, so that deterioration of the $NO_x$ absorption ability can be suppressed.

According to an analysis, it appears that K is not combined with or not be compatible with Ba, Sr or Mg, and is dispersed around the Ba—Sr compound or the Ba—Mg coexisting substance. It seems that since K is relatively highly reactive with sulfur, K prevents the Ba—Sr compound or the Ba—Mg coexisting substance from being sulfur-poisoned.

When Ba, K and Mg are used as the elements constituting the $NO_x$ storage materials and are supported by a carrier having a honeycomb or other shapes, the Ba support amount per L of the carrier is preferably 10 to 50 g, the K support amount is preferably 1 g (the upper limit is 15 g, for example), and the Mg support amount is preferably 3 to 17 g. For the Mg support amount, an amount of 5 to 15 g is more preferable, and an amount of 8 to 12 g is even more preferable. These amounts provide high heat resistance and good regeneration properties from sulfur poisoning. The mass ratio of Ba, K and Mg is preferably, for example, Ba:K:Mg=30: (1 to 30):(1 to 30).

When Ba, K and Sr are used as the elements constituting the $NO_x$ storage materials and are supported by a carrier having a honeycomb or other shapes, a preferable Ba support amount and a preferable K support amount per L of the carrier are the same as those in the Ba—K—Mg based catalyst. The Sr support amount is preferably 10 to 20 g. For the Sr support amount, 13 to 17 g are more preferable. These amounts provide high heat resistance and good regeneration properties from sulfur poisoning. The mass ratio of Ba, K and Sr is preferably, for example, Ba:K:Sr=30: (1 to 30):(1 to 30).

It is preferable that the elements constituting the $NO_x$ storage materials include Sr, in addition to Ba. This is advantageous for achievement of a high heat resistance of the $NO_x$ storage materials and prevention of heat deterioration during sulfur detachment treatment.

It is preferable that the elements constituting the $NO_x$ storage materials include at least one selected from Mg and La, in addition to Ba and Sr. This is more advantageous for achievement of a high heat resistance of the $NO_x$ storage materials and prevention of heat deterioration during sulfur detachment treatment.

It is preferable that the elements constituting the $NO_x$ storage materials include Mg, in addition to Ba. This is advantageous for achievement of a high heat resistance of the $NO_x$ storage materials and prevention of heat deterioration during sulfur detachment treatment.

It is preferable that the elements constituting the $NO_x$ storage materials include La, in addition to Ba and Mg. This is more advantageous for achievement of a high heat resistance of the $NO_x$ storage materials and prevention of heat deterioration during sulfur detachment treatment.

Raising the temperature of the catalyst 25 by the sulfur detaching means b can be achieved by raising the temperature of the exhaust gas. For example, a temperature of the exhaust gas of 500 to 1100° C. (preferably 600 to 1100° C.) is preferable for detachment of sulfur from the $NO_x$ storage materials. A heater can be provided in the catalyst 25 and can be heated. Reducing the concentration of oxygen in the exhaust gas by the sulfur detaching means b can be achieved by controlling the air-fuel ratio of the engine. For example, $\lambda$ (oxygen-excessive ratio) of around 1 or not more than 1 achieves a concentration of oxygen in the exhaust gas of 0.5% or less, and further leads to an increase in the amount of the reduction components such as HC, CO, $H_2$ or the like in the exhaust gas. This is advantageous for detachment of the sulfur component from the $NO_x$ storage materials.

When a spark ignition direct injected engine is used as the engine, the sulfur detaching means b is preferably fuel injection control means that operates a fuel injection valve in such a manner that fuel is divided into at least two portions to be injected to the combustion chamber in the cylinder during a period from the start of an air-intake stroke to the end of the compression stroke. This makes it possible to raise the temperature of the catalyst 25 by raising the temperature of the exhaust gas while reducing the concentration of oxygen in the exhaust gas. If such a divisional injection is used, in particular, the concentration of Co in the exhaust gas can be increased, which is more advantageous for detachment of the sulfur component from the $NO_x$ storage materials.

More specifically, it seems that when the $NO_x$ storage material is Ba, $SO_x$ is adsorbed onto the surface of barium particles in the form of a sulfate, and the barium sulfate generates barium carbonate and sulfur dioxide by the following reaction progress by supply of CO.

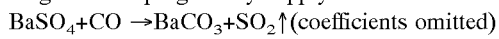
$BaSO_4+CO \rightarrow BaCO_3+SO_2\uparrow$ (coefficients omitted)

Furthermore, when the CO concentration becomes high, a so-called water gas shift reaction proceeds between CO and water in the exhaust gas, thereby generating hydrogen in the reaction site of the catalyst.

$CO+H_2O \rightarrow H_2+CO_2$ Then, the action of hydrogen causes the sulfur component adsorbed onto the $NO_x$ storage material to be detached. This is advantageous for detachment of the sulfur component. Since the water gas shift reaction proceeds even in a relatively low temperature, it is not necessary to raise the temperature of the catalyst 25.

The sulfur excessive absorption determining means that determines the excessive absorption state of the sulfur component to the $NO_x$ storage material operates in the following manner, for example: estimating an amount of absorbed $SO_x$ in the $NO_x$ storage material, based on the travel distance of the automobile and the total amount of fuel consumed during that period, or further in view of the temperature of the catalyst 25 during that period, and determining that the sulfur component reaches the excessive absorption state when the estimated value exceeds a predetermined value.

Therefore, a method for purifying an exhaust gas including $NO_x$ and a sulfur component preferably includes:

allowing a $NO_x$ storage material comprising Ba and at least one selected from the group consisting of K, Sr, Mg and La to absorb the $NO_x$ and the sulfur component by contacting the exhaust gas with the $NO_x$ storage material when the exhaust gas is in an oxygen-excessive state in which an oxygen concentration is high, and raising the temperature of the $NO_x$ storage material and reducing the concentration of oxygen in the exhaust gas when the sulfur component absorption state of the $NO_x$ storage material reaches a predetermined excessive absorption state, thereby detaching the sulfur component from the $NO_x$ storage material.

As seen from the above description, such a method facilitates detachment of the sulfur component from the $NO_x$ storage material to recover the $NO_x$ absorption ability to a high level, when the $NO_x$ absorption ability of the $NO_x$ storage material is deteriorated by sulfur poisoning. Thus, this method is advantageous for purification of $NO_x$.

This and other advantages of the present invention will become apparent to those skilled in the art upon reading and understanding the following detailed description with reference to the accompanying figures.

DETAILED DESCRIPTION OF THE INVENTION

The present invention will be described by way of example with reference to the accompanying drawings.

The Overall Construction of an Engine

Figure 1:
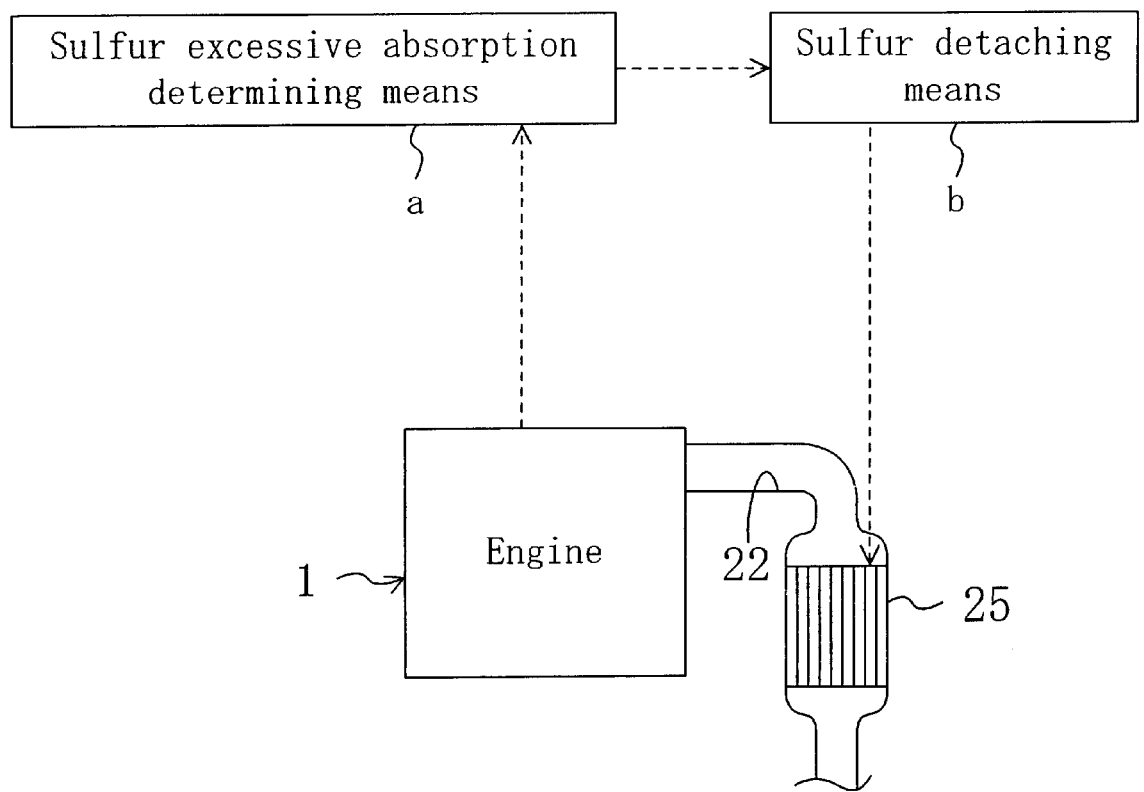
FIG. 1 is a schematic diagram illustrating a structure of an apparatus for purifying an exhaust gas according to the present invention.
Figure 2:
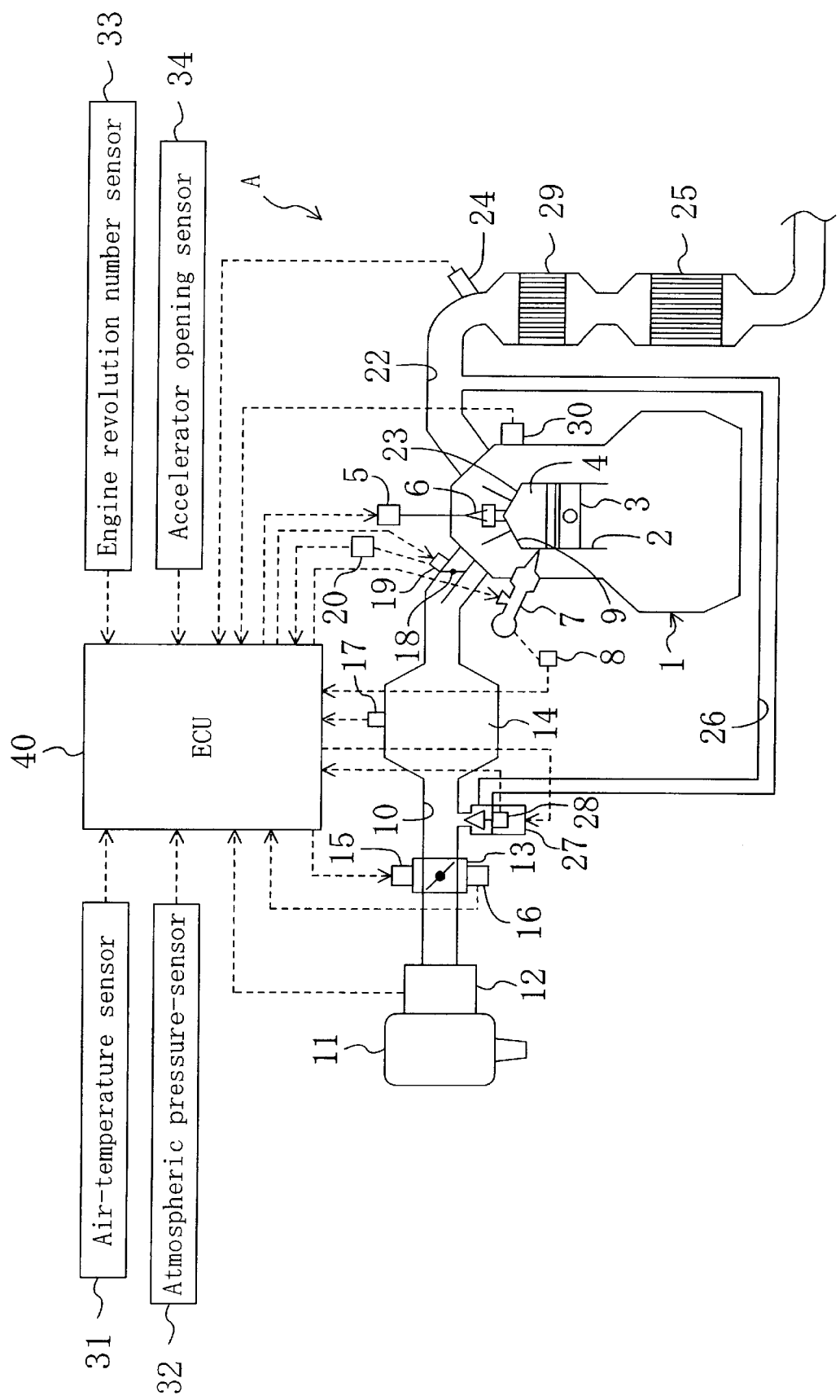
FIG. 2 is a schematic diagram illustrating an apparatus for purifying an exhaust gas of an embodiment of the present invention.

FIG. 2 shows the overall construction of an engine mounted with an apparatus A for purifying an exhaust gas of an embodiment of the present invention. In FIG. 2, a multiple cylinder engine 1 is mounted on, for example, an automobile, and a piston 3 inserted in each cylinder defines a combustion chamber 4 in the cylinder 2. An ignition plug 6 connected to an ignition circuit 5 is provided on the axis center of the cylinder on the upper wall of the combustion chamber 4 in such a manner that the ignition plug 6 faces the combustion chamber 4. An injector (fuel injection valve) 7 that directly injects fuel to the combustion chamber 4 is provided on the rim of the combustion chamber 4.

Although not shown in FIG. 2, a fuel supply circuit including a high pressure fuel pump, a pressure regulator or the like is connected to the injector 7. The fuel supply circuit supplies fuel to the injector 7 while regulating the pressure of the fuel from a fuel tank as appropriate, and includes a fuel pressure sensor 8 for detecting the pressure of the fuel. When fuel is injected by the injector 7 in the late stage of the compression stroke of the cylinder 2, the fuel spray is trapped in a cavity (not shown) provided on the top surface of the piston 3, so that a layer of relatively rich air-fuel mixture is formed in the vicinity of the ignition plug 6. On the other hand, when fuel is injected by the injector 7 in the air-intake stroke of the cylinder 2, the fuel spray is diffused in the combustion chamber 4 and is mixed with drawn air. As a result, a homogenous air-fuel mixture is formed in the combustion chamber.

The combustion chamber 4 is in communication with an air-intake passage 10 via an air-intake port (not shown) that is opened and closed by an air-intake valve 9. The air-intake passage 10 supplies drawn air that has been filtered with an air cleaner 11 to the combustion chamber 4 of the engine 1, and includes a hot-wire airflow sensor 12 for detecting the amount of drawn air, an electric throttle-valve 13 for narrowing the air-intake passage 10, and a surge tank 14 in this order from the upstream to the downstream. The electric throttle valve 13 is not mechanically coupled to an accelerator pedal (not shown), but is opened or closed by being driven by a motor 15. Further, the throttle valve 13 is provided with a throttle opening sensor 16 for detecting the opening of the throttle-valve 13, and the surge tank 14 is provided with an air-pressure sensor 17 for detecting the pressure of the drawn air in the surge tank 14.

The section of the air-intake passage 10 on the downstream side from the surge tank 14 is diverged into independent passages, each of which corresponds to each one of the cylinders 2. The downstream end of each independent passage is further diverged into two passages that are in communication with the air-intake ports. One of the two diverged passages is provided with a swirl control valve 18. The swirl control valve 18 is opened or closed by an actuator 19. When the swirl control valve 18 opens, the air is supplied only from the other diverged passage to the combustion chamber 4, and strong swirl of the drawn air is generated in the combustion chamber 4. On the other hand, as the swirl control valve 4 increasingly opens, the swirl of the drawn air is weakened. Also a swirl control valve opening sensor 20 for detecting the opening of the swirl control valve 18 is provided.

Figure 3:
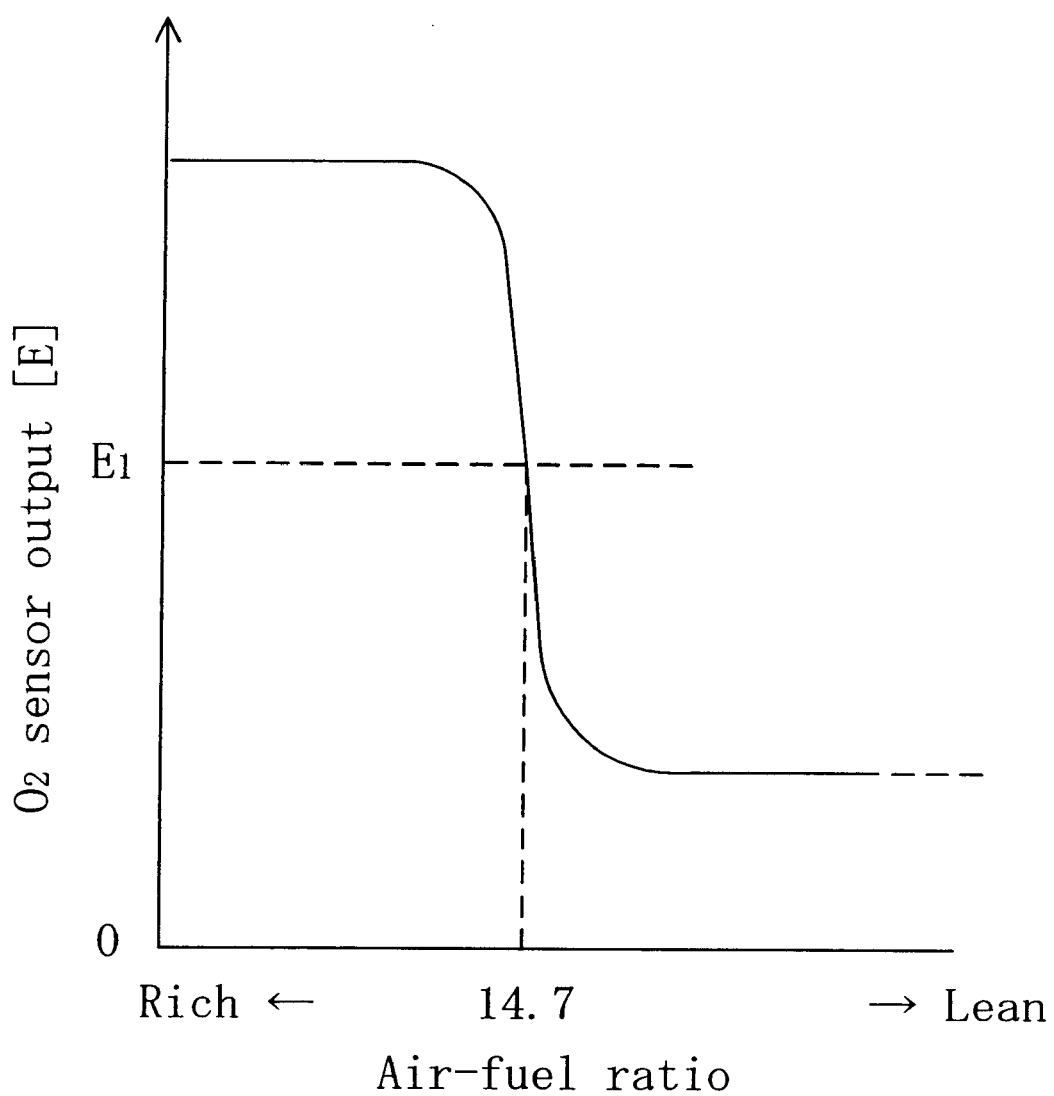
FIG. 3 is a graph showing the output characteristics of $O_2$ sensor against the change in the air-fuel ratio.

In FIG. 2, an emission passage 22 for emitting burned gas from the combustion chamber 4 is diverged at the upstream end into passages, each of which corresponds to each one of the cylinders 2 and is in communication with the combustion chamber 4 via an exhaust gas valve 23 through an exhaust gas port (not shown). The emission passage 22 is provided with an $O_2$ sensor 24 for detecting the concentration of oxygen in an exhaust gas and a catalyst 25 for purifying the exhaust gas. The output (electromotive force) of the $O_2$ sensor 24 is at a reference value E1 when the concentration of oxygen in the exhaust gas is a concentration (about 0.5%) substantially corresponding to the theoretical air-fuel ratio, as shown in FIG. 3. When the concentration is higher than that (on the rich side), the output is increased drastically, whereas the output is decreased drastically when the concentration is lower than that (on the lean side). In other words, the $O_2$ sensor 24 is a so-called random $O_2$ sensor where its output is inversed stepwise at the point of the theoretical air-fuel ratio.

Figure 4:
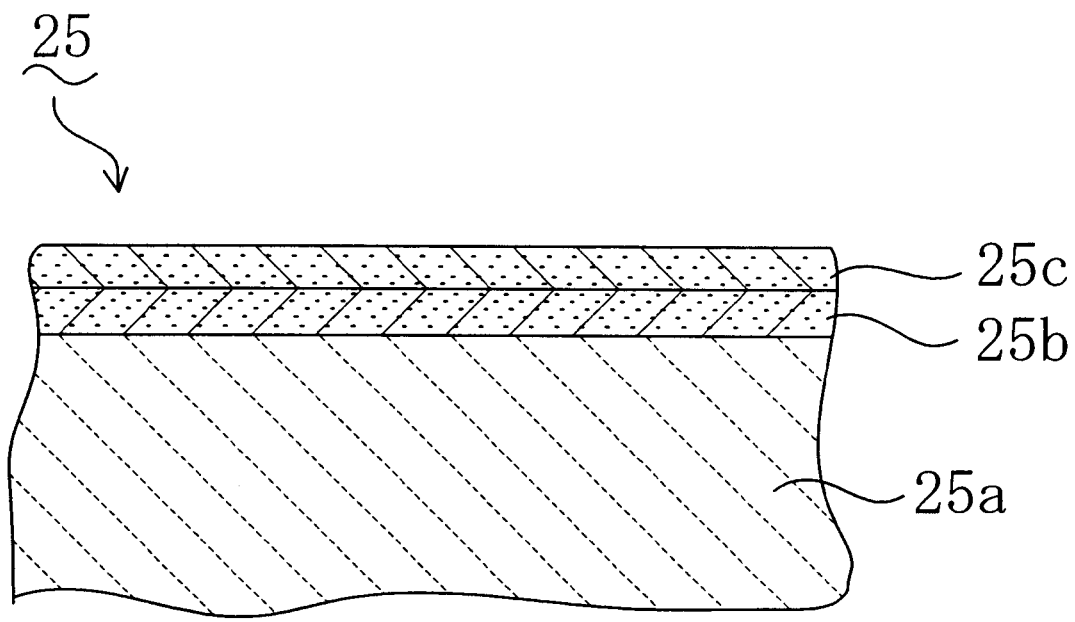
FIG. 4 is a cross-sectional view showing a schematic structure of a catalyst for purifying an exhaust gas according to the present invention.

The catalyst 25 is of $NO_x$ absorption and reduction type, which absorbs $NO_x$ in an atmosphere with excessive oxygen where the concentration of oxygen is high in the exhaust gas, and releases the absorbed $NO_x$ when the concentration of oxygen is decreased for reduction and purification of $NO_x$. As shown in FIG. 4, this lean $NO_x$ catalyst 25 has a carrier 25a made of cordierite of honeycomb construction, and an inner catalytic layer 25b and an outer catalytic layer 25c on the inner catalytic layer 25b are formed on the wall surface of each through-hole of the carrier 25a.

The section of the emission passage 22 on the upstream side from the $O_2$ sensor 24 is connected to the upstream end of an EGR passage 26, and the downstream end of the EGR passage 26 is connected to the air-intake passage 10 between the throttle-valve 13 and the surge tank 14. An electric EGR valve 27 for regulating the opening of the passage is provided in the downstream of the EGR passage 26 so that the recirculation volume (hereinafter, referred to as EGR volume) of the exhaust gas through the EGR passage 26 can be regulated. The EGR passage 26 and the EGR valve 27 constitute exhaust gas recirculation mean. Further, a lift sensor 28 for detecting the lift amount of the EGR valve 27 is also provided.

The ignition circuit 5 of the ignition plug 6, the injector 7, the driving motor 15 of the electric throttle valve 13, the actuator 19 of the swirl control valve 18, the electric EGR valve 27 or the like are operated and controlled by a control unit 40 (hereinafter, referred to as ECU). To the ECU 40, output signals from the airflow sensor 12, the throttle opening sensor 16, the air-pressure sensor 17, the swirl control valve opening sensor 20, the $O_2$ sensor 24 and the lift sensor 28 of the EGR valve 27 are input. In addition, output signals from a water-temperature sensor 30 for detecting the temperature of a coolant (engine water temperature) of the engine 1, an air-temperature sensor 31 for detecting the temperature of the drawn air, an atmospheric pressure-sensor 32 for detecting the atmospheric pressure, an engine revolution number sensor 33 for detecting the number of revolutions of the engine, and an accelerator opening sensor 34 for detecting the opening of the accelerator pedal (the operation amount of the accelerator) are input to the ECU 40.

General Description of Engine Control

Figure 5:
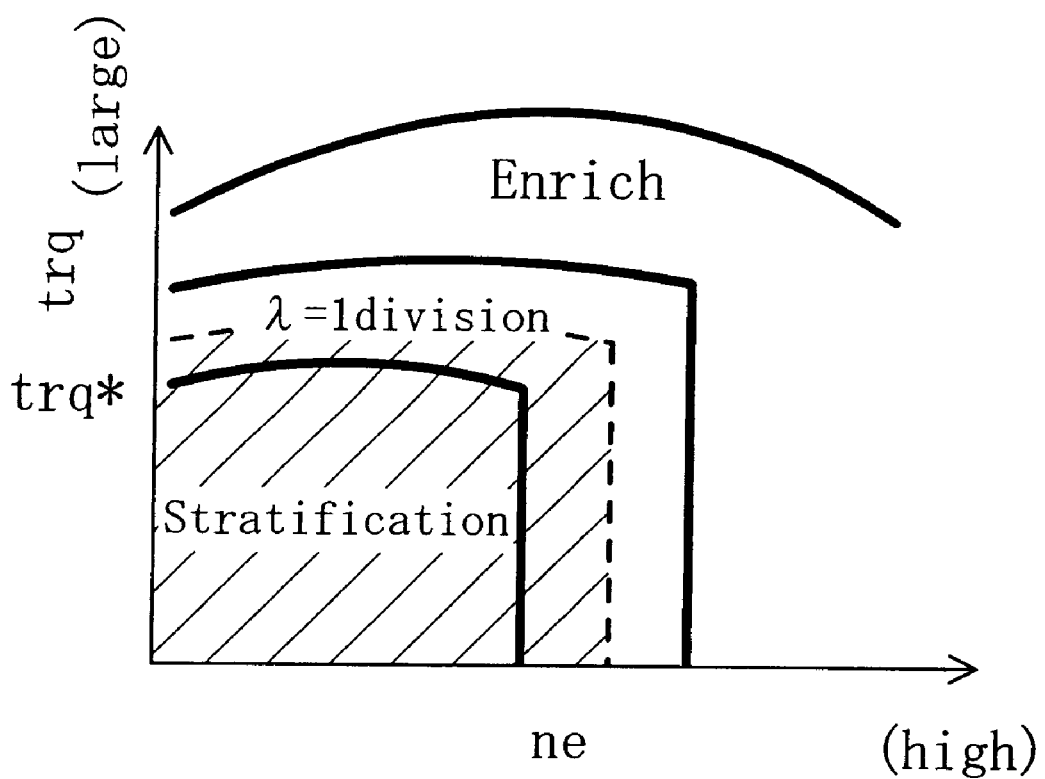
FIG. 5 is a graph showing an example of a map where operational regions of the stratified combustion mode, the λ=one division mode, and the enriched mode of an engine are set.
Figure 6:
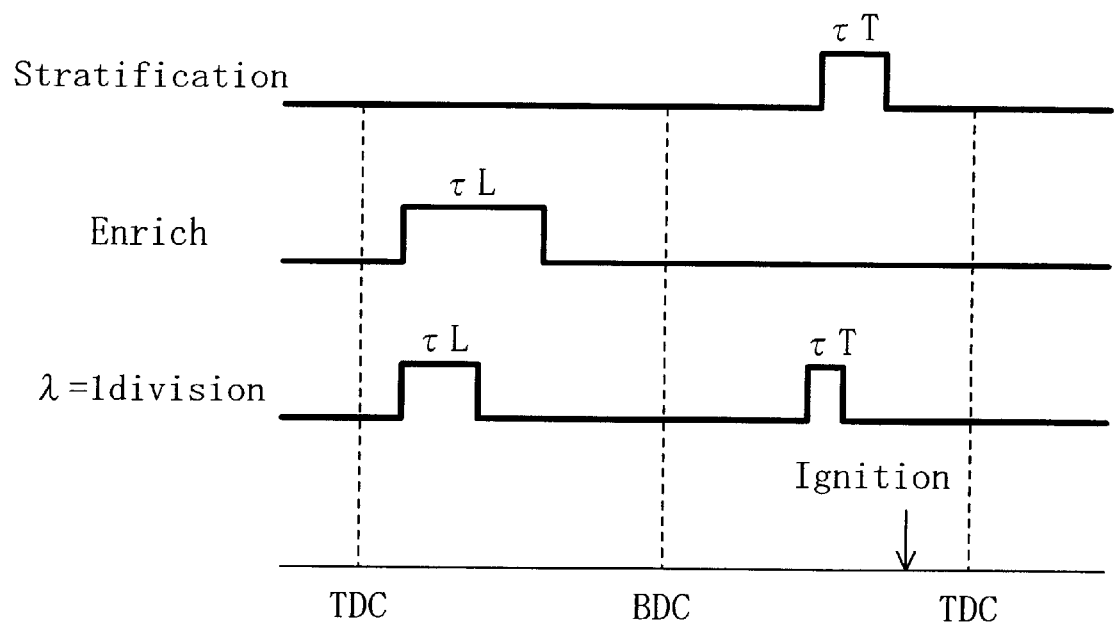
FIG. 6 is a timing chart showing the combustion injection time in each operational region.

In the engine 1 of this embodiment, the form of fuel injection by the injector 7 (fuel injection time, air-fuel ratio or the like) can be switched depending on the operational state of the engine, so that the engine can be operated in different combustion states. In other words, for example, as shown in FIG. 5, when the engine 1 is warm, a predetermined region on the side of low load and a low number of revolutions is designated as a stratified combustion region. In this region, as shown in FIG. 6, fuel is collectively injected in the late stage of the compression stroke by the injector 7. This is a combustion mode in which combustion occurs in a stratified state where air-fuel mixture is present in the vicinity of the ignition plug 6. In this stratified combustion mode, the opening of the throttle valve 13 is large to reduce the pump loss of the engine 1, and thus the average air-fuel ratio in the combustion chamber 4 is significantly lean (e.g., A/F=about 30).

On the other hand, the regions for the other operations are designed to be homogenous combustion regions. In the $\lambda$=1 division region on the low load side, fuel is injected twice by the injector 7, namely once in the air-intake stroke and once in the compression stroke. In addition, in this region, the fuel injection quantity, the opening of the throttle or the like are controlled so that the air-fuel ratio in the combustion chamber 4 corresponds to the approximate theoretical air-fuel ratio (A/F=14.7) (hereinafter, referred to as $\lambda$=1 division mode). In the enriched region on the high load and high number of revolution side in the homogenous combustion region, fuel is collectively injected in the early stage of the air-intake stroke and the air-fuel ratio is richer than the theoretical air-fuel ratio (e.g., A/F=13 to 14) (hereinafter, referred to as an enriched mode).

In the hatched region in the control map in FIG. 5, the EGR valve 27 is opened so that part of the exhaust gas is allowed to flow back to the air-intake passage 10 through the EGR passage 26. Although not shown in FIG. 5, when the engine is cool, all the operation regions of the engine 1 are homogenous combustion regions in order to improve the combustion stability.

More specifically, the ECU 40 determines various control parameters involved in engine outputs, based on the operation state of the engine 1. Examples of the control parameters are the fuel injection quantity and the injection time by the injector 7, the amount of air to be drawn that is adjusted by the throttle valve 13, the intensity of drawn air swirl that is adjusted by the swirl control valve 18, and the EGR amount that is adjusted by the EGR valve 27.

Figure 7A:
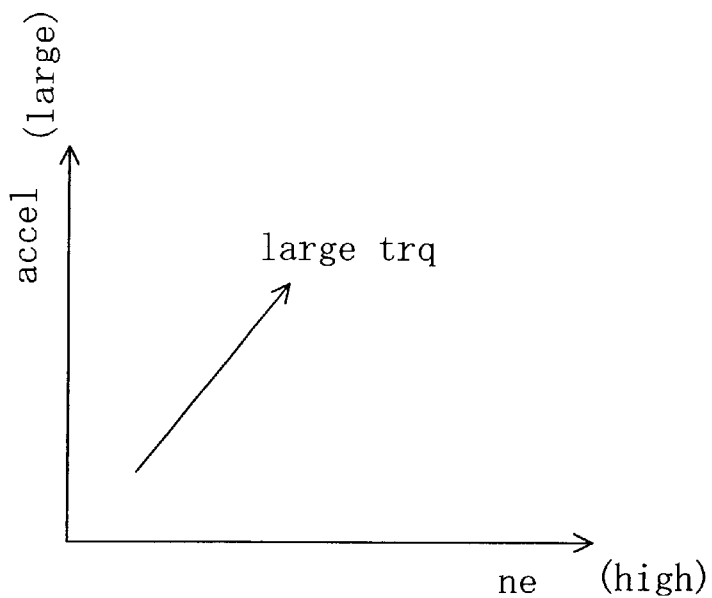
FIG. 7A is a graph showing a map where a desired torque of an engine corresponding to the number of revolutions of the engine and the opening of the accelerator is set.

More specifically, first, the desired torque trq of the engine 1 is calculated based on the opening of the accelerator accel and the number of engine revolutions ne. The desired torque trq is calculated as follows. The relationship between the opening of the accelerator accel and the number of engine revolutions ne that achieves required output performance is previously obtained by bench tests or the like. This relationship is stored in the memory of the ECU 40 as a map, and a value corresponding to the actual opening of the accelerator accel and the actual number of engine revolutions ne is read from this map. The relationship between the opening of the accelerator accel and the number of engine revolutions ne and the desired torque is as shown in FIG. 7A, for example, and the desired torque trq is increased with increasing the opening of the accelerator accel and the number of engine revolutions ne.

Then, an operational mode is set based on the thus obtained desired torque trq and the number of engine revolutions ne. More specifically, for example, when the engine is warm, as shown in FIG. 5, the stratified combustion mode is set when the desired torque trq is lower than a predetermined threshold trq* on the low load side, and the number of engine revolutions ne is small. On the other hand, in the other operation states, the homogenous combustion mode is set. Further, in this case, one of the $\lambda$=1 division mode and the enriched mode is selected based on the desired torque trq and the number of engine revolutions ne.

Then, a desired air-fuel ratio afw is set for each operational mode. More specifically, in the stratified combustion mode and the enriched mode, the desired air-fuel ratio afw is obtained from the previously prepared map, based on the desired torque trq and the number of engine revolutions ne.

Figure 7B:
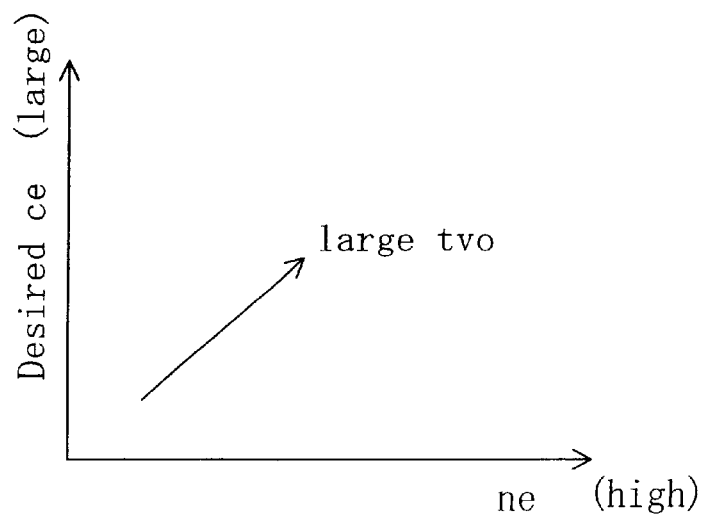
FIG. 7B is a graph showing a map where the opening of a throttle valve corresponding to the number of revolutions of the engine and the desired torque is set.

In the λ=1 division mode, the desired air-fuel ratio afw is set at the theoretical air-fuel ratio. Then, a desired charging efficiency ce is calculated based on the desired air-fuel ratio afw, the number of engine revolutions ne and the desired torque trq. Then, a desired throttle opening tvo is obtained from the previously prepared map (see FIG. 7B) based on the desired charging efficiency ce and the number of engine revolutions ne. The relationship between the number of engine revolutions and the throttle opening is varied depending on whether or not the EGR is provided. The throttle opening tvo is set to be larger when the EGR is provided than when the EGR is not provided.

The actual charging efficiency ce of the engine 1 is calculated based on the output signals from the airflow sensor 12, and a basic fuel injection quantity qbase is calculated based on the actual charging efficiency ce and the desired air-fuel ratio afw.

qbase=KGKF×ce/afw, where KGKF is a coefficient for calculation. At the same time, the division ratio for dividing the fuel between fuel to be injected in the air-intake stroke and fuel to be injected in the compression stroke is set for each mode. In the stratified combustion mode, the ratio for the air-intake stroke is 0%, whereas in the enriched mode, the ratio for the air-intake stroke is 100%. In the λ=1 division mode, the division ratio is set in accordance with the desired air-fuel ratio afw and the number of engine revolutions ne.

Further, the fuel injection time is set for each operational mode. Although not shown, in the stratified combustion mode, the injection time Inj_TT for the compression stroke injection is obtained from the previously prepared map in accordance with the desired torque trq and the number of engine revolutions ne. On the other hand, in the homogenous combustion mode, the injection time Inj_TL for the air-intake stroke injection is obtained from the predetermined table in accordance with the number of engine revolutions ne. In the case of divided injection, the data for the stratified combustion mode is used as the injection time Inj_TT for the compression stroke injection, and the injection time Inj_TL for the air-intake stroke injection is obtained from the previously prepared map in accordance with the desired air-fuel ratio afw and the number of engine revolutions ne.

The ignition time of the engine 1 is set for each operational mode. In the stratified combustion mode, the basic ignition time is obtained based primarily on the desired torque trq and the number of engine revolutions ne. On the other hand, in the λ=1 division mode and the enriched mode, the basic ignition time is obtained based on the charging efficiency ce and the number of engine revolutions ne. This basic ignition time is corrected based on the engine water temperature. Furthermore, the swirl control valve 18 is controlled for each operational mode. In the stratified combustion mode, the opening of the swirl control valve 18 is controlled to be larger, as the desired torque trq is larger, or the number of engine revolutions ne is larger. On the other hand, in the λ=1 division mode and the enriched mode, the opening of the swirl control valve 18 is controlled to be smaller, as the desired torque trq is larger, or the number of engine revolutions ne is larger. Also the EGR amount is controlled for each operational mode, depending on the operational state of the engine 1, which will more specifically be described later.

Constitution of the Catalyst and Regeneration Thereof

In this embodiment, as described above, the engine 1 is in the low load region and the stratified combustion state to significantly improve the fuel efficiency, and a so-called lean $NO_x$ catalyst 25 of absorption and reduction type is adopted so that $NO_x$ in the exhaust gas can be reduced even if the air-fuel ratio is very lean, such as in the stratified combustion state. In order to provide the purifying performance of the catalyst 25 stably, when the amount of absorbed $NO_x$ in the catalyst 25 is increased to some extent, the $NO_x$ is released for reduction and purification. A slight amount of $SO_x$ contained in the exhaust gas is gradually absorbed by a $NO_x$ storage material, and the amount of absorbed $SO_x$ in the catalyst 25 is gradually increased over time to a point where the increased $SO_x$ interferes with the $NO_x$ purifying performance. At this point, the $SO_x$ is forcefully detached from the catalyst 25.

The inner catalytic layer 25b of the lean $NO_x$ catalyst 25 includes a porous support, and a catalytic metal and a $NO_x$ storage material that are supported by the support. Pt can be used as the catalytic metal. Ba and at least one selected from the group consisting of K, Sr, Mg and La can be used as the $NO_x$ storage material. Alumina and a Ce—Zr—Sr mixed oxide of (or a Ce—Zr mixed oxide) can be used as the support.

Also the outer catalytic layer 25c includes a porous support, and a catalytic metal and a $NO_x$ storage material that are supported by the support. In this case, however, Pt and Rh can be used as the catalytic metal. Ba and at least one selected from the group consisting of K, Sr, Mg and La can be used as the $NO_x$ storage material. Zeolite can be used as the support.

As the support of the outer catalytic layer 25c, alumina and a Ce—Zr—Sr mixed oxide (or a Ce—Zr mixed oxide) can be used as well. Although not shown, the catalytic layer 25 can be one layer coating type, where a layer of support is formed on the surface of the wall of the carrier, and a catalytic metal and a $NO_x$ storage material are supported by the support.

The regeneration of the catalyst 25 by detachment of $NO_x$ and $SO_x$ is performed when it is determined that the absorption of sulfur components by the $NO_x$ storage material reaches the excessive absorption state. This can be achieved in the following manner. The air-fuel ratio in the combustion chamber 4 is controlled to be in the vicinity of the approximate theoretical air-fuel ratio, while the injection of fuel by the injector 7 is divided into two operations. Thus, the temperature of the exhaust gas is increased, and the temperature of the $NO_x$ storage material is increased. At the same time, the CO concentration in the exhaust gas can be increased significantly. Furthermore, in this case, the air-fuel ratio is switched between the lean side and the rich side alternately so that the CO concentration and the HC concentration in the exhaust gas can be changed periodically.

Next, the specific process procedure of fuel injection control including the control procedure for regeneration of the catalyst 25 will be described with reference to the flowcharts shown in FIGS. 8 to 11.

Figure 8:
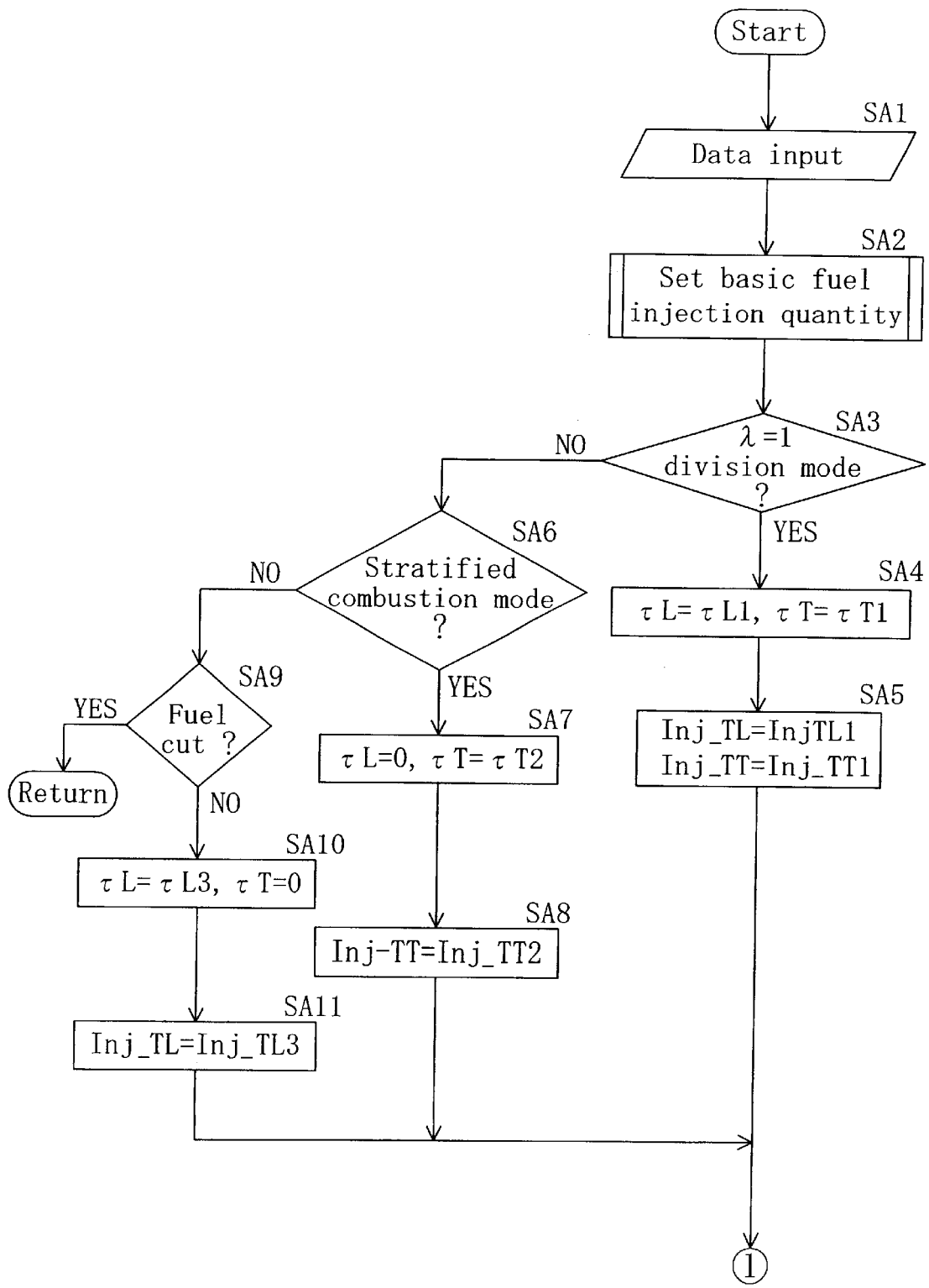
FIG. 8 is a flowchart showing the basic setting procedure for the amount and the time of fuel injection.

First, as shown in FIG. 8, in step SA1 after the start, various kind of sensor signals such as those from the airflow sensor 12, the $O_2$ sensor 24, the water-temperature sensor 30, the engine revolution number sensor 33, and the accelerator opening sensor 34 are received, and various kinds of data are input from the memory of the ECU 40. Then, in step SA2, the basic fuel injection quantity qbase is calculated and set based on the charging efficiency ce and the desired air-fuel ratio afw.

Then, in each step of steps SA3 to SA9, each injection pulse width τL, τT, and each injection time Inj_TL, Inj_TT are obtained for each operation mode. More specifically, in step SA3, it is determined whether or not the operation is in the $\lambda=1$ division mode. When the result is YES, the procedure goes to step SA4, and the basic fuel injection quantity qbase is divided between that for injection in the air-intake stroke and that for injection in the compression stroke based on the division ratio. Then, the injection pulse width $\tau$ corresponding to each injection quantity is set based on the characteristics of the injector 7 with the air-intake stroke injection pulse width-$\tau L=\tau L1$ and the compression stroke injection pulse width $\tau T=\tau T2$, respectively. Then, instep SA5, each injection time for injection in the air-intake stroke and the compression stroke is set (Inj_TL=Inj_TL1, Inj_TT=Inj_TT1).

Furthermore, in the step SA3, when the result of the determination is NO, that is, the operation is not in the $\lambda=1$ division mode, the procedure goes to SA6, where it is determined whether or not the operation is in the stratified combustion mode. When the result is YES, the procedure goes to step SA7, and the air-intake stroke injection pulse width $\tau L=0$ is set, and the compression stroke injection pulse width $\tau T$ is set at a value $\tau T1$ that corresponds to the basic fuel injection quantity qbase. Then, in step SA8, the injection time for injection in the compression stroke is set (Inj_TT=Inj_TT2). On the other hand, when the result of the determination is NO in step SA6, that is, the operation is not in the stratified combustion mode, the procedure goes to SA9, where it is determined whether or not to perform fuel cut control. When the result is YES, a return is performed, whereas when the result is NO, the procedure goes to SA10, where the air-intake stroke injection pulse width $\tau L$ is set at a value $\tau T1$ that corresponds to the basic fuel injection quantity qbase, and the compression stroke injection pulse width $\tau T=0$ is set. Then, in step SA11, the injection time for injection in the air-intake stroke is set (Inj_TL=Inj_TL3).

Figure 9:
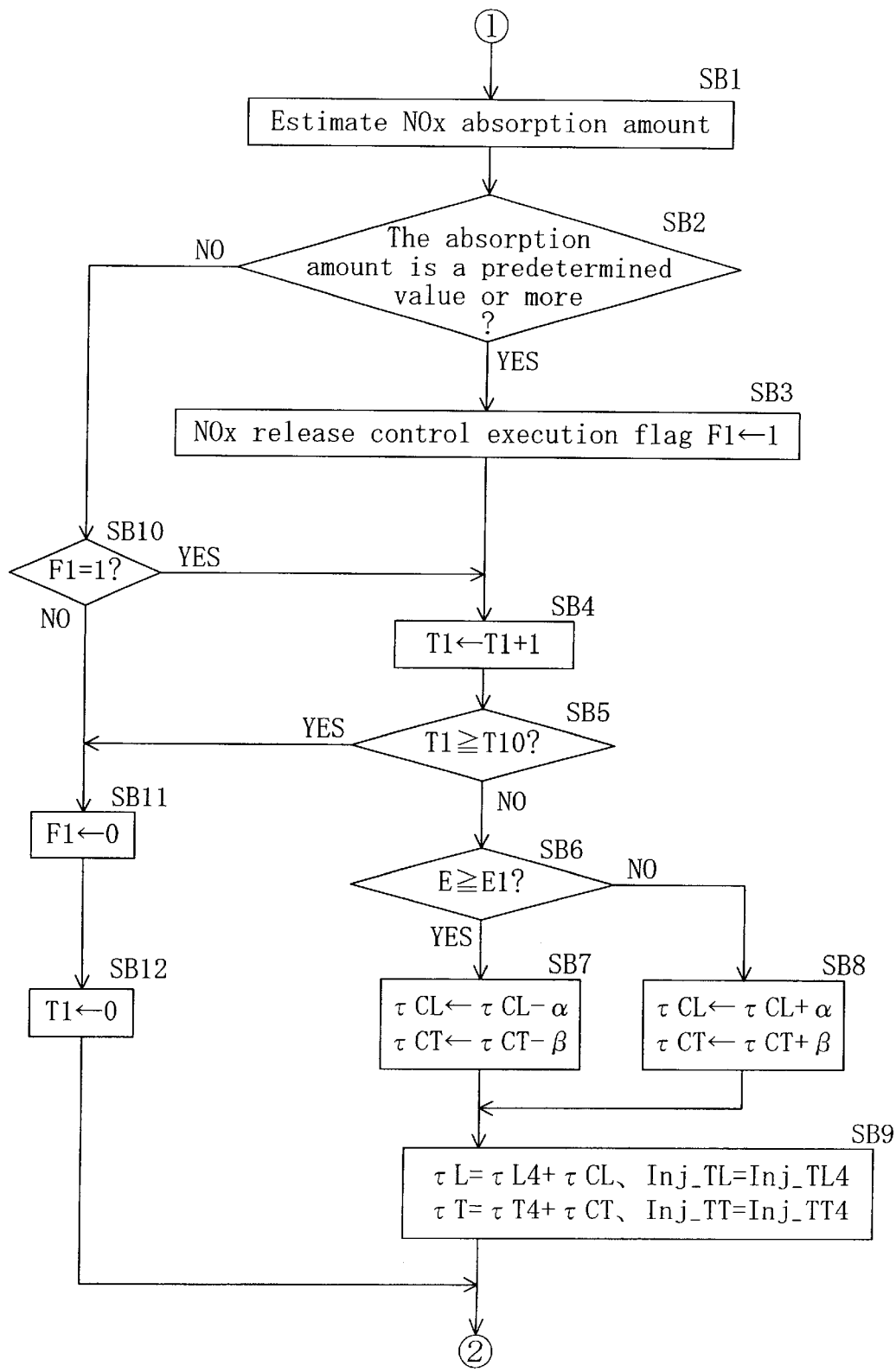
FIG. 9 is a flowchart showing a processing procedure of controlling release of $NO_x$.

Subsequently to steps SA5, SA8, and SA11 in FIG. 8, in step SB1 shown in FIG. 9, the amount of absorbed $NO_x$ in the catalyst 25 is estimated. This estimation is performed based on, for example the travel distance from the point where the last instruction to release $NO_x$ ($NO_x$ release control) is issued and the total amount of the fuel consumed during that period. Based on the results of the estimation, in the following step SB2, it is determined whether or not the amount of absorbed $NO_x$ is equal to or more than a predetermined value that has been previously set, namely, whether or not the amount of absorbed $NO_x$ is excessive. When the result of this determination is YES, the procedure goes to SB3, a flag F1 is turned to ON, which instructs $NO_x$ release control to be performed (F1=1). In the step SB2, during acceleration of the engine 1, the result may be YES regardless of the amount of absorbed $NO_x$, and the $NO_x$ release control, which will be described below, can be performed.

Then, in step SB4, the first timer value T1 whose initial value is 0 is incremented, and in the following step SB5, it is determined whether or not the first timer value T1 is equal to or more than the threshold T10 that has been previously set (approximately 2 to 10 seconds). When the result of this determination is YES, which means that the period for the $NO_x$ release control ends, the procedure goes to steps SB11 and SB12, where the flag F1 is cleared (F1=0) and the first timer is reset (T1=0). On the other hand, when the result of the determination in step SB5 is NO, the procedure goes to step SB6, each step of steps SB6 to SB9, feedback control calculation is performed based on the signals from the $O_2$ sensor 24.

More specifically, instep SB6, an output E from the $O_2$ sensor 24 is compared with a reference value E1 that corresponds to the theoretical air-fuel ratio. When the result is YES, which means that the output E is larger than the reference value E1, the procedure goes to SB7, where feedback corrected values $\tau CL$ and $\tau CT$ as current values are calculated by subtracting constants $\alpha$ and $\beta$, respectively, from the previous values. On the other hand, when the result is NO, which means that the output E is equal to or less than the reference value E1, the procedure goes to SB8, where feedback corrected values $\tau CL$ and $\tau CT$ as current values are calculated by adding constants $\alpha$ and $\beta$, respectively, to the previous values.

Then, in step SB9, the injection pulse widths $\tau L$ and $\tau T$ in the air-intake stroke and the compression stroke during $NO_x$ release control are calculated based on the injection pulse width $\tau L4$ and $\tau T4$ obtained in accordance with the actual charging efficiency ce to achieve the theoretical air-fuel ratio in the combustion chamber 4 and the feedback corrected values $\tau CL$ and $\tau CT$ obtained in steps SB7 and SB8, and the injection times thereof are set again.

$$\tau L=\tau L4+\tau CL, \text{Inj\_TL=Inj\_TL4}$$

$$\tau T=\tau T4+\tau CT, \text{Inj\_TT=Inj\_TT4}$$

In other words, during a period in which the output E from the $O_2$ sensor 24 is larger than the reference value E1, the air-fuel ratio is richer than the theoretical air-fuel ratio. Therefore, the fuel injection quantities in the air-intake and the compression processes are gradually decreased by constant quantities $\alpha$ and $\beta$ for each control cycle so that the air-fuel ratio is changed to be lean. On the other hand, when the output E is smaller than the reference value E1, which means that the air-fuel ratio is lean, the fuel injection quantities are gradually increased so that the air-fuel ratio is changed to be rich. In steps SB7 to SB9, the injection quantities both in the air-intake and the compression processes are feedback-corrected. However, only the injection quantity in the air-intake stroke can be feedback-corrected. This is because a change in the fuel injection quantity in the air-intake stroke hardly gives an adverse effect on the combustion state or exhaust gases.

Furthermore, in step SB2, when the result of the determination is NO, the procedure goes to step SB10, where the status of the flag F1 is determined. When the flag is ON (F1=1), which means that the $NO_x$ release control should be performed, the procedure goes to step SB4. When the flag is OFF (F1=0), which means that the $NO_x$ release control should not be performed, the procedure goes to steps SB11 and SB12.

Subsequently to steps SB9 and SB12 of FIG. 9, in step SC1 shown in FIG. 10, the degree of sulfur poisoning of the catalyst 25, namely, the amount of absorbed $SO_x$ is estimated. Similarly to the estimation of the amount of absorbed $NO_x$ in step SB1, this estimation is performed based on the travel distance from the point where the last instruction to detach $SO_x$ ($SO_x$ detachment control) is issued and the total amount of the fuel consumed during that period, in view of the temperature of the catalyst during that period. Based on the results of this estimation, in the following step SC2, it is determined whether or not the amount of absorbed $SO_x$ is equal to or more than a predetermined value that has been previously set, namely, whether or not the amount of absorbed $SO_x$ is excessive. At this point, the sulfur component is contained in the exhaust gas in a slight amount, so that the travel distance until the amount of absorbed $SO_x$ becomes excessive is far longer than that until the amount of absorbed $NO_x$ becomes excessive.

When the result of this determination in step SC2 is YES, the procedure goes to SC3, a flag F2 is turned to ON (F2=1), which instructs $SO_x$ detachment control to be performed. In the step SC4, the temperature of the exhaust gas thg, namely, the temperature of the catalyst 25, is estimated. This estimation is performed primarily based on the actual charging efficiency ce and the engine revolution number ne, in view of the period of time for operation in the stratified combustion mode within a predetermined time before the estimation, and the time at which divided injection was performed. The temperature of the exhaust gas thg tends to be higher as the charging efficiency or the engine revolution number is higher, and tends to be made high by divided injection. On the other hand, in the stratified combustion mode, the temperature of the exhaust gas thg is significantly low, so that the temperature of the catalyst 25 becomes lower, as the period of time for operation in the stratified combustion mode is longer.

Then, in step SC5, it is determined whether or not the temperature of the exhaust gas thg is equal to or higher than the preset temperature thg0 (e.g., 450° C.). When the result of this determination is $NO_x$ the procedure goes to step SD1 of FIG. 11. When the result of this determination is YES, the procedure goes to step SC6, where the $SO_x$ detachment control is performed. In this manner, only when the temperature of the exhaust gas is high to some extent, the $SO_x$ detachment control is performed, because the detachment properties of $SO_x$ are not satisfactory without the temperature of the catalyst 25 being high to some extent.

In step SC6, the second timer value T2 whose initial value is 0 is incremented, and in step SC7, it is determined whether or not the second timer value T2 is equal to or more than the threshold T20 that has been previously set (approximately 1 to 10 minutes). When the result of this determination is $NO_x$ the procedure goes to steps SC8 and SC11 and feedback control calculation is performed based on the signals from the $O_2$ sensor 24. The specific procedure of the feedback control calculation is the same as that of steps SB6 to SB9 of FIG. 9, and therefore description thereof will be omitted. When the time corresponding to the threshold T20 has passed and the $SO_x$ is sufficiently detached from the catalyst 25, the result of the determination in SC7 becomes YES, and then the procedure goes to step SC12. In this step, the flag F2 is cleared (F2=0) and the procedure goes to step SD1 in FIG. 11.

On the other hand, when the result of the determination in step SC2 is NO, the procedure goes to step SC13 and the status of the flag F2 is determined. When it is ON (F2=1), which means that the $SO_x$ detachment control should be performed, the procedure goes to step SC4. When the flag is OFF (F2=0), which means that the $SO_x$ detachment control should not be performed, the procedure goes to step SC14 and SC15. In these steps, the flag is cleared (F2=0) and the second timer is reset (T2=0), and the procedure goes to step SD1.

Figure 11:
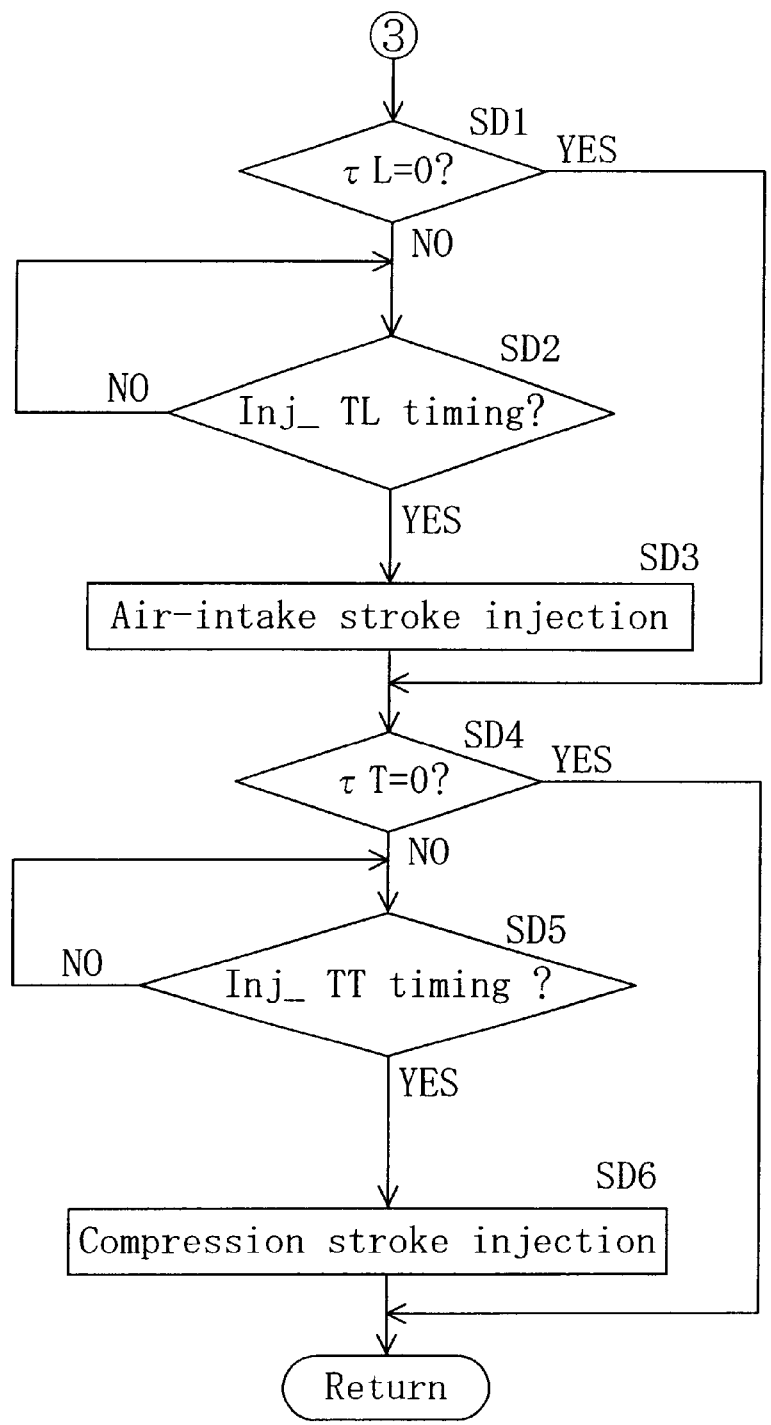
FIG. 11 is a flowchart showing an execution procedure of the intake stroke injection and the compression stroke injection.

Subsequently to steps SC5, SC12 and SC15, in step SD1 shown in FIG. 11, it is determined whether or not the air-intake stroke injection pulse width τL is zero. When the result is YES (τL=0), the procedure goes to step SD4. When the result is NO (τL ≠0), the procedure goes to step SD2, where it is determined whether or not the timing for the air-intake stroke injection time Inj_TL has come. Then, the injection timing is awaited. When the injection timing has come (YES in step SD2), the procedure goes to step SD3, where the air-intake stroke injection is performed. Then, in each step of steps SD4 to SD6, the compression stroke injection is performed in the same manner as above, and then a return is performed.

Figure 10:
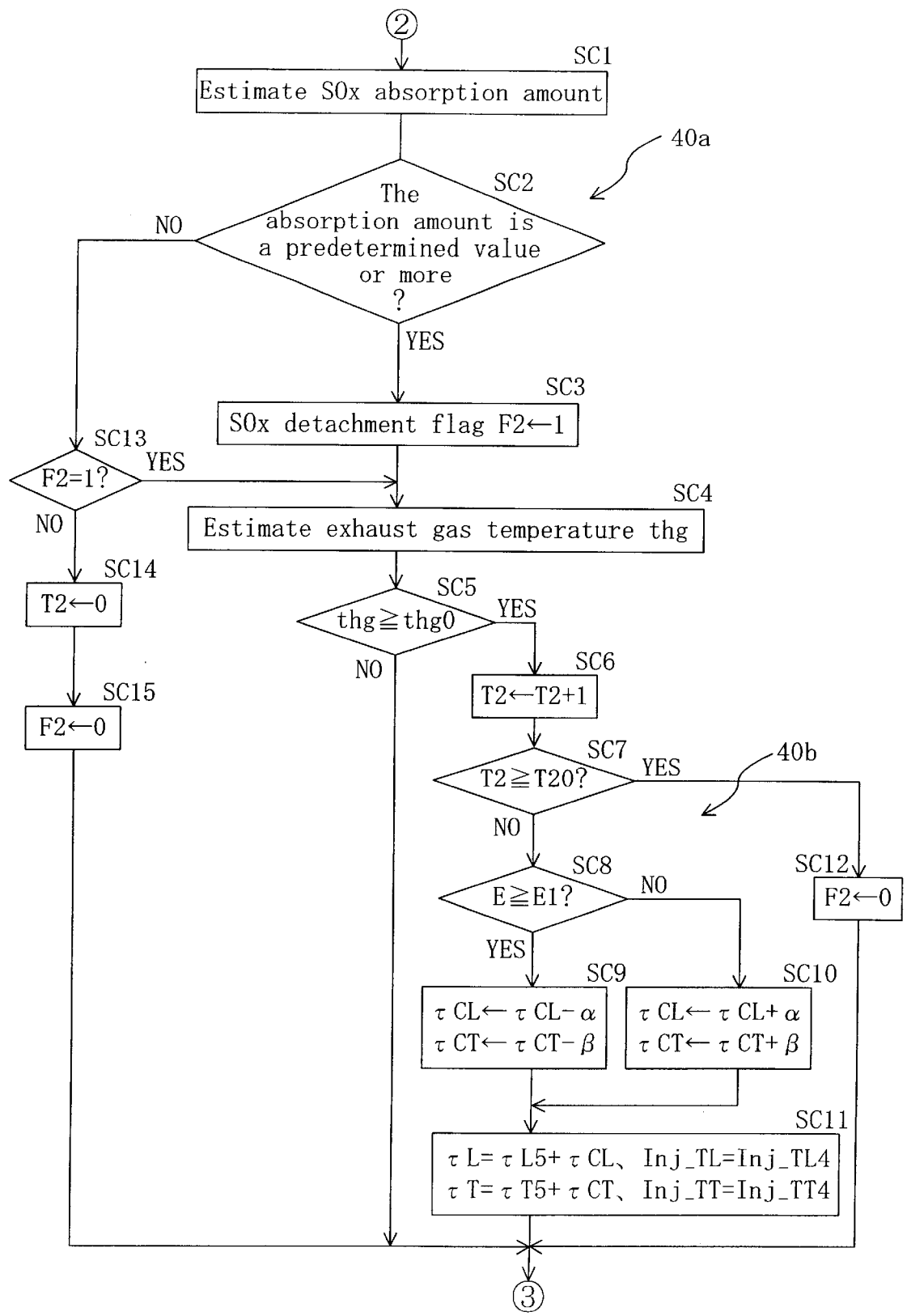
FIG. 10 is a flowchart showing a processing procedure of controlling detachment of $SO_x$.

Therefore, steps SC1 and SC2 of the flow shown in FIG. 10 constitute sulfur excessive absorption determining means 40a for determining that the amount of absorbed $SO_x$ in the catalyst 25 is equal to or more than a predetermined amount. Furthermore, steps SC8 to SC11 constitute sulfur detaching means 40b for detaching $SO_x$ from the $NO_x$ storage material of the catalyst 25

More specifically, when the temperature thg of the exhaust gas is equal to or more than the preset temperature thg0, the sulfur detaching means 40b controls the air-fuel ratio to be in the vicinity of the theoretical air-fuel ratio so that the oxygen concentration in the exhaust gas is reduced. In addition, the sulfur detaching means 40b periodically changes the air-fuel ratio alternately between the rich side and the lean side from the theoretical air-fuel. On the other hand, the sulfur detaching means 40b keeps the temperature of the catalyst 25 high and significantly increases the CO concentration in the exhaust gas by allowing the injector 7 to inject fuel twice, that is, once in the air-intake stroke and once in the compression stroke of the cylinder. In addition, the CO concentration is increased by correcting the fuel injection quantity to be increased.

Figure 12:
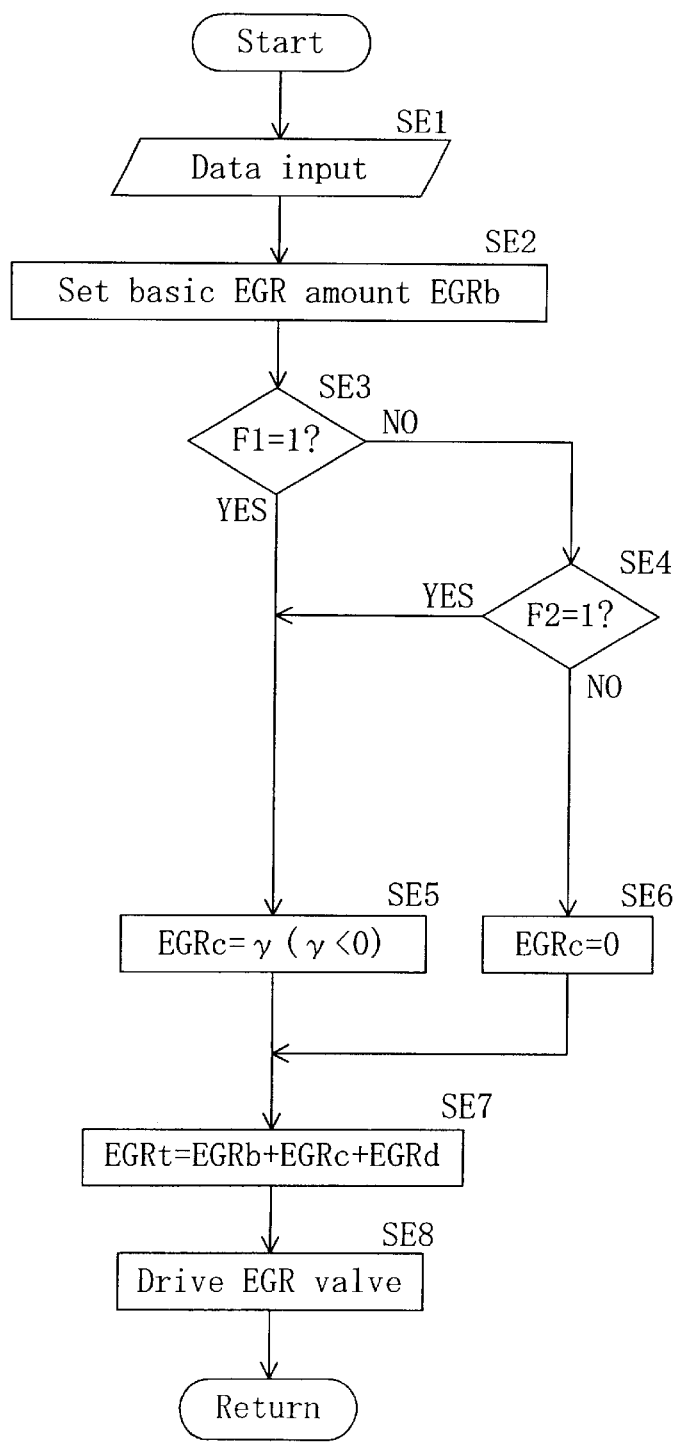
FIG. 12 is a flowchart showing a processing procedure of EGR control.

Next, the process procedure of EGR control will be described more specifically with reference to the flowchart of FIG. 12. In step SE1 after the start, various kind of sensor signals such as those from the airflow sensor 12 and the engine revolution number sensor 33 are received, and various kinds of data are input from the memory of the ECU 40. Then, in step SE2, the desired EGR ratio is calculated based on the actual charging efficiency ce and the engine revolution number ne. An EGR amount that achieves the desired EGR ratio is set as a basic EGR amount EGRb. The desired EGR ratio is calculated as follows. The relationship between the charging efficiency ce and the number of engine revolutions ne is previously obtained by bench tests or the like. This relationship is stored in the memory of the ECU 40 as a map.

Then, in step SE3, based on the value of the first flag F1, it is determined whether or not the $NO_x$ release control should be performed. When the result of this determination is YES, the procedure goes to step SE5. When the result is NO, the procedure goes to step SE4. In turn, based on the value of the second flag F2, it is determined whether or not the $SO_x$ detachment control should be performed. When the result of this determination is YES, the procedure goes to step SE5, where a correction value EGRc for correcting the EGR amount either to be increased or decreased is designated as a predetermined value γ (γ<0). When the result is NO, the procedure goes to step SE6, where the correction value EGRc is made zero (EGRc=0). Then, subsequently to steps SE5 and step SE6, in step SE7, the basic EGR amount EGRb and the correction value EGRc are added, so that the final EGR amount EGRt is calculated. In step SE8, a control signal is output to the EGR valve 27 to drive the EGR valve 27 so that the opening corresponds to the final EGR amount EGRt. Then, a return is performed.

In other words, the opening of the EGR valve 27 is corrected so that the EGR amount is slightly small while the air-fuel ratio in the combustion chamber 4 is kept in the vicinity of the theoretical air-fuel ratio, by performing at least one of the $NO_x$ release control and the $SO_x$ detachment control and by feedback-controlling the fuel injection amount by the injector 7, as described above.

Next, the effect of the function of the above embodiment will be described.

Figure 13:
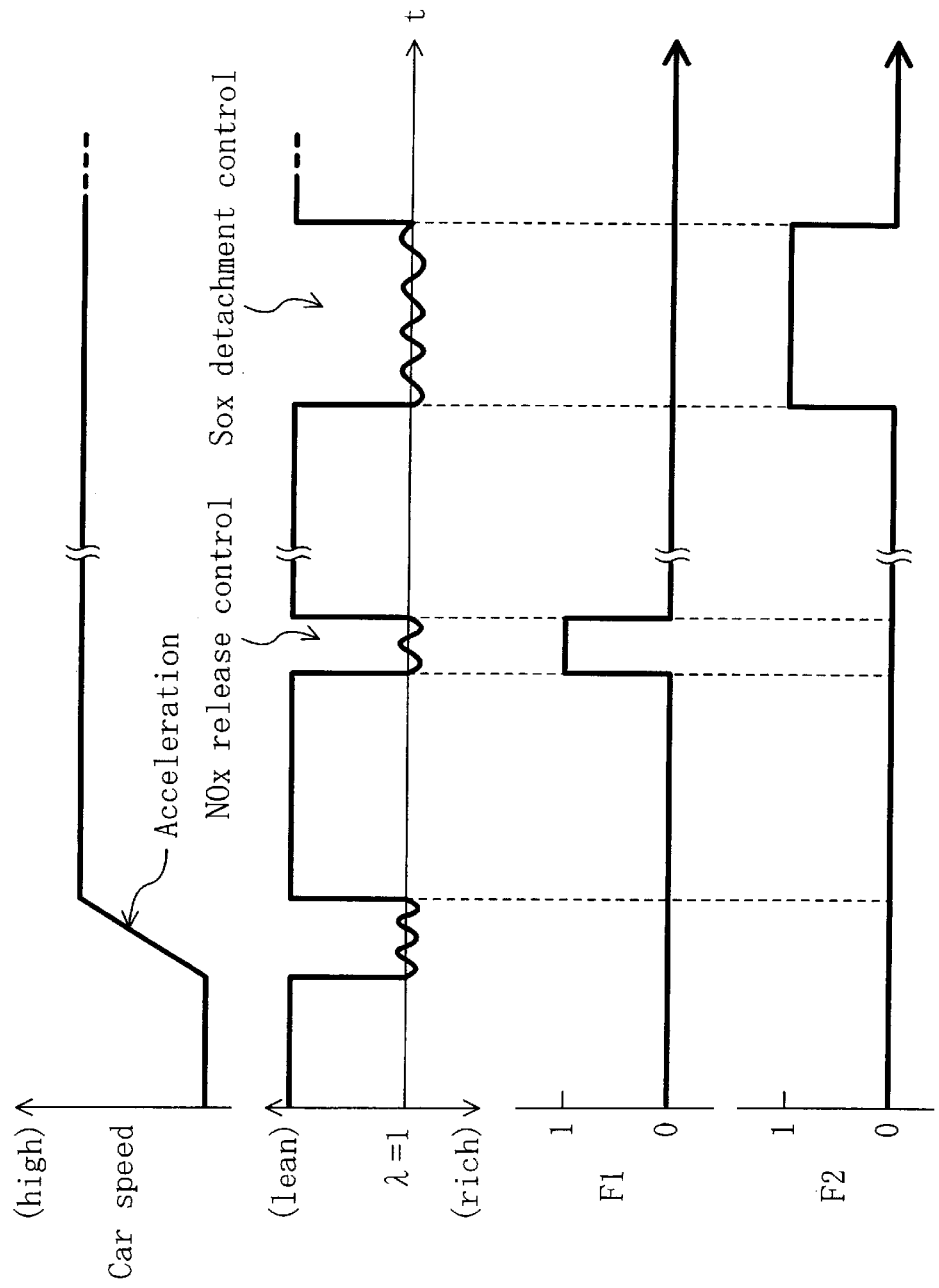
FIG. 13 is a timing chart showing changes in the air-fuel ratio at the time of controlling $NO_x$ release and $SO_x$ detachment during an engine operation.

For the engine 1, for example, as shown in FIG. 13, during acceleration, the fuel injection quantity is increased, and the operation is in the λ=1 division mode or the enriched mode. In this case, $NO_x$ absorbed in the catalyst 25 is released for reduction and purification. When a steady operation continues, the $NO_x$ absorption excessive state of the catalyst 25 is determined (flag F1=1) based on the travel distance since the last time when $NO_x$ is released and the fuel consumed during that period. At this point, $NO_x$ release control is performed as shown in the flow of FIG. 9.

On the other hand, for example, when the travel distance of an automobile is as much as several thousands of km, the absorption ability of $NO_x$ may be deteriorated because $SO_x$ is gradually accumulated in the catalyst 25 during operation of the engine 1. In this case, as shown in the flow of FIG. 10, the sulfur excessive absorption determining means of the engine 1 determines that the amount of absorbed $SO_x$ is excessive, so that the flag F2 is turned to ON (see FIG. 13). At this point, when the catalyst 25 has a high temperature (for example, 450° C. or more), $SO_x$ release control is performed.

Both the $NO_x$ release and the $SO_x$ release are performed with division of the fuel injection into two operations and feedback control of the air-fuel ratio to be in the vicinity of the air-fuel theoretical ratio. Thus, the oxygen concentration in the exhaust gas is decreased, and the CO concentration and the HC concentration in the exhaust gas are significantly increased and changed periodically. Further, the temperature of the exhaust gas is increased. Therefore, detachment of $NO_x$ and $SO_x$ from the catalyst 25 is facilitated.

More specifically, the fuel is divided for two operations of injection by the injector 7, so that a part of the fuel injected in the air-intake stroke of each cylinder 2 is diffused uniformly in the combustion chamber 4 to form a lean air-fuel mixture. On the other hand, the remaining fuel injected in the compression stroke forms an excessively rich air-fuel mixture in the vicinity of the ignition plug 6. Although this excessively rich air-fuel mixture portion has a high initial combustion speed immediately after ignition, oxygen is insufficient. Therefore, CO is generated readily because of local incomplete combustion. On the other hand, combustion in the surrounding lean air-fuel mixture portion becomes mild, and a part of the fuel is released without being burned completely. As a result, the temperature of the exhaust gas is increased by afterburning and CO is generated more readily. Furthermore, when the number of times of opening of the injector 7 is increased because of division of fuel injection, the ratio of fuel droplets having rough particles that is injected in the early time in the opening is increased, resulting in easy generation of CO.

Furthermore, the fuel injection quantity by the injector 7 is increased, and the air-fuel ratio in the combustion chamber 4 is controlled to be substantially the theoretical air-fuel ratio, so that the concentrations of the reductant components such as CO and HC in the exhaust gas are increased. At the same time, the fuel injection quantity is feedback-corrected based on signals from the $O_2$ sensor 24, so that the air-fuel ratio is periodically changed alternately between the rich side and the lean side. Therefore, the concentrations of CO, HC and the like in the exhaust gas are changed periodically. Thus, the actions of $NO_x$ and $SO_x$ adsorbed onto the catalyst 25 on CO, HC and the like are increased, so that the release of $NO_x$ and $SO_x$ from the catalyst 25 is facilitated.

As a result, the period of time required for sufficient detachment of $SO_x$ from the catalyst 25, namely, the period of time during which the air-fuel ratio is controlled to be substantially the theoretical air-fuel ratio only for this purpose can be shortened. Therefore, sufficient regeneration of the catalyst 25 and stable performance for $NO_x$ removal can be achieved with minimal deterioration of the fuel cost.

Absorption of $NO_x$ $NO_x$ and HC in the exhaust gas is activated by a precious metal supported by zeolite of the outer catalytic layer 25c, so that NO is converted to $NO_2$, and partial oxidation or cracking occurs in HC, which leads to a highly reactive state in terms of energy. For this reason, $NO_2$ converted from NO by the outer catalytic layer 25c is more easily absorbed by the $NO_x$ storage material of Ba or other elements, so that its $NO_x$ absorption ratio is increased.

Release of $NO_x$

In the catalyst 25, $NO_x$ is adsorbed onto the surface of the $NO_x$ storage material (e.g., Ba particles) in the form of nitrate. It seems that the nitric acid radical of the nitrate is substituted by supply of CO so that carbonate and nitrogen dioxide are generated. For example, the reaction with Ba particles is as follows.

$Ba(NO_3)_2 + CO \rightarrow BaCO_3 + NO_2 \uparrow$ (coefficients omitted)

Then, nitrogen dioxide is reacted with HC, CO etc. on the catalytic metal for reduction and purification.

$NO_2 + HC + CO \rightarrow N_2 + H_2O + CO_2$ (coefficients omitted)

More specifically, since the $NO_x$ is released from the catalyst 25 for reduction and purification, the catalyst can absorb $NO_x$ in the exhaust gas sufficiently again (regeneration of the catalyst).

In the catalyst 25, CO and HC in the exhaust gas are adsorbed and retained in zeolite of the outer catalytic layer 25c, so that the released $NO_x$ can be reduced and purified reliably, as described above. In addition, even if the amount of $NO_x$ released from the catalyst 25 becomes small, CO or HC is not emitted to the air. Therefore, most of the $NO_x$ absorbed in the catalyst 25 can be released. In other words, the catalyst 25 can be regenerated sufficiently.

Furthermore, since the outer catalytic layer 25c supports Pt and Rh, $NO_2$ can be reduced and degraded effectively at a relatively low temperature (e.g., 200 to 250° C.). This is especially advantageous when the engine 1 is operated in the stratified combustion state, as in this embodiment. In such stratified combustion, the air-fuel ratio is very lean, and the temperature of the exhaust gas is very low.

Release of $SO_x$

Next, regeneration of the catalyst 25 from sulfur poisoning will be described. In the catalyst 25, $SO_x$ is adsorbed onto the surface of the $NO_x$ storage material (e.g., Ba particles) in the form of sulfate, as in the case of $NO_x$. It seems that the sulfuric acid radical of the sulfate is substituted by supply of CO so that carbonate and sulfur dioxide are generated. For example, the reaction with Ba particles is as follows.

$BaSO_4 + CO \rightarrow BaCO_3 + SO_2 \uparrow$ (coefficients omitted)

Furthermore, when the CO concentration becomes high, a so-called water gas shift reaction proceeds between CO and water $H_2O$ in the exhaust gas, thereby generating hydrogen in the reaction site of the catalyst.

$CO + H_2O \rightarrow H_2 + CO_2$ Then, the action of hydrogen causes $SO_x$ to be detached in the form of hydrogen sulfide. This also facilitates the detachment of the sulfur component from the catalyst 25. Since the water gas shift reaction proceeds even in a relatively low temperature, the detachment of $SO_x$ can be facilitated without significantly raising the temperature of the catalyst 25.

Furthermore, zeolite is supported by the outer catalytic layer 25c of the catalyst 25, and zeolite causes partial oxidation of HC in the exhaust gas so that HC is converted to HCO or CO. Therefore, the CO concentration that affects $SO_x$ adsorbed onto the surface of the $NO_x$ storage material of the inner catalytic layer 25b is further increased.

Furthermore, when elements (K, Sr, Mg or La) other than Ba are more susceptible to sulfur poisoning than Ba, this makes the sulfur poisoning of Ba relatively small, so that the deterioration of $NO_x$ absorption ability after sulfur poisoning becomes small. When the other elements (K, Sr, Mg or La) can be regenerated more easily from sulfur poisoning than Ba, the $NO_x$ absorption ability after regeneration becomes high. Furthermore, when the presence of the other elements (K, Sr, Mg or La) leads to an increase of the specific surface area of the $NO_x$ storage material or the reaction site, the $NO_x$ absorption ability of the $NO_x$ storage material becomes high. Furthermore, when the other elements serve to prevent sintering by heat of Ba, heat deterioration due to the sulfur detachment treatment of the $NO_x$ storage material can be prevented.

Alumina and a ceria-zirconia mixed oxide constitute the support, and alumina is useful to ensure the heat resistance of the catalyst, and the mixed oxide facilitates a purification reaction of three substances of HC, CO and $NO_x$ when the engine is operated in the vicinity of $\lambda=1$, and is advantageous for improvement of the sulfur poisoning resistance of the catalyst.

Specific Examples of the Catalyst

Constitution of the Catalyst

Figure 14:
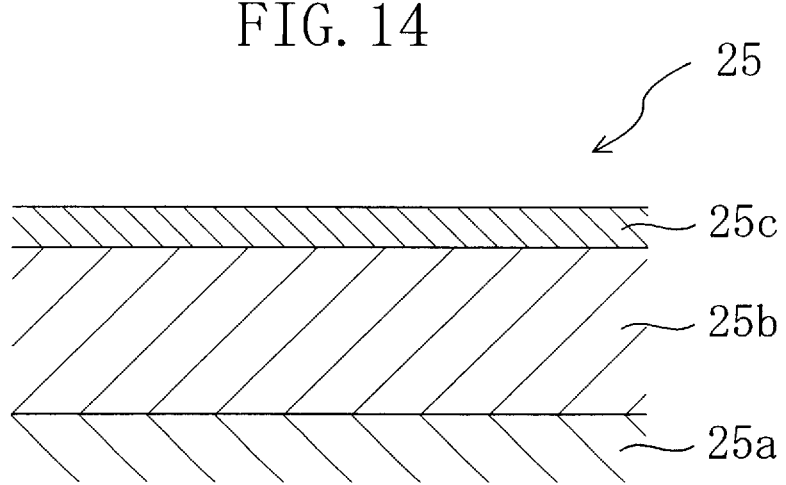
FIG. 14 is a cross-sectional view illustrating a layer structure of a catalyst of an embodiment of the present invention.

FIG. 14 shows the catalyst 25 for purifying the exhaust gas. The catalyst 25 is a laminate comprising a monolith carrier 25a, an inner catalytic layer 25b, and an outer catalytic layer 25c. The monolith carrier 25a is made of for example, cordierite, which is a carrier material having an excellent heat resistance. The inner catalytic layer 25b is formed near the surface of the carrier 25a, and the outer catalytic layer 25c is formed away from the surface of the carrier 25a.

The inner catalytic layer 25b includes a first precious metal component (e.g., Pt), Ba, K, Sr and Mg as $NO_x$ storage materials, a first support supporting the first precious metal and the $NO_x$ storage materials, and a binder for binding the support powder for retention in the carrier. In this case, the first support is formed of a mixture of alumina and a $CeO_2 \cdot ZrO_2 \cdot SrO$ mixed oxide.

The outer catalytic layer 25c includes a second precious metal component (e.g., Pt, Rh), Ba, K, Sr and Mg as $NO_x$ storage materials, a second support supporting the precious metal and the $NO_x$ storage materials, and a binder for binding the second support powder for retention in the carrier. In this case, the second support is formed of zeolite.

The content of impurities in each of the catalytic layers 25b and 25c is 1% or less.

(Production Method of the Catalyst 25)

The basic method for producing the catalyst 25 is as follows.

First, the first support (a mixture of alumina and a $CeO_2 \cdot ZrO_2 \cdot SrO$ mixed oxide), the binder, and water are mixed to form slurry. The monolith carrier is wash-coated with this slurry and dried and calcined, so that an inner coating layer is formed.

Then, the second precious metal is supported by the second support (zeolite) by evaporation to dryness so that catalyst power is formed. Then, the catalyst power, the binder and water are mixed to form slurry. The monolith carrier provided with the inner coating layer is wash-coated with this slurry and dried and calcined, so that an outer coating layer is formed on the inner coating layer.

Then, a solution of the first precious metal component, and solutions of Ba component, K component, Sr component and Mg component are mixed to prepare a mixed solution. Then, the inner coating layer and the outer coating layer are impregnated with the mixed solution at the same time, and are dried and calcined.

In this manner, the inner catalytic layer and the outer catalytic layer are formed as the inner coating layer and the outer coating layer, respectively.

(Use Form of the Catalyst 25)

Figure 15:
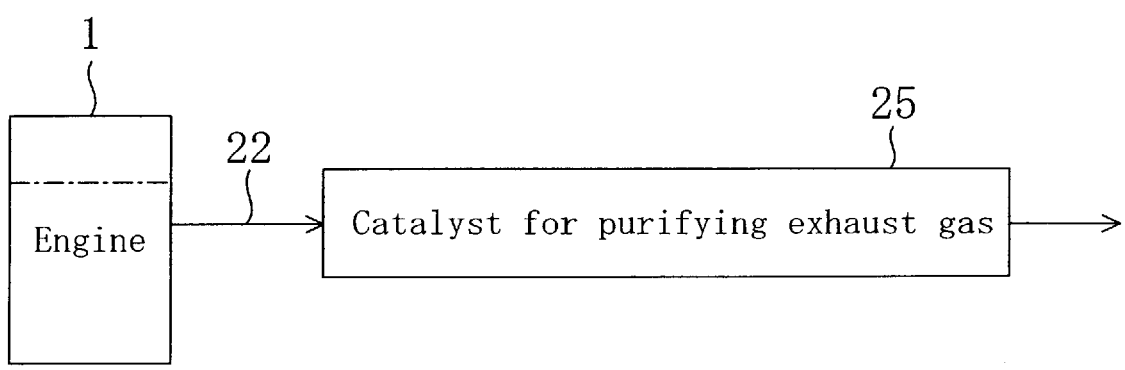
FIG. 15 is a block diagram of an apparatus for purifying an exhaust gas from an engine using the catalyst of an embodiment of the present invention.

As shown in FIG. 15, for example, the catalyst 25 is provided in the emission passage 22 for emitting an exhaust gas from the lean combustion engine 4 for automobiles. The provision site corresponds to a site immediate downstream of an emission manifold. The catalyst 25 stores $NO_x$ contained in the exhaust gas in Ba, K, Sr and Mg during lean combustion operation. Then, during operation of combustion at the theoretical air-fuel ratio or rich combustion operation ($\lambda \leq 1$), in the catalyst 25, $NO_x$ released from Ba or the like is reacted with HC, CO and $H_2$ to purify the exhaust gas as well as the ternary catalyst. More specifically, the catalyst 25 has a lean $NO_x$ purification function, and the concentration of oxygen in the exhaust gas during lean combustion operation is for example, 4 or 5% to 20%, and the air-fuel ratio A/F is 18 to 150. On the other hand, the concentration of oxygen during rich combustion operation is 0.5% or less.

Furthermore, although the catalyst 25 has a lean $NO_x$ purification function, when the lean combustion operation continues for a long time, the amount of stored $NO_x$ of the catalyst 25 is saturated so that the $NO_x$ purification performance is deteriorated. Therefore, control is performed so that a cycle as follows is repeated. A lean combustion operation is performed for 2 to 3 minutes, during which $NO_x$ is stored in the $NO_x$ storage material. Then, a rich combustion operation is performed for 1 to 5 seconds, during which the stored $NO_x$ is released for purification.

Furthermore, when it is determined that the amount of the sulfur component absorbed in the $NO_x$ storage materials (Ba, K, Sr and Mg) contained in the inner catalytic layer 25b and the outer catalytic layer 25c is excessive, the air-fuel ratio in the combustion chamber is made rich, and ignition retard control for delaying an ignition time is performed for 2 to 10 minutes. Thus, the temperature of the exhaust gas is raised, so that the temperature of the $NO_x$ storage materials is also increased. Thus, the sulfur component is detached from the sulfur-poisoned $NO_x$ storage materials for regeneration.

Since the precious metals as catalytic metals are supported in the inner catalytic layer 25b and the outer catalytic layer 25c, $NO_x$ and HC in the exhaust gas are activated on the surface of the precious metals, and oxygen activated from the mixed oxide is supplied. Therefore, an oxidation reaction of NO in the exhaust gas to $NO_2$ and a partial oxidation reaction of HC proceed smoothly. Since $NO_2$ and the partially oxidized HC are highly reactive in terms of energy, reduction of $NO_x$ and oxidation of HC in the catalyst 25 proceed efficiently.

More specifically, at a lean air-fuel ratio, in the outer catalytic layer 25c, HC that has been stored in zeolite when the catalyst has a low temperature is released with increasing the temperature of the catalyst, and HC is reacted with NO in the exhaust gas without being partially oxidized, or HC is reacted with NO after being partially oxidized and thus $NO_x$ is purified. In the inner catalytic layer 25b, $NO_2$ generated by oxidation of NO in the outer catalytic layer 25c is stored in the $NO_x$ storage materials, and apparently $NO_x$ is purified. $NO_2$ stored in the $NO_x$ storage materials is reacted with partially oxidized HC that has been activated on the precious metals of the inner catalytic layer 25b and the outer catalytic layer 25c when the air-fuel ratio is turned to be rich so that $NO_2$ is degraded and purified. Therefore, the outer catalytic layer 25c exerts a function as a catalyst for selective reduction $NO_x$ purification, and the inner catalytic layer 25b exerts a function as a catalyst for lean $NO_x$ purification.

In the above embodiment, the catalyst 25 is a lean $NO_x$ catalyst, but is not limited thereto and can be a ternary catalyst comprising a Ce—Zr—Sr mixed oxide as an oxygen storage material. In this case, even if the catalyst has been exposed to a high temperature atmosphere for a long time, the mixed oxide can act effectively as an oxygen supply source for HC oxidation, so that HC can be oxidized and eliminated. As a result, a high HC purification performance can be obtained.

Furthermore, in the above embodiment, the catalyst 25 is used to purify an exhaust gas of a gasoline engine, but is not limited thereto and can be used to purify an exhaust gas of a diesel engine having an air-fuel ratio A/F of 18 to 50. In this case, for regeneration of the $NO_x$ storage material of the catalyst 25, injection retard control for delaying the fuel injection time is performed to raise the temperature of the exhaust gas.

Experiment 1

Tests were conducted to evaluate the heat resistance and the sulfur poisoning resistance of catalysts of examples as shown below. <Preparation of catalysts for evaluation>

EXAMPLE 1

A catalyst of Example 1 was prepared in the following manner.

Formation of an Inner Coating Layer

γ-alumina, $CeO_2 \cdot ZrO_2 \cdot Sm_2O_3$ as a mixed oxide (a mass composition ratio of $CeO_2:ZrO_2:Sm_2O_3$ of 23:73:4)and an alumina binder were weighed and mixed so that the support amount of γ-alumina was 150 g/L and the support amount of the mixed oxide was 150 g/L, and the support amount of the alumina binder was 30 g/L. Herein, the support amount refers to an amount of dry mass per L of a carrier when the substance is supported in the honeycomb carrier that is described later. Then, ion exchanged water was added thereto to prepare slurry. A monolith carrier made of cordierite was immersed in this slurry and lifted up, and excess slurry was blown off. In this manner, the carrier was wash-coated with the slurry. Then, this was dried at a temperature of 150° C. for one hour, and calcined at a temperature of 540° C. for two hours to form an inner coating layer. The conditions of drying and calcining are the same as those described below.

Formation of an Outer Coating Layer

An aqueous solutions of dinitrodiamine platinum and an aqueous solution of rhodium nitrate were weighed and mixed so that the Pt support amount was 0.5 g/L and the Rh support amount was 0.006 g/L, and the mixture was combined with MFI type zeolite ($SiO_2/Al_2O_3$=80) and was subjected to spray to dryness by spray-drying and further dried and calcined to prepare catalyst powder. The amount of the combination of Pt and Rh in the catalyst power was about 2.5 mass percent.

Then, the Pt—Rh/MFI catalyst powder and the alumina binder were weighed and mixed so that the support amount of the catalyst power was 20 g/L and the support amount of the binder was 4 g/L, and an ion exchanged water was added to the mixture, so that a slurry was prepared. The carrier provided with the inner coating layer was wash-coated with the slurry, and then dried and calcined to form an outer coating layer.

Impregnation Process

An aqueous solution of dinitrodiamine platinum nitrate, an aqueous solution of barium acetate, an aqueous solution of potassium acetate, an aqueous solution of strontium acetate, and an aqueous solution of magnesium acetate were weighed and mixed so that the Pt support amount was 3 g/L, the Ba support amount was 30 g/L, the K support amount was 6 g/L, the Sr support amount was 10 g/L, and the Mg support amount was 10 g/L to prepare a mixed solution.

Then, the inner coating layer and the outer coating layer of the carrier were impregnated with the mixed solution, and were dried and calcined.

The content of impurities in the obtained catalyst was less than 1%. This also applies to other examples of catalysts described below.

EXAMPLE 2

A catalyst of Example 2 was prepared by the same method and under the same conditions as in Example 1 except that $CeO_2 \cdot ZrO_2 \cdot La_2O_3$ (a mass composition ratio of $CeO_2:ZrO_2:La_2O_3$ of 23:73:4) was used as a mixed oxide for the inner coating layer.

EXAMPLE 3

A catalyst of Example 3 was prepared by the same method and under the same conditions as in Example 1 except that $CeO_2 \cdot ZrO_2 \cdot In_2O_3$ (a mass composition ratio of $CeO_2:ZrO_2:In_2O_3$ of 23:73:4) was used as a mixed oxide for the inner coating layer.

EXAMPLE 4

A catalyst of Example 4 was prepared by the same method and under the same conditions as in Example 1 except that $CeO_2 \cdot ZrO_2 \cdot SrO$ (a mass composition ratio of $CeO_2:ZrO_2:SrO$ of 23:73:4) was used as a mixed oxide for the inner coating layer.

Reference Example

A catalyst for reference was prepared by the same method and under the same conditions as in Example 1 except that $CeO_2 \cdot ZrO_2$ (a mass composition ratio of $CeO_2:ZrO_2$ of 75:25) was used as a mixed oxide for the inner coating layer.

For reference, the specific surface area and the oxygen storage ability after aging at 1000° C. of the mixed oxide of each catalyst were measured. Table 1 shows the results.

TABLE 1

|  |  | Ex. 1 | Ex. 2 | Ex. 3 | Ex. 4 | Reference Ex. |
|---|---|---|---|---|---|---|
| Specific surface area | m²/g | 30 | 40 | 4 | 38 | 25 |
| Oxygen storage ability | μmol/g | 150 | 150 | 200 | 140 | 130 |

<Evaluation 1:Heat Resistance>

Evaluation Test Method

The catalysts of Examples 1 to 4 and Reference Example were heated in an ambient atmosphere at 900° C. for 24 hours.

Then, $NO_x$ purification ratios were measured according to the methods described below.

Method for Measuring the $NO_x$ Purification RATIO

Figure 16:
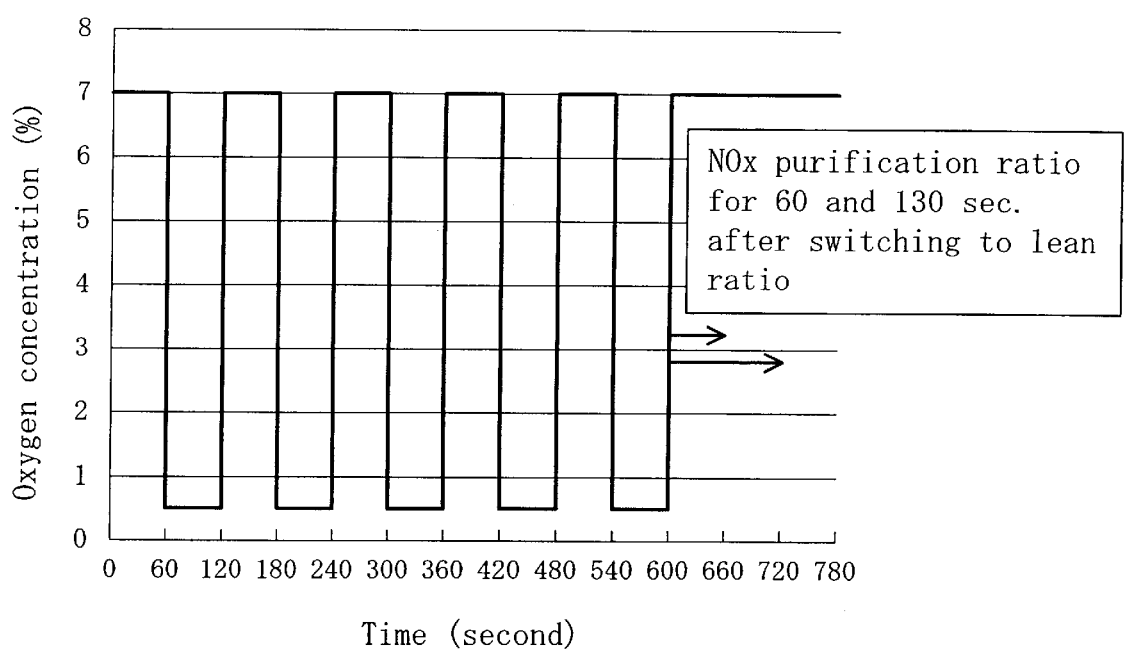
FIG. 16 is a graph showing the relationship between the time from the start of a test and the concentration of oxygen of a simulated gas contacted with the catalyst in measurement of the $NO_x$ purifying ratio.

The catalyst was attached to a fixed floor flow-through reaction evaluation apparatus, and as shown in FIG. 16, a simulated exhaust gas (gas composition A) at a lean air-fuel ratio was allowed to flow for 60 seconds, and then the gas composition was switched and a simulated exhaust gas having a rich air-fuel ratio (gas composition B) was allowed to flow for 60 seconds. These operations constitute one cycle, and this cycle was repeated 5 times. Then, the gas composition was switched to that at the lean air-fuel ratio (gas composition A), and for 60 seconds and 130 seconds from this point of switching (600 seconds later from the test start), the $NO_x$ purification ratio (lean $NO_x$ purification ratio) was measured. The temperature of the catalyst and the temperature of the simulated exhaust gas were 350° C. The gas composition was shown in Table 2. The space velocity SV was 25000 $h^{-1}$.

TABLE 2

|  | Gas composition A Lean | Gas composition B Rich |
|---|---|---|
| $HC(C_3H_6)$ | 4000 ppm | 4000 ppm |
| NO | 260 ppm | 260 ppm |
| CO | 0.16% | 0.16% |
| $CO_2$ | 9.75% | 9.75% |
| $H_2$ | 650 ppm | 650 ppm |
| $O_2$ | 7% | 0.5% |
| $N_2$ | the remaining | the remaining |

(Test Results)

Figure 17:
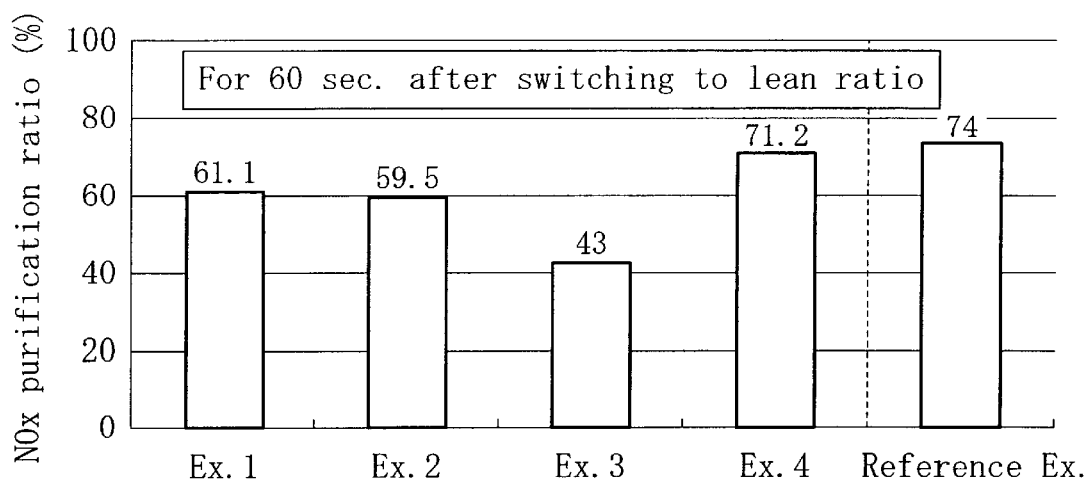
FIG. 17 is a graph showing the $NO_x$ purifying ratio for 60 seconds after switching to a lean ratio, regarding the heat resistance in Experiment 1.
Figure 18:
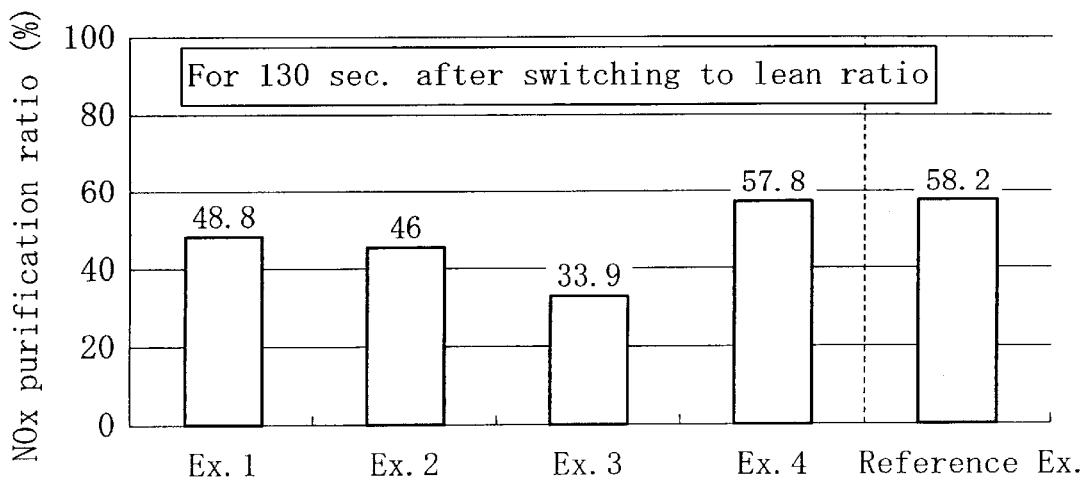
FIG. 18 is a graph showing the $NO_x$ purifying ratio for 130 seconds after switching to a lean ratio, regarding the heat resistance in Experiment 1.

FIGS. 17 and 18 show the $NO_x$ purification ratios for 60 seconds and 130 seconds after the switching point.

As shown in FIGS. 17 and 18, in both cases of 60 and 130 seconds, Example 4 where a $CeO_2 \cdot ZrO_2 \cdot SrO$ mixed oxide was used has a higher $NO_x$ purification ratio than those of Examples 1 to 3, and thus has excellent heat resistance. According to Table 1, although Examples 2 and 4 have substantially equal specific surface areas and oxygen storage abilities, Example 4 exhibited a better $NO_x$ purification ratio. This may be because Sr highly activates oxygen that comes in and out the mixed oxide so that the activity thereof is not lost even after the mixed oxide is exposed to a high temperature atmosphere for a long time. Furthermore, according to Table 1, although the mixed oxide of Example 3 has large oxygen storage ability, the $NO_x$ purification ratio thereof was small. This seems to be because the active area as an oxygen storage material was small.

Example 4 has a slightly poorer $NO_x$ purification ratio than that of Reference Example. However, in Reference Example, $CeO_2:ZrO_2=75:25$, whereas in Example 4, $CeO_2:ZrO_2:SrO=23:73:4$. Therefore, they cannot be compared directly. However, the following is noteworthy. It is Ce that has the oxygen storage and release abilities, and Example 4 has a small amount of the Ce component. Therefore, it is predicted that the $NO_x$ purification ratio thereof will be low. In reality, however, Example 4 has a comparable $NO_x$ purification ratio to Reference Example.

<Evaluation 2: Sulfur Poisoning Resistance and Regeneration Properties>

(Evaluation Test Method)

For each catalyst of Examples 1 to 4 and Reference Example, a fresh catalyst that has not been subjected to a deterioration treatment, and a catalyst that has been subjected to a $SO_2$ treatment (sulfur poisoning deterioration treatment) that is described below were prepared. For Example 4 and Reference Example, a catalyst that has been subjected to a regeneration treatment that is described below after the $S_2$ treatment was prepared as well.

Then, the $NO_x$ purification ratio was measured by the same method and under the same conditions as in Evaluation 1.

$SO_2$ Treatment

A $SO_2$ treatment was performed in the following manner. A simulated exhaust gas constituted by 50 ppm of $SO_2$ and 20% of $O_2$ and $N_2$ was passed through the catalyst attached to a fixed floor flow-through reaction evaluation apparatus for 60 minutes. The temperature of the catalyst at the inlet was 350° C. The space velocity SV was 55000 $h^{-1}$.

Regeneration Treatment

A regeneration treatment was performed in the following manner. A simulated exhaust gas having a gas composition A/F=14.7±0.9 was passed through the catalyst attached to a fixed floor flow-through reaction evaluation apparatus for 10 minutes. The temperature of the catalyst at the inlet was 600° C. The space velocity SV was 120000 $h^{-1}$.

(Test Results)

Figure 19:
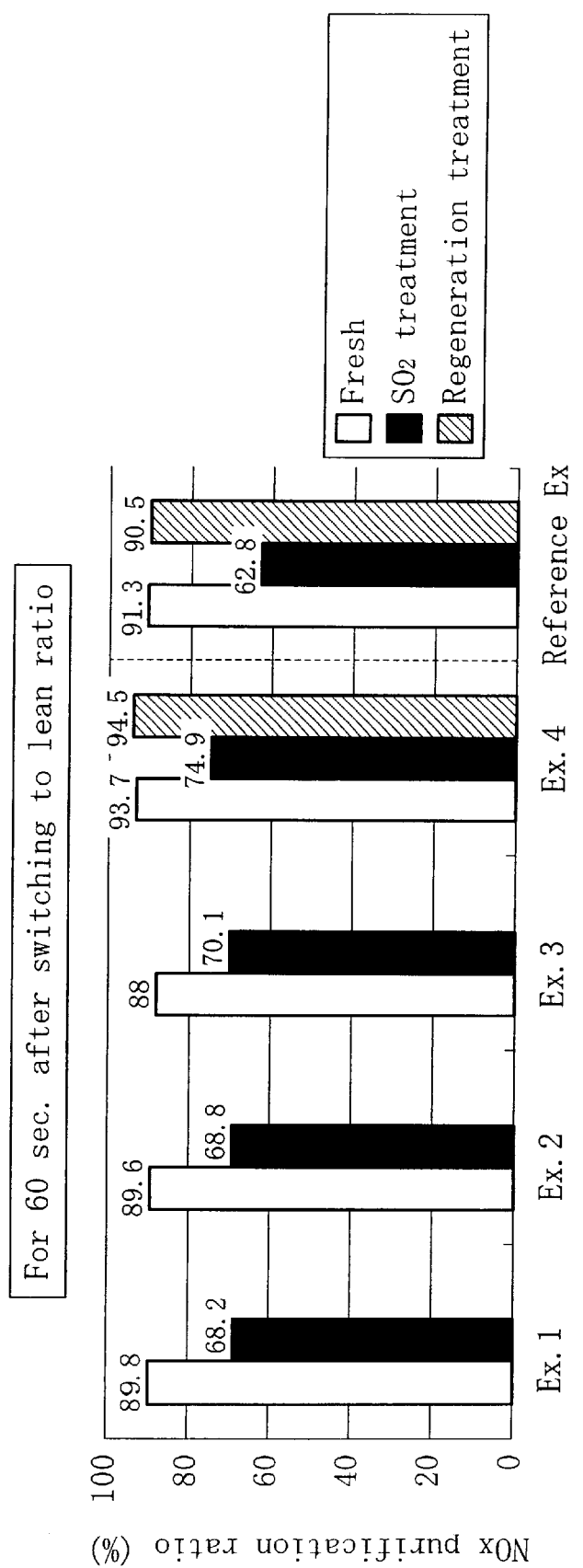
FIG. 19 is a graph showing the $NO_x$ purifying ratio for 60 seconds after switching to a lean ratio, regarding the sulfur poisoning resistance in Experiment 1.
Figure 20:
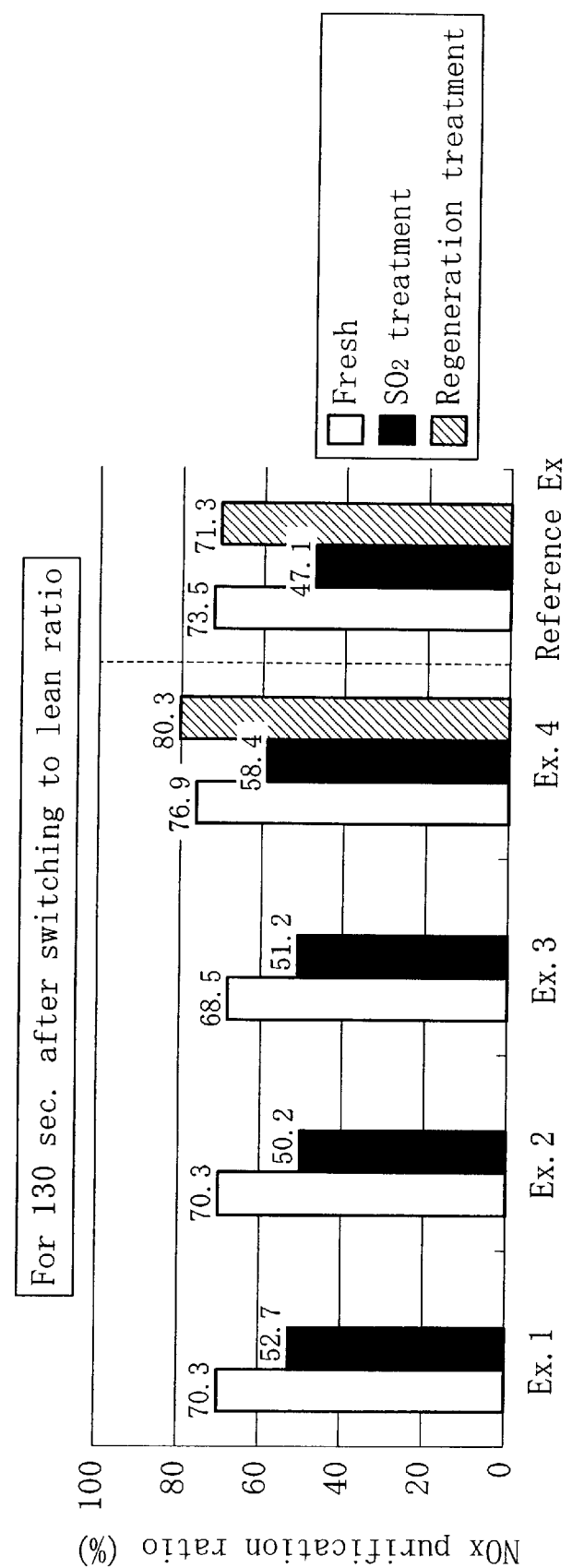
FIG. 20 is a graph showing the $NO_x$ purifying ratio for 130 seconds after switching to a lean ratio, regarding the sulfur poisoning resistance in Experiment 1.

FIGS. 19 and 20 show the $NO_x$ purification ratios for 60 seconds and 130 seconds after the switching point.

As shown in FIGS. 19 and 20, in both cases of 60 and 130 seconds, Examples 1 to 4 have higher $NO_x$ purification ratios than that of Reference Example, and thus have more excellent sulfur poisoning resistance. The reason for this is not clear, but it seems that the presence of Sm, La, In or Sr provides fine $NO_x$ storage materials so that the surface areas thereof were large, and therefore the catalysts were less susceptible to sulfur poisoning. Consequently, sulfur poisoning deterioration of the $NO_x$ storage materials can be suppressed by contacting the exhaust gas containing the sulfur component with the lean $NO_x$ purifying catalyst containing Sm, La, In or Sr.

Furthermore, regeneration of the $NO_x$ purification performance can be confirmed in Example 4 and Reference Example to which the regeneration treatment was performed. Especially, Example 4 exhibits a very high regeneration performance. Therefore, it is preferable to raise the temperature of the catalyst when it is determined that the lean $NO_x$ purifying catalyst containing Sm, La, In or Sr was sulfur-poisoned. This seems to realize high regeneration ability from sulfur poisoning of the catalyst.

Experiment 2

Tests for evaluation were conducted regarding the heat resistance and the sulfur poisoning resistance of the catalysts of the following examples.

<Preparation of Catalysts for Evaluation>

EXAMPLE 5

A catalyst of Example 5 was prepared in the following manner.

Formation of an Inner Coating Layer

γ-alumina, a Ce—Zr—Sr mixed oxide (a $CeO_2 \cdot ZrO_2 \cdot SrO$ mixed oxide, amass composition ratio of $CeO_2:ZrO_2:SrO$ of 73.3:25.7:1) and an alumina binder were weighed and mixed so that the support amount of γ-alumina was 160 g/L, the support amount of the Ce—Zr—Sr mixed oxide was 160 g/L, and the support amount of the binder was 30 g/L. Then, ion exchanged water was added thereto to prepare slurry.

A honeycomb carrier was wash-coated with a half amount of the slurry, and dried and calcined to form an inner coating layer. Then, the inner coating layer was wash-coated with the other half of the amount of the slurry, and dried and calcined in the same manner to form an outer coating layer.

Impregnation Process

Aqueous solutions of dinitrodiamine platinum nitrate, rhodium nitrate, barium acetate, potassium acetate, strontium acetate, and magnesium acetate were weighed and mixed so that the Pt support amount was 3.5 g/L, the Rh support amount was 0.1 g/L, the Ba support amount was 30 g/L, the K support amount was 6 g/L, the Sr support amount was 10 g/L, and the Mg support amount was 10 g/L to prepare a mixed solution. Then, the inner coating layer and the outer coating layer of the carrier were impregnated with the mixed solution, and were dried and calcined.

EXAMPLE 6

A catalyst of Example 6 was prepared by the same method and under the same conditions as in Example 5 except that a Ce—Zr mixed oxide (a $CeO_2 \cdot ZrO_2$ mixed oxide, a mass composition ratio of $CeO_2:ZrO_2$ of 74:26) was used as a mixed oxide.

<Evaluation 1:Heat Resistance>

Figure 21:
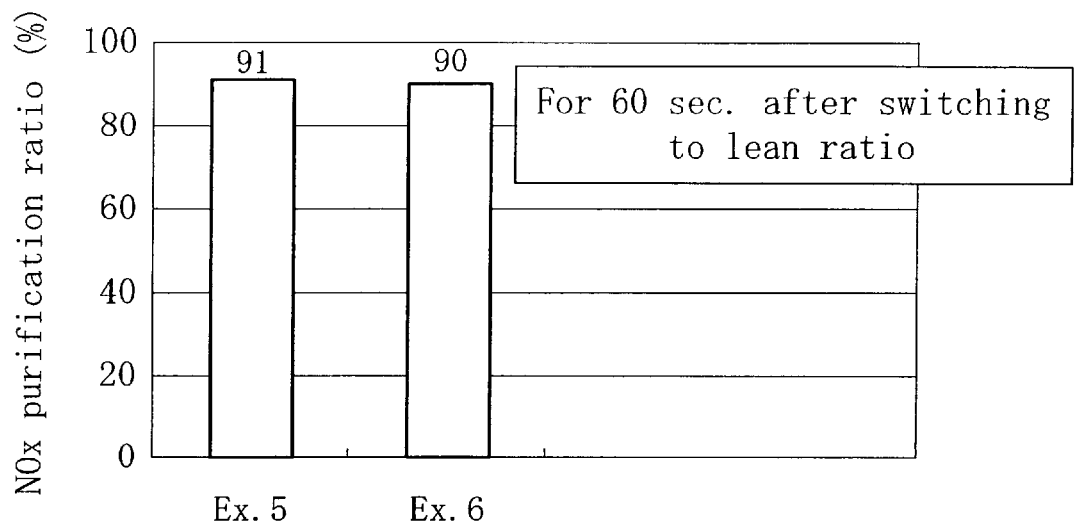
FIG. 21 is a graph showing the $NO_x$ purifying ratio for 60 seconds after switching to a lean ratio, regarding the heat resistance in Experiment 2.

The catalysts of Examples 5 and 6 were heated in an ambient atmosphere at 900° C. for 24 hours. Thereafter, $NO_x$ purification ratios (lean $NO_x$ purification ratios) were measured for 60 seconds and 130 seconds from the point at which the gas composition was switched to a lean air-fuel ratio (gas composition A). FIG. 21 shows the $NO_x$ purification ratios measured for 60 seconds from the point of switching to a lean air-fuel ratio, and FIG. 22 shows the $NO_x$ purification ratios measured for 130 seconds from the point of switching to a lean air-fuel ratio.

Figure 22:
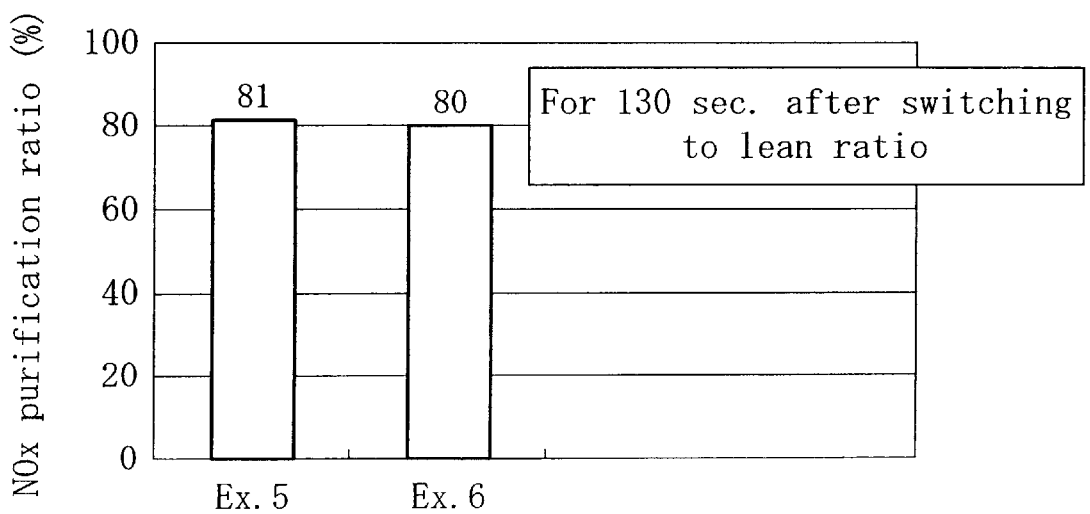
FIG. 22 is a graph showing the $NO_x$ purifying ratio for 130 seconds after switching to a lean ratio, regarding the heat resistance in Experiment 2.

FIGS. 21 and 22 show that Example 5 where the mixed oxide contains Sr has a higher $NO_x$ purification ratio than that of Example 6 that contains no Sr, although Example 5 has a slightly smaller amount of $CeO_2$ than that of Example 6. This indicates that using a Ce—Zr—Sr double compound has an effect on improving the heat resistance of the catalyst.

<Evaluation 2: Sulfur Poisoning Resistance and Regeneration Properties>

Figure 23:
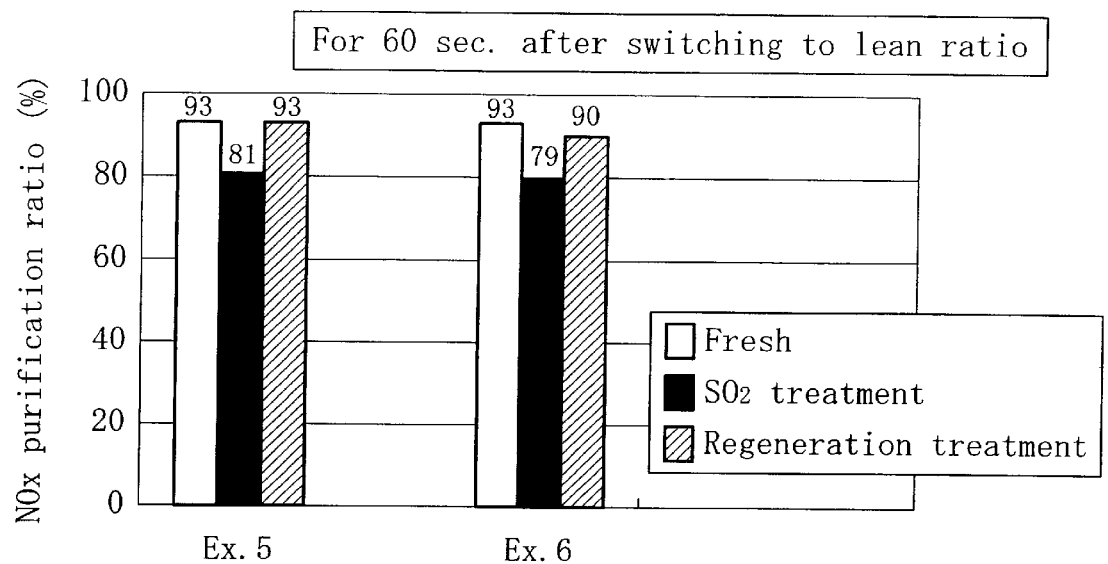
FIG. 23 is a graph showing the $NO_x$ purifying ratio for 60 seconds after switching to a lean ratio, regarding the sulfur poisoning resistance in Experiment 2.
Figure 24:
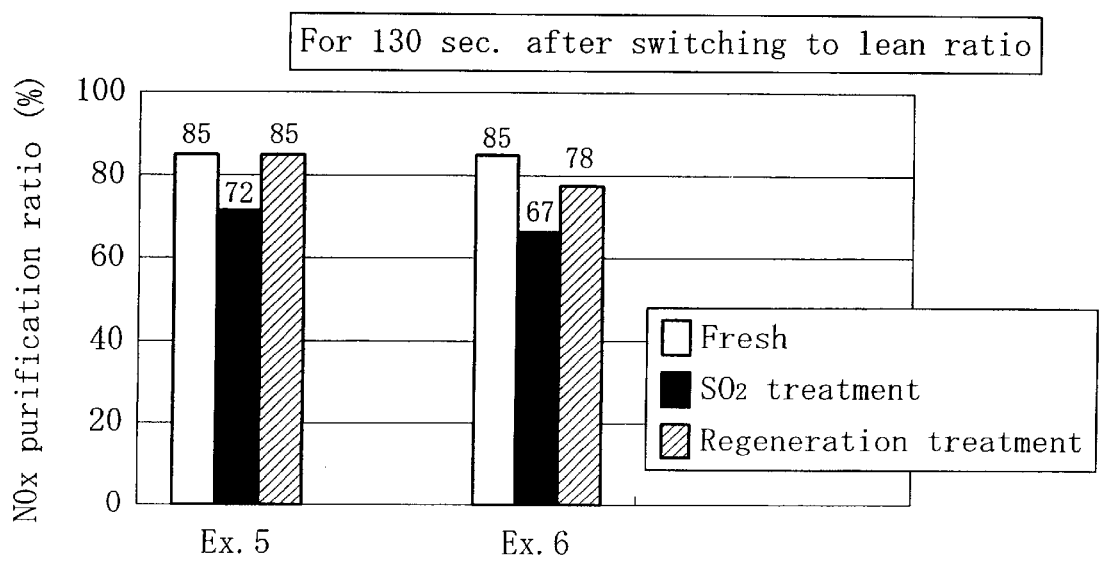
FIG. 24 is a graph showing the $NO_x$ purifying ratio for 130 seconds after switching to a lean ratio, regarding the sulfur poisoning resistance in Experiment 2.

For each of Examples 5 and 6, a fresh catalyst that has not been subjected to a deterioration treatment, a catalyst that has been subjected to a $SO_2$ treatment (sulfur poisoning deterioration treatment) and a catalyst that has been subjected to a regeneration treatment after the $SO_2$ treatment were prepared. Then, the $NO_x$ purification ratio was measured by the same method and under the same conditions as in Evaluation 1. The $SO_2$ treatment and the regeneration treatment were the same as those in Experiment 1. FIGS. 23 and 24 show the results.

According to FIGS. 23 and 24, Example 5 where the mixed oxide contains Sr has substantially no difference from Example 6 that contains no Sr in the fresh catalyst. However, Example 5 has higher $NO_x$ purification ratios after the $SO_2$ treatment and the regeneration treatment. These results indicate that using a Ce—Zr—Sr mixed oxide has an effect on the sulfur poisoning resistance and the regeneration properties of the catalyst.

Experiment 3

A catalyst of Example 7 was prepared and the $NO_x$ purification ratio for 60 seconds after switching to a lean air-fuel ratio was measured by the test of Evaluation 1 and was compared with the test results of Examples 5 and 6. Thus, the effect of the ratio of SrO in the mixed oxide on the $NO_x$ purification ratio was investigated.

EXAMPLE 7

A catalyst of Example 7 was prepared by the same method and under the same conditions as in Example 5 except that a Ce—Zr—Sr mixed oxide (a $CeO_2 \cdot ZrO_2 \cdot SrO$ mixed oxide, a mass composition ratio of $CeO_2:ZrO_2:SrO$ of 71:25:4) was used as a mixed oxide.

Figure 25:
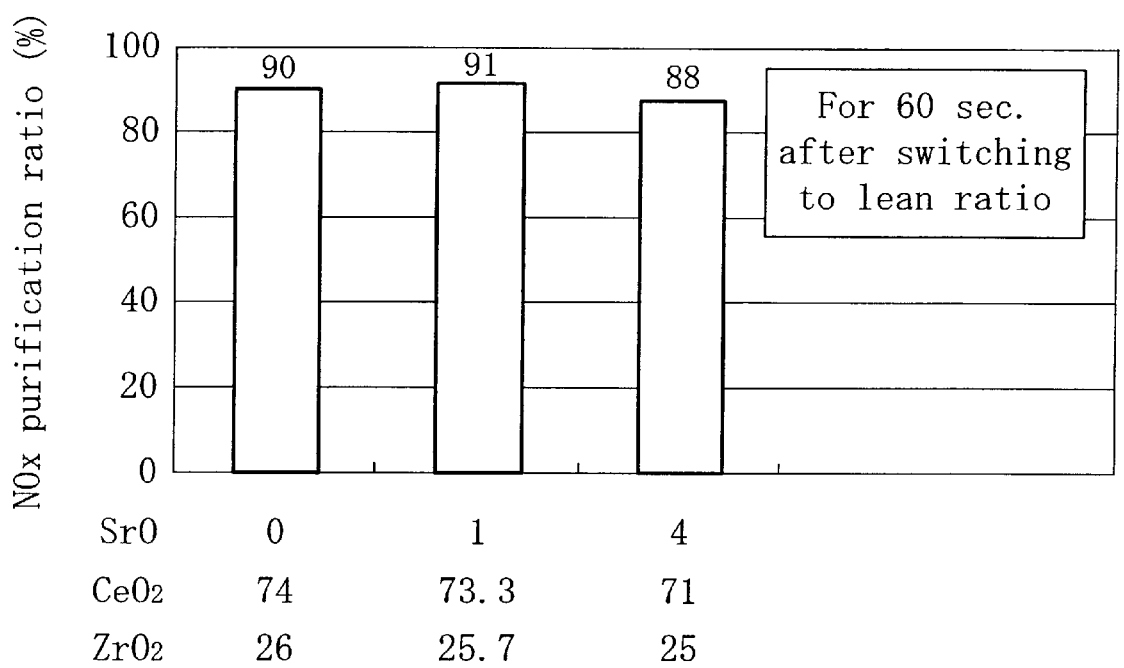
FIG. 25 is a graph showing the $NO_x$ purifying ratio for 60 seconds after switching to a lean ratio, regarding the heat resistance in Experiment 3.

FIG. 25 shows the results. According to FIG. 25, Example 7 that has a larger SrO ratio in the mixed oxide has a slightly lower $NO_x$ purification ratio for 60 seconds after switching to a lean ratio than that of Example 6 that contains no Sr in the mixed oxide. Therefore, the results indicate that the smaller ratios of SrO in the mixed oxide are better. Preferable ratios are 0.5 to 2.0 mass percent.

<$NO_x$ Storage Materials>

Catalysts of Examples 1' to 11' were prepared in the following manner, and the effects of the type of the $NO_x$ storage materials on the $NO_x$ purification ratio, the sulfur poisoning resistance and the regeneration properties from sulfur poisoning were investigated.

EXAMPLE 1'

Formation of Pt—Rh/MFI Catalyst Powder

Aqueous solutions of dinitrodiamine platinum and rhodium nitrate were weighed and mixed so that the Pt support amount was 0.5 g/L and the Rh support amount was 0.006 g/L. Herein, the support amount refers to an amount of dry mass per L of a carrier when the substance is supported in the honeycomb carrier, and the same applies to the following examples. The mixture was combined with MFI type zeolite ($SiO_2/Al_2O_3$=80) and was subjected to spray to dryness by spray-drying and further dried and calcined to prepare catalyst powder. The amount of the combination of Pt and Rh in the catalyst power was about 2.5 wt %.

Preparation of a Mixed Solution (for Impregnation)

Aqueous solutions of dinitrodiamine platinum nitrate and barium acetate were weighed and mixed so that the Pt support amount was 6.0 g/L and the Ba support amount was 30 g/L to prepare a mixed solution.

Formation of an Inner Coating Layer

γ-alumina, a $CeO_2 \cdot ZrO_2$ mixed oxide and an alumina binder were weighed and mixed so that the support amount of γ-alumina was 150 g/L, the support amount of the mixed oxide was 150 g/L, and the support amount of the binder was 30 g/L. Then, ion exchanged water was added thereto to prepare slurry. A honeycomb carrier (a volume of 25 mL, a mass per L of the carrier of 420 g/L) made of cordierite was immersed in this slurry and lifted up, and excess slurry was blown off. In this manner, the carrier was wash-coated with the slurry. Then, this was dried and calcined to form an inner coating layer.

Formation of an Outer Coating Layer

The Pt—Rh/MFI catalyst powder and the alumina binder were weighed and mixed so that the support amount of the catalyst power was 20 g/L, and the support amount of the binder was 4 g/L, and an ion exchanged water was added thereto to prepare a slurry. The carrier provided with the inner coating layer was wash-coated with the slurry, and then dried and calcined to form an outer coating layer.

Impregnation Process

The inner coating layer and the outer coating layer of the carrier were impregnated with the mixed solution, and were dried and calcined.

In this catalyst, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

The content of impurities in the obtained catalyst was less than 1%. This also applies to other examples of catalysts described below.

EXAMPLE 2'

The catalyst was prepared by the same method and under the same conditions as in Example 1', except that aqueous solutions of dinitrodiamine platinum nitrate and barium acetate were weighed and mixed so that the Pt support amount was 6.0 g/L and the Ba support amount was 50 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 3'

The catalyst was prepared by the same method and under the same conditions as in Example 1', except that aqueous solutions of dinitrodiamine platinum nitrate, barium acetate, strontium acetate, and lanthanum acetate were weighed and mixed so that the Pt support amount was 6.0 g/L, the Ba support amount was 30 g/L, the Sr support amount was 10 g/L, and the La support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 4'

The catalyst was prepared by the same method and under the same conditions as in Example 1', except that aqueous solutions of dinitrodiamine platinum nitrate, barium acetate, magnesium acetate, and lanthanum acetate were weighed and mixed so that the Pt support amount was 6.0 g/L, the Ba support amount was 30 g/L, the Mg support amount was 10 g/L, and the La support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 5'

The catalyst was prepared by the same method and under the same conditions as in Example 1', except that aqueous solutions of dinitrodiamine platinum nitrate, barium acetate, potassium acetate, and strontium acetate were weighed and mixed so that the Pt support amount was 6.0 g/L, the Ba support amount was 30 g/L, the K support amount was 10 g/L, and the Sr support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 6'

The catalyst was prepared by the same method and under the same conditions as in Example 1', except that aqueous solutions of dinitrodiamine platinum nitrate, barium acetate, strontium acetate, and magnesium acetate were weighed and mixed so that the Pt support amount was 6.0 g/L, the Ba support amount was 30 g/L, the Sr support amount was 10 g/L, and the Mg support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 7'

The catalyst was prepared by the same method and under the same conditions as in Example 1', except that aqueous solutions of dinitrodiamine platinum nitrate, barium acetate, and potassium acetate were weighed and mixed so that the Pt support amount was 6.0 g/L, the Ba support amount was 30 g/L, and the K support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 8'

The catalyst was prepared by the same method and under the same conditions as in Example 1', except that aqueous solutions of dinitrodiamine platinum nitrate, barium acetate, potassium acetate and magnesium acetate were weighed and mixed so that the Pt support amount was 6.0 g/L, the Ba support amount was 30 g/L, the K support amount was 10 g/L, and the Mg support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 9'

The catalyst was prepared by the same method and under the same conditions as in Example 1', except that aqueous solutions of dinitrodiamine platinum nitrate, barium acetate, potassium acetate, and lanthanum acetate were weighed and mixed so that the Pt support amount was 6.0 g/L, the Ba support amount was 30 g/L, the K support amount was 10 g/L, and the La support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 10'

The catalyst was prepared by the same method and under the same conditions as in Example 1', except that aqueous solutions of dinitrodiamine platinum nitrate, barium acetate, potassium acetate, strontium acetate, magnesium acetate, and lanthanum acetate were weighed and mixed so that the Pt support amount was 6.0 g/L, the Ba support amount was 30 g/L, the K support amount was 10 g/L, the Sr support amount was 10 g/L, the Mg support amount was 10 g/L, and the La support amount was 10 g/L to prepare a mixed solution. In this example as well, Pt is supported in an amount of 0.5 g/L by the Pt—Rh/MFI catalyst powder of the outer coating layer and in an amount of 6.0 g/L by the mixed solution. Therefore, the total Pt support amount is 6.5 g/L.

EXAMPLE 11'

The catalyst was prepared by the same method and under the same conditions as in Example 1', except that aqueous solutions of dinitrodiamine platinum nitrate, rhodium nitrate, barium acetate, potassium acetate, strontium acetate, and magnesium acetate were weighed and mixed so that the Pt support amount was 6.5 g/L, the Rh support amount was 0.1 g/L, the Ba support amount was 30 g/L, the K support amount was 6 g/L, the Sr support amount was 10 g/L, and the Mg support amount was 10 g/L to prepare a mixed solution.

In this example, Pt is supported in an amount of 0.5 g/L by the Pt—Rh/MFI catalyst powder of the outer coating layer and in an amount of 6.5 g/L by the mixed solution. Therefore, the total Pt support amount is 7.0 g/L. Regarding Rh, Rh is supported in an amount of 0.006 g/L by the Pt—Rh/MFI catalyst powder of the outer coating layer and in an amount of 0.1 g/L by the mixed solution. Therefore, the total Rh support amount is 0.106 g/L.

Evaluation Test of the Catalysts

Method for Measuring the $NO_x$ Purification Ratio

A method for measuring the $NO_x$ purification ratio is as follows. Each catalyst was attached to a fixed floor flow-through reaction evaluation apparatus, and a simulated exhaust gas having a lean air-fuel ratio shown as gas composition A in Table 3 was passed through the catalyst until the $NO_x$ purification ratio became stable. Then, the simulated exhaust gas with its gas composition switched to one having a rich air-fuel ratio shown as gas composition B in Table 3 was passed through the catalyst for 3 minutes. Thus, $NO_x$ that were previously absorbed in the $NO_x$ storage materials were detached. Thereafter, the simulated exhaust gas was switched to the one having the gas composition A, and for 130 seconds from this point of switching, the $NO_x$ purification ratio (lean $NO_x$ purification ratio) was measured.

The temperature for measurement of the $NO_x$ purification ratio (the temperature of the gas at the inlet of the catalyst) was 350° C. or 450° C. The space velocity SV was 55000 $h^{-1}$ except in Example 11'. The space velocity SV in Example 11' was 25000 h-$^1$. The $NO_x$ purification ratio was measured with a fresh catalyst that has not been subjected to a deterioration treatment, a catalyst that has been subjected to a $SO_2$ treatment (sulfur poisoning deterioration treatment), a catalyst that has been subjected to a regeneration treatment after the $SO_2$ treatment, and a catalyst that has been subjected to a heat deterioration treatment. The $SO_2$ treatment, the regeneration treatment, the heat deterioration treatment were performed under the following conditions.

$SO_2$ Treatment

The $SO_2$ treatment was performed by passing a simulated exhaust gas having a gas composition C shown in Table 3 through the catalyst attached to a fixed floor flow-through reaction evaluation apparatus for 60 minutes. The temperature of the gas at the inlet of the catalyst was 350° C. The space velocity SV was 55000 $h^{-1}$.

Regeneration Treatment

The regeneration treatment was performed by switching three kinds of simulated exhaust gases shown in Table 4 as appropriate and passing the simulated exhaust gases through the catalyst attached to a fixed floor flow-through reaction evaluation apparatus for 10 minutes. In this case, switching of the simulated gases was performed so that the gas composition was changed in the order of 1. A/F=14.7→2. A/F=13.8→3. A/F=14.7 →4. A/F=15.6 (→1 A/F=14.7) with a cycle of 1 second. The temperature of the gas at the inlet of the catalyst was 600° C. The space velocity SV was 120000 $h^{-1}$.

Heat Deterioration Treatment

The heat deterioration treatment was to allow the catalyst to be heated at 900° C. in an ambient atmosphere for 24 hours.

TABLE 3

| | Gas composition A Lean | Gas composition B Rich | Gas composition C $SO_2$ treatment |
|---|---|---|---|
| $HC(C_3H_6)$ | 4000 ppm | 4000 ppm | — |
| NO | 250 ppm | 250 ppm | — |
| CO | 0.15% | 0.15% | — |
| $CO_2$ | 10% | 10% | — |
| $H_2$ | 650 ppm | 650 ppm | — |
| $O_2$ | 7% | 0.5% | 20% |
| $H_2O$ | 10% | 10% | — |
| $SO_2$ | — | — | 50 ppm |
| $N_2$ | the remaining | the remaining | the remaining |

TABLE 4

| | Regeneration treatment | | |
|---|---|---|---|
| Component | A/F = 14.7 | A/F = 13.8 | A/F = 15.6 |
| $HC(C_3H_6)$ | 560 ppm | 560 ppm | 560 ppm |
| NO | 1000 ppm | 1000 ppm | 1000 ppm |
| CO | 0.60% | 2.60% | 0.60% |
| $CO_2$ | 13.90% | 13.90% | 13.90% |
| $H_2$ | 0.20% | 0.90% | 0.20% |
| $O_2$ | 0.600% | 0.600% | 1.9% |
| $H_2O$ | 10% | 10% | 10% |
| $SO_2$ | — | — | — |
| $N_2$ | the remaining | the remaining | the remaining |

Figure 26:
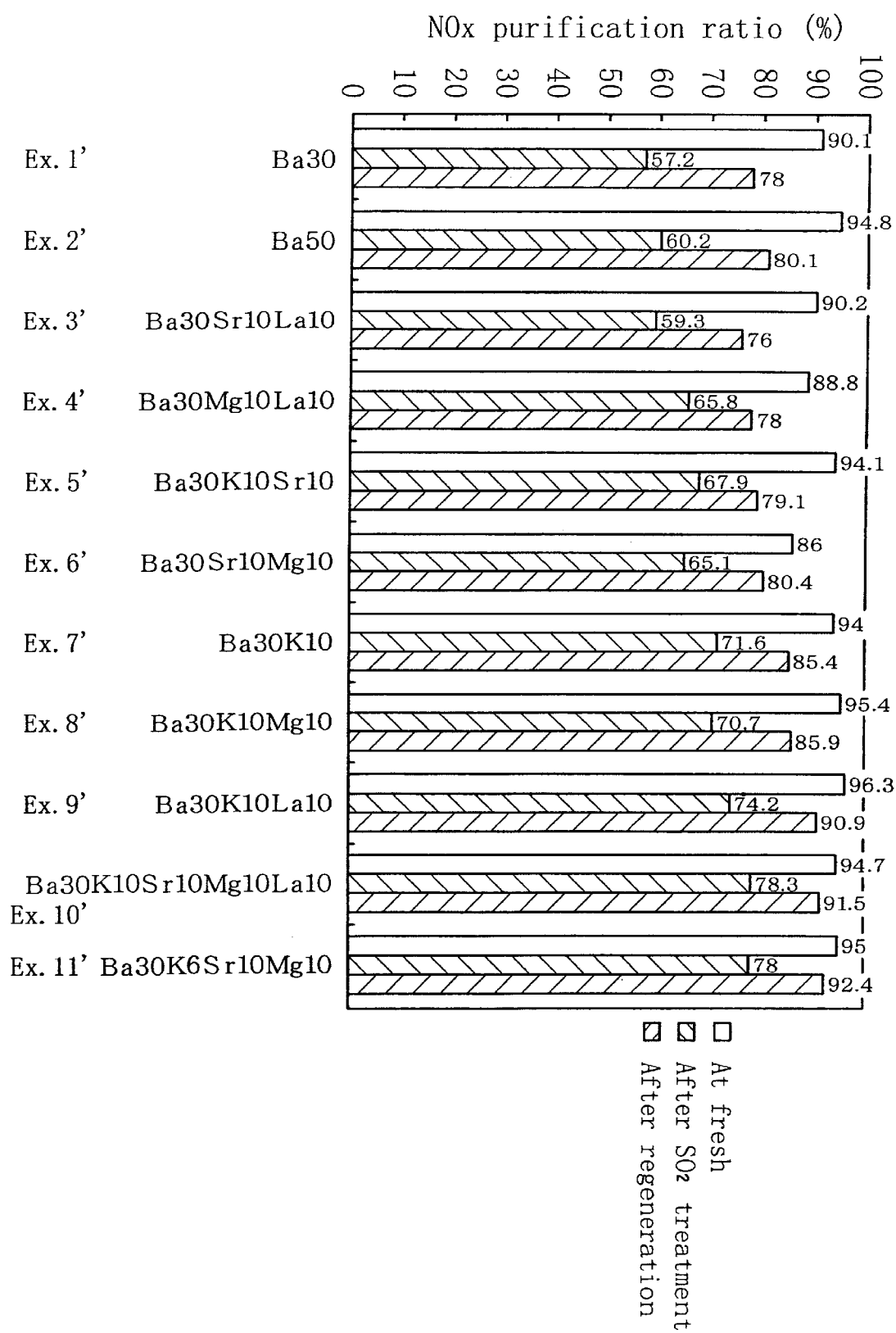
FIG. 26 is a graph showing the effects of different $NO_x$ storage materials on the $NO_x$ purifying ratio when the catalysts are fresh, after a sulfur poisoning treatment is performed, and after a regeneration treatment is performed.

FIG. 26 shows the results of the measurement of the $NO_x$ purification ratios when the catalysts are fresh, after the $SO_2$ treatment, and after the regeneration treatment after the $SO_2$ treatment (where the gas temperature at the inlet of the catalyst was 350° C. in all the cases). According to FIG. 26, there is no significant difference in the $NO_x$ purification ratio between the catalysts when they are fresh. However, regarding the $NO_x$ purification ratio after the $SO_2$ treatment, Examples 3' to 11' where other elements (at least one of K, Sr, Mg and La) were used together with Ba have higher ratios than those of Examples 1' and 2' where the $NO_x$ storage material is constituted only by Ba. In particular, this tendency is significant in the examples that contain K. On the other hand, regarding the $NO_x$ purification ratio after the regeneration treatment, the examples that contain K tend to have high ratios except Example 5', and this tendency is significant in the examples that contain Mg or La in addition to K.

Figure 27:
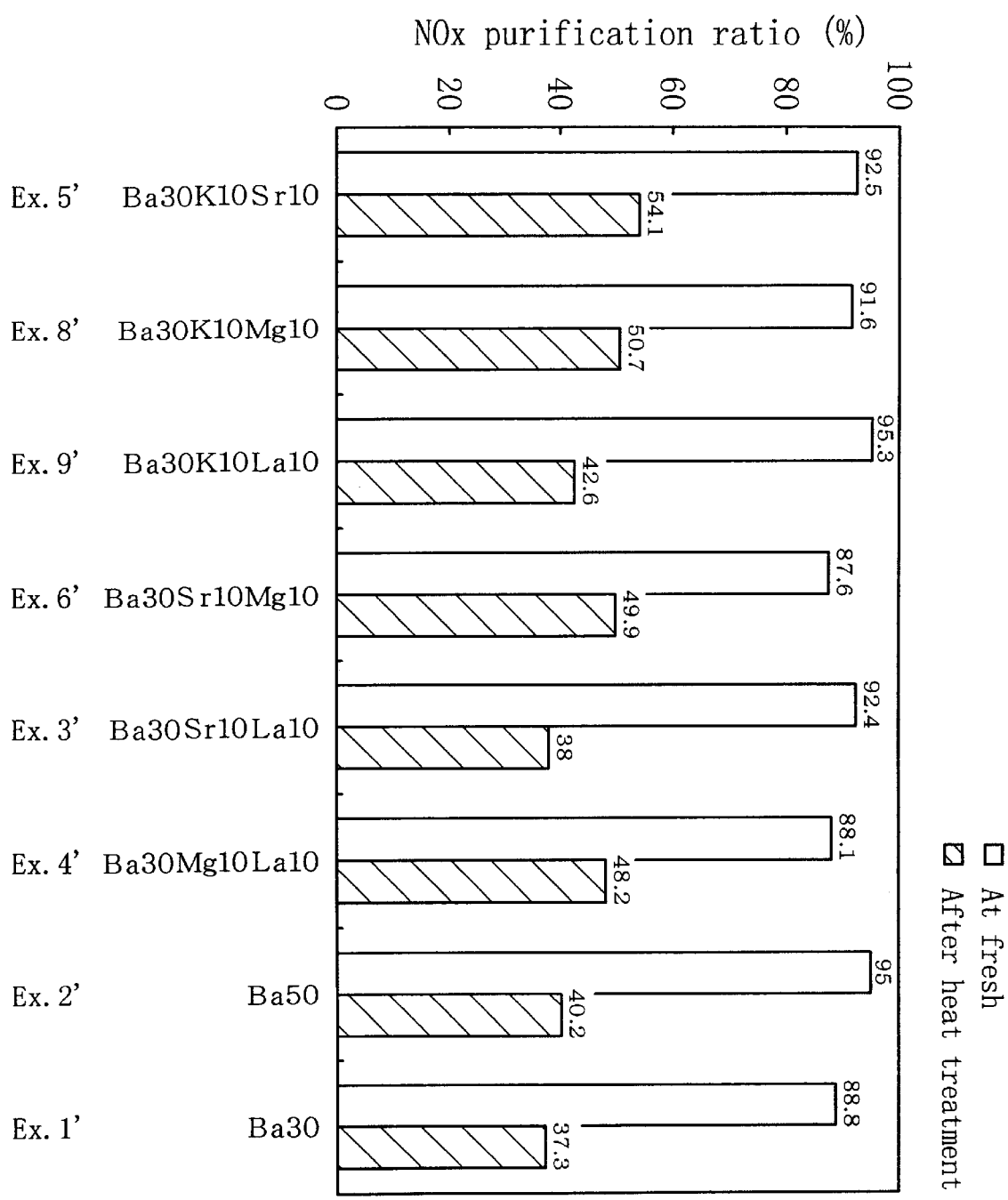
FIG. 27 is a graph showing the $NO_x$ purifying ratio of the catalysts with different $NO_x$ storage materials at a gas temperature at the catalyst inlet of 350° C. when the catalysts are fresh and after a heat deterioration treatment is performed.
Figure 28:
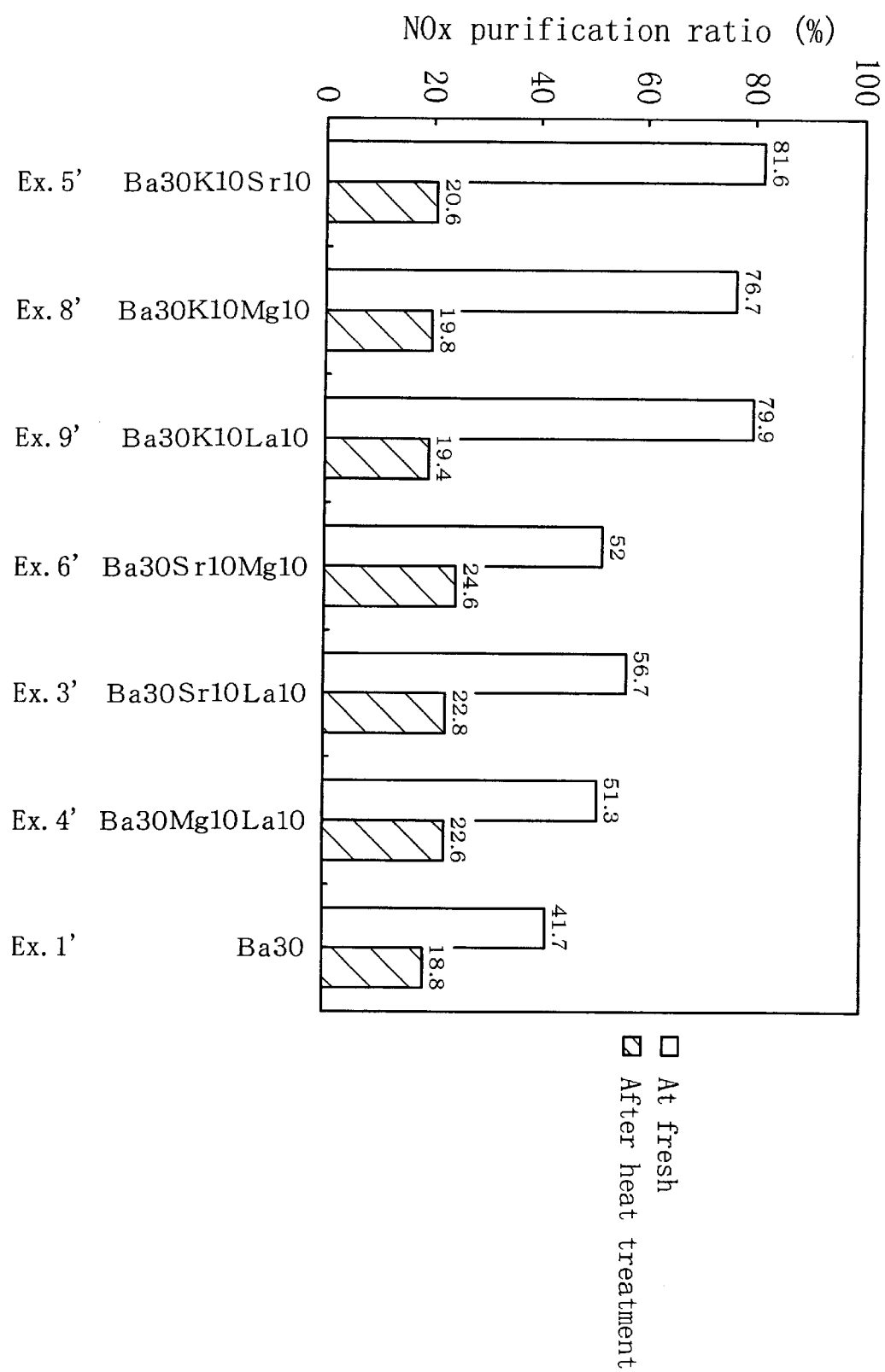
FIG. 28 is a graph showing the $NO_x$ purifying ratio of the catalysts with different $NO_x$ storage materials at a gas temperature at the catalyst inlet of 450° C. when the catalysts are fresh and after a heat deterioration treatment is performed.

FIG. 27 shows the $NO_x$ purification ratios when the catalyst is fresh and after the heat treatment (heat deterioration treatment) when the gas temperature at the inlet of the catalyst was 350° C. According to FIG. 27, although there are no significant effects on the sulfur poisoning resistance ($NO_x$ purification characteristics after the regeneration treatment), Examples 3' to 6' tend to have higher $NO_x$ purification ratios after the heat treatment. In particular, this tendency is significant in Example 5'. This tendency applies to the $NO_x$ purifications when the catalyst is fresh and after heat treatment (heat deterioration treatment) when the gas temperature at the inlet of the catalyst was 450° C., which is shown in FIG. 28. Thus, although there are no significant effects on the sulfur poisoning resistance in Examples 3' to 6', excellent effects on the heat resistance were exhibited. It can be said that Examples 3' to 6' are advantageous for maintaining the $NO_x$ absorption ability by the regeneration treatment, in view of the fact that the regeneration treatment is performed at a relatively high temperature.

Furthermore, according to FIG. 28, Examples 5', 8' and 9', which contain K in addition to Ba, and further contain at least one of Sr, Mg and La, have high $NO_x$ purification ratios at 450° C. when they are fresh. This means that it is possible to drive at a lean air-fuel ratio without significantly emitting $NO_x$, even if the temperature of the exhaust gas is high, such as high-speed driving. [Ba—K—Sr based $NO_x$ Storage Materials]

Catalysts were prepared by the same method and under the same conditions as in Example 1', except that aqueous solutions of dinitrodiamine platinum nitrate, rhodium nitrate, barium acetate, potassium acetate, and strontium acetate were weighed and mixed so that the Pt support amount was 3.0 g/L, the Rh support amount was 0.1 g/L, the Ba support amount was 30 g/L, the K support amount was 6 g/L, the Sr support amount was 0 g/L, 5 g/L, 10 g/L, 15 g/L, 20 g/L and 30 g/L to prepare mixed solutions.

In this example, Pt is supported in an amount of 0.5 g/L by the Pt—Rh/MFI catalyst powder of the outer coating layer and in an amount of 3.0 g/L by the mixed solution. Therefore, the total Pt support amount is 3.5 g/L. Rh is supported in an amount of 0.006 g/L by the Pt—Rh/MFI catalyst powder and in an amount of 0.1 g/L by the mixed solution. Therefore, the total Rh support amount is 0.106 g/L.

For comparison, a comparative catalyst was prepared by the same method and under the same conditions as in Example 1', except that aqueous solutions of dinitrodiamine platinum nitrate, rhodium nitrate, and barium acetate were weighed and mixed so that the Pt support amount was 3.0 g/L, the Rh support amount was 0.1 g/L, and the Ba support amount was 30 g/L (the K support amount was 0, the Sr support amount was 0) to prepare mixed solutions. In this comparative catalyst as well, the total Pt support amount is 3.5 g/L, and the total Rh support amount is 0.106 g/L.

Figure 29:
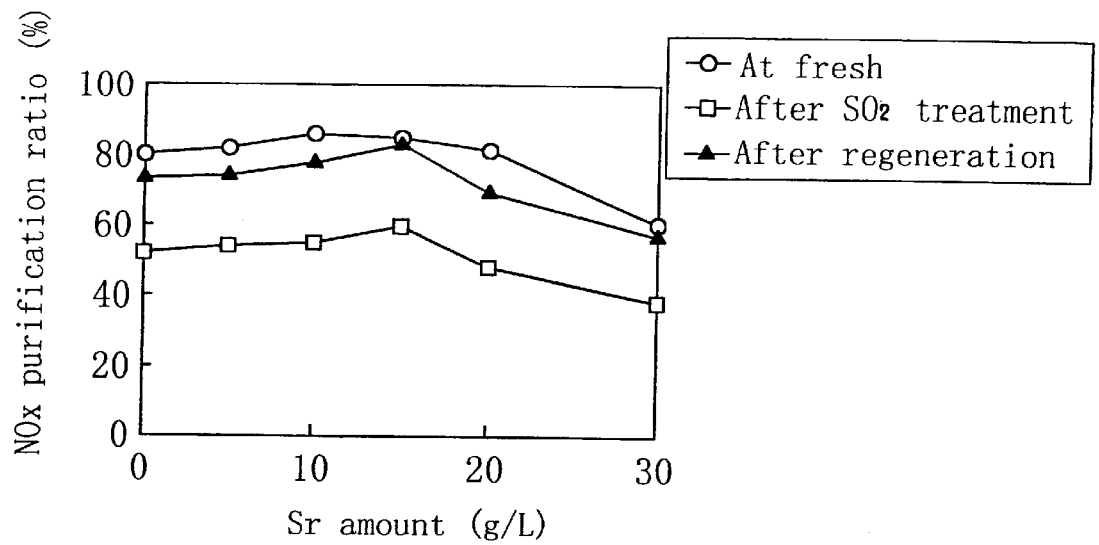
FIG. 29 is a graph showing the effects of the Sr support amount on the $NO_x$ purifying ratio when the catalysts are fresh, after a sulfur poisoning treatment is performed, and after a regeneration treatment is performed, regarding a catalyst with Ba—K—Sr based-$NO_x$ storage material.

The $NO_x$ purification ratios of the catalysts having varied Sr support amounts and the comparative catalyst were measured in the same manner as in the previously described evaluation test when they were fresh, after the $SO_2$ treatment and after the regeneration treatment. FIG. 29 shows the results of the catalysts with varied Sr support amounts. According to FIG. 29, when Sr is supported, the $NO_x$ purification ratios after the regeneration treatment are higher than those in no Sr support amount. However, when the support amount is 20 g/L or more, the $NO_x$ purification ratios after the regeneration treatment are deteriorated. A preferable Sr support amount is at least 5 g/L and less than 20 g/L, or at least 10 g/L and less than 20 g/L, most preferably, 15 g/L. Therefore, the range from 13 g/L to 17 g/L is advantageous for keeping the $NO_x$ purification ratio after regeneration treatment high.

Furthermore, for the comparative catalyst, the $NO_x$ purification ratio when the catalyst is fresh is 72%, the $NO_x$ purification ratio after the $SO_2$ treatment is 41%, and the $NO_x$ purification ratio after the regeneration treatment is 63%. Therefore, when K and Sr, in addition to Ba, are supported, until the Sr support amount reaches 20 g/L, all the $NO_x$ purification ratios when the catalyst is fresh, after the $SO_2$ treatment and after the regeneration treatment are higher than those of the comparative catalyst, which contains only Ba.

Figure 30:
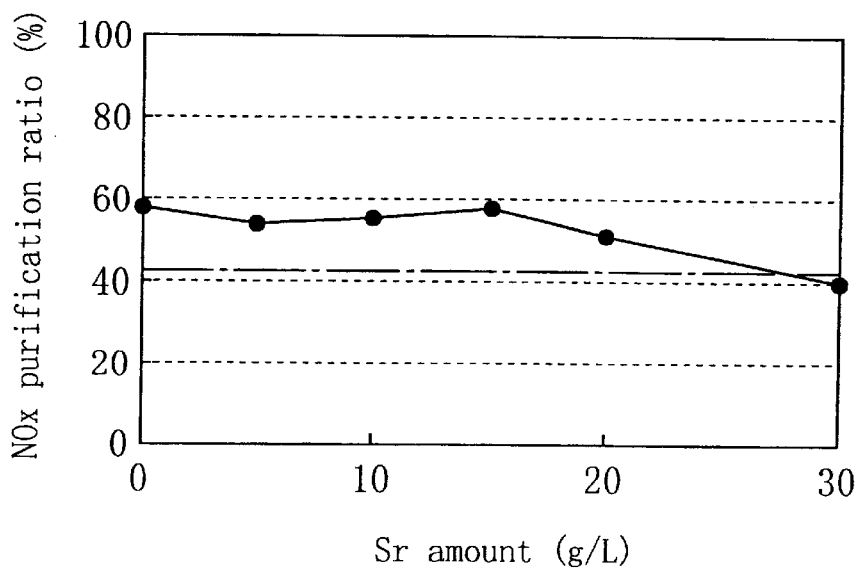
FIG. 30 is a graph showing the effects of the Sr support amount on the heat resistance of a catalyst with Ba—K—Sr based-$NO_x$ storage material.

FIG. 30 shows the results of measurement of the $NO_x$ purification ratios of the catalysts having varied Sr support amounts and the comparative catalyst after the heat deterioration treatment as previously described. The dotted broken line in FIG. 30 indicates the $NO_x$ purification ratio of the comparative catalyst. The space velocity was 25000 $h^{-1}$. According to FIG. 30, when the Sr support amount is 30 g/L or more, the heat resistance of the catalyst becomes lower than that of the comparative catalyst. However, the heat resistance is improved at a support amount of less that 30 g/L. This is advantageous for regeneration. [Ba—K—Mg Based $NO_x$ Storage Materials]

The catalysts were prepared by the same method and under the same conditions as in Example 1', except that aqueous solutions of dinitrodiamine platinum nitrate, rhodium nitrate, barium acetate, potassium acetate, and magnesium acetate were weighed and mixed so that the Pt support amount was 3.0 g/L, the Rh support amount was 0.1 g/L, the Ba support amount was 30 g/L, the K support amount was 6 g/L, the Mg support amount was 0 g/L, 5 g/L, 10 g/L, 15 g/L, and 20 g/L to prepare mixed solutions. In this example as well, the total Pt support amount is 3.5 g/L, and the total Rh support amount is 0.106 g/L.

Figure 31:
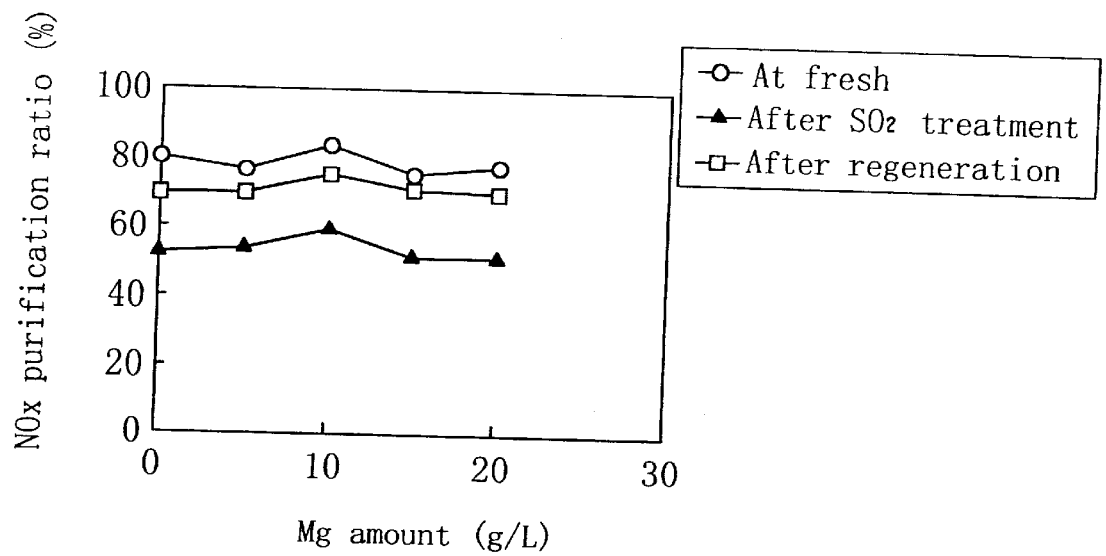
FIG. 31 is a graph showing the effects of the Mg support amount on the $NO_x$ purifying ratio when the catalysts are fresh, after a sulfur poisoning treatment is performed, and after a regeneration treatment is performed, regarding a catalyst with Ba—K—Mg based-$NO_x$ storage material.

The $NO_x$ purification ratios of the catalysts having varied Mg support amounts were measured in the same manner as in the previously described evaluation test when they were fresh, after the $SO_2$ treatment and after the regeneration treatment. FIG. 31 shows the results thereof. According to FIG. 31, when Mg is supported, the $NO_x$ purification ratios after the regeneration treatment are higher than those in no Mg support amount. When the support amount is 10 g/L, the $NO_x$ purification ratio after the regeneration treatment is highest. Support amounts of Mg of 3 g/L to 17 g/L, or 5 g/L to 15 g/L are advantageous for keeping the $NO_x$ purification ratio after regeneration treatment high.

Furthermore, for the comparative catalyst (which has been described in the above item of Ba—K—Sr based $NO_x$ storage material), the $NO_x$ purification ratio when the catalyst is fresh is 72%, the $NO_x$ purification ratio after the $SO_2$ treatment is 41%, and the $NO_x$ purification ratio after the regeneration treatment is 63%. Therefore, when K and Mg, in addition to Ba, are supported, all the $NO_x$ purification ratios when the catalyst is fresh, after the $SO_2$ treatment and after the regeneration treatment are higher than those of the comparative catalyst, which contains only Ba.

Figure 32:
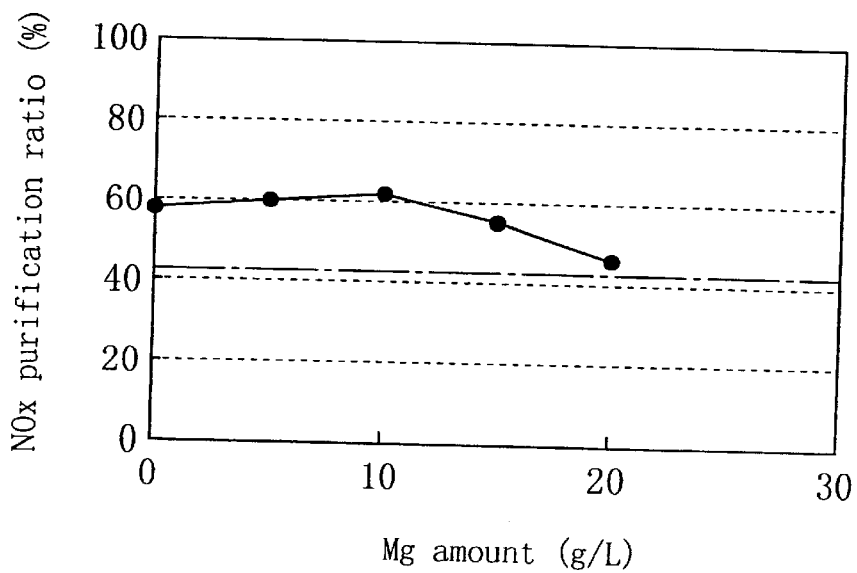
FIG. 32 is a graph showing the effects of the Mg support amount on the heat resistance of a catalyst with Ba—K—Mg based-$NO_x$ storage material.

FIG. 32 shows the results of measurement of the $NO_x$ purification ratios of the catalysts having varied Mg support amounts and the comparative catalyst after the heat deterioration treatment as previously described. The dotted broken line in FIG. 32 indicates the $NO_x$ purification ratio of the comparative catalyst. The space velocity was 25000 $h^{-1}$. According to FIG. 32, up to a Mg support amount of 20 g/L, the heat resistance of the catalyst is improved. This is advantageous for regeneration. [Ba—K—Sr—Mg Based $NO_x$ Storage Materials]

Catalysts were prepared by the same method and under the same conditions as in Example 1', except that aqueous solutions of dinitrodiamine platinum nitrate, rhodium nitrate, barium acetate, potassium acetate, strontium acetate and magnesium acetate were weighed and mixed so that the Pt support amount was 3.0 g/L, the Rh support amount was 0.1 g/L, the Ba support amount was 30 g/L, the K support amount was 6 g/L, the Mg support amount was 5 g/L and the Sr support amount was varied to prepare mixed solutions. Furthermore, catalysts were prepared with a Mg support amount of 10 g/L and varied Sr support amounts. Furthermore, catalysts were prepared with a Mg support amount of 15 g/L and varied Sr support amounts. In these catalysts as well, the total Pt support amount is 3.5 g/L, and the total Rh support amount is 0.106 g/L.

Furthermore, catalysts were prepared by the same method and under the same conditions as in Example 1', except that aqueous solutions of dinitrodiamine platinum nitrate, rhodium nitrate, barium acetate, potassium acetate, strontium acetate and magnesium acetate were weighed and mixed so that the Pt support amount was 3.0 g/L, the Rh support amount was 0.1 g/L, the Ba support amount was 30 g/L, the K support amount was 6 g/L, the Sr support amount was 10 g/L and the Mg support amount was varied to prepare mixed solutions.

Figure 33:
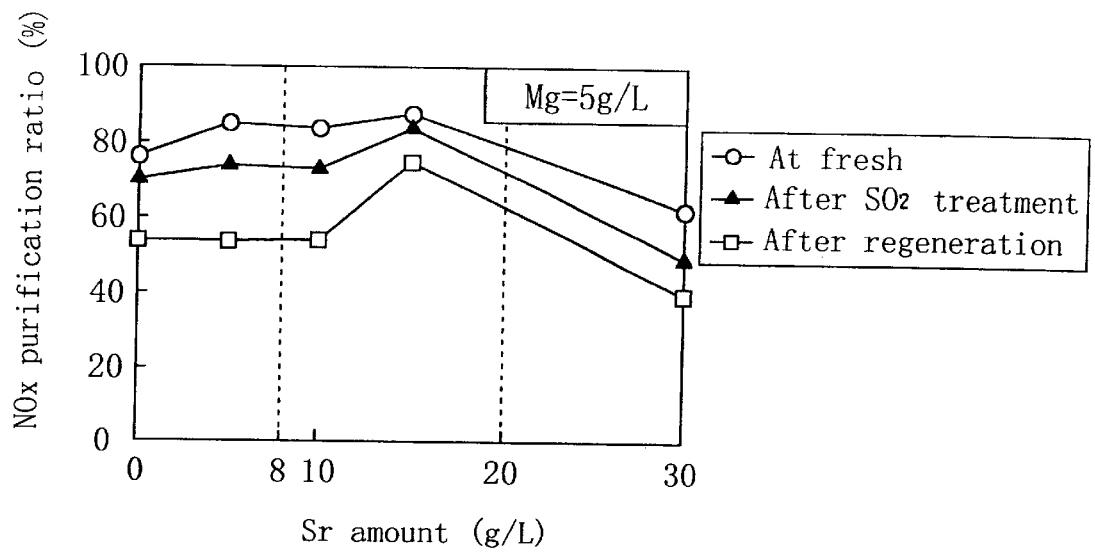
FIG. 33 is a graph showing the effects of the Sr support amount on the $NO_x$ purifying ratio, when the catalysts are fresh, after a sulfur poisoning treatment is performed, and after a regeneration treatment is performed, regarding a catalyst with Ba—K—Sr—Mg based-$NO_x$ storage material in a Mg support amount of 5 g/L.
Figure 34:
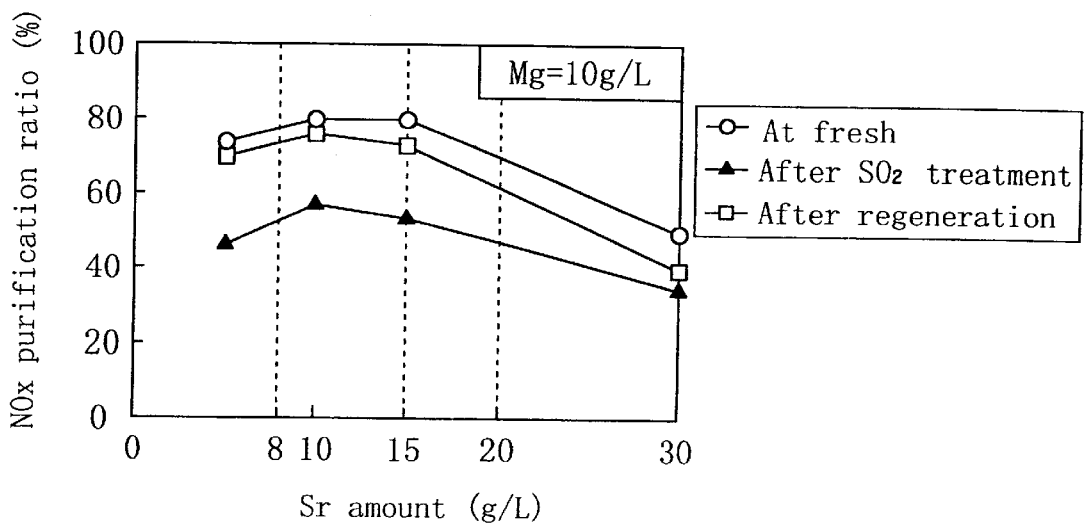
FIG. 34 is a graph showing the effects of the Sr support amount on the $NO_x$ purifying ratio, when the catalysts are fresh, after a sulfur poisoning treatment is performed, and after a regeneration treatment is performed, regarding a catalyst with Ba—K—Sr—Mg based-$NO_x$ storage material in a Mg support amount of 10 g/L.
Figure 35A:
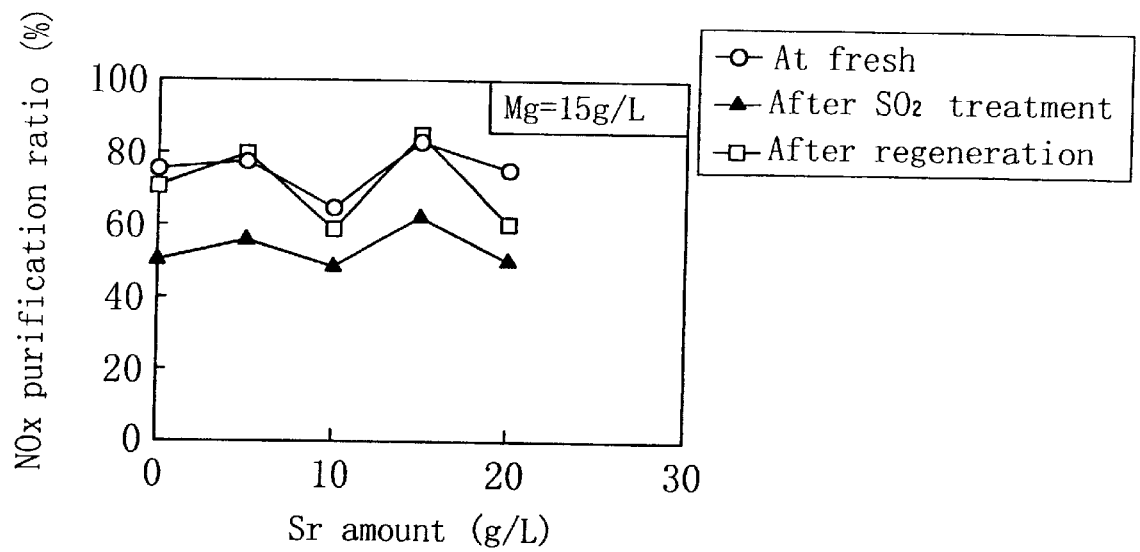
FIG. 35A is a graph showing the effects of the Sr support amount on the $NO_x$ purifying ratio, when the catalysts are fresh, after a sulfur poisoning treatment is performed, and after a regeneration treatment is performed, regarding a catalyst with Ba—K—Sr—Mg based-$NO_x$ storage material in a Mg support amount of 15 g/L.
Figure 35B:
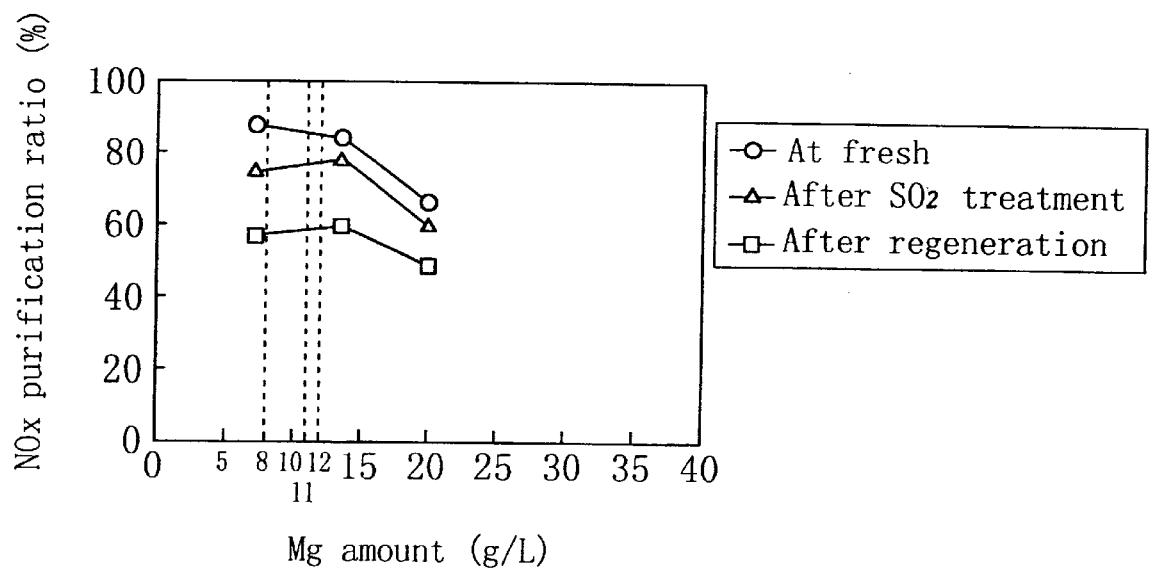
FIG. 35B is a graph showing the effects of the Mg support amount on the $NO_x$ purifying ratio, when the catalysts are fresh, after a sulfur poisoning treatment is performed, and after a regeneration treatment is performed, regarding a catalyst with Ba—K—Sr—Mg based-$NO_x$ storage material in a Sr support amount of 10 g/L.

The $NO_x$ purification ratios of the catalysts having varied support amounts of Mg and Sr were measured in the same manner as in the previously described evaluation test when the catalysts were fresh, after the $SO_2$ treatment and after the regeneration treatment. FIG. 33 shows the results when the Mg support amount was 5 g/L. FIG. 34 shows the results when the Mg support amount was 10 g/L. FIG. 35A shows the results when the Mg support amount was 15 g/L. FIG. 35B shows the results when the Mg support amount was varied and the Sr support amount was 10 g/L.

According to FIG. 33, in the Mg support amount of 5 g/L, when the Sr support amount is 15 g/L, the $NO_x$ purification ratio after regeneration is highest, and the regeneration ratio of the $NO_x$ purification ratio from $SO_2$ poisoning is high. According to FIG. 34, in the Mg support amount of 10 g/L, when the Sr support amount is 10 g/L, the $NO_x$ purification ratio after regeneration is highest, and the regeneration ratio of the $NO_x$ purification ratio from $SO_2$ poisoning is high. Also when the Sr support amount is 5 g/L, the regeneration ratio of the $NO_x$ purification ratio from $SO_2$ poisoning is high. According to FIG. 35A, when the Mg support amount is 15 g/L, the regeneration ratio of the $NO_x$ purification ratio from $SO_2$ poisoning is high in any Sr support amount of 5 g/L to 15 g/L. According to FIG. 35B, in the Sr support amount of 10 g/L, when the Mg support amount is about 10 g/L, the $NO_x$ purification ratios after $SO_2$ treatment and after regeneration are high.

Thus, when Sr and Mg are used together with Ba and K, even if the Sr support amount is small, the regeneration ratio of the $NO_x$ purification ratio from sulfur poisoning can be high.

Furthermore, for the comparative catalyst (which has been described in the above item of Ba—K—Sr based $NO_x$ storage material), the $NO_x$ purification ratio when the catalyst is fresh is 72%, the $NO_x$ purification ratio after the $SO_2$ treatment is 41%, and the $NO_x$ purification ratio after the regeneration treatment is 63%. Therefore, when K, Sr and Mg, in addition to Ba, are supported, all the $NO_x$ purification ratios when the catalyst is fresh, after the $SO_2$ treatment and after the regeneration treatment are higher than those of the comparative catalyst, which contains only Ba as the $NO_x$ storage material.

Figure 36:
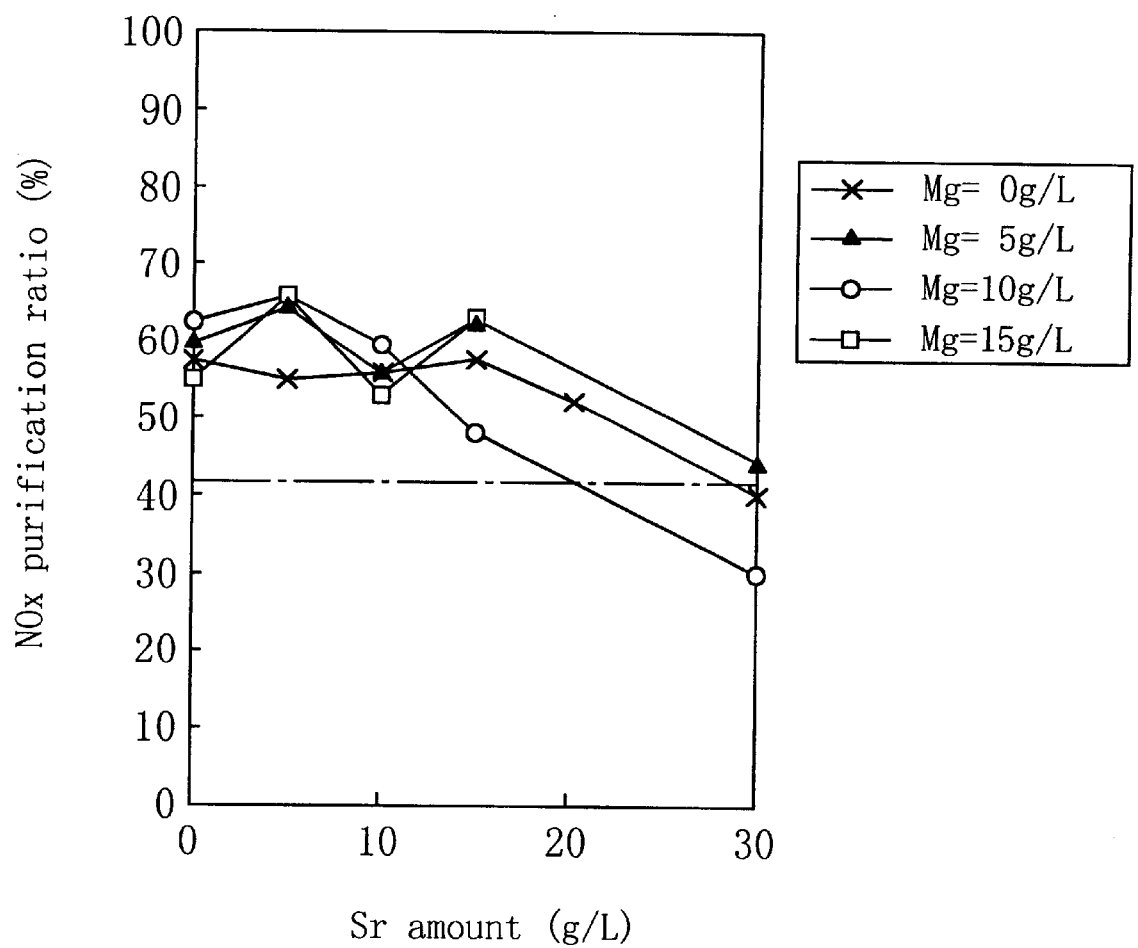
FIG. 36 is a graph showing the effects of the Mg support amount and the Sr support amount on the heat resistance of a catalyst with Ba—K—Sr—Mg based-$NO_x$ storage material.

FIG. 36 shows the results of measurement of the $NO_x$ purification ratios of the catalysts having varied support amounts of Mg and Sr and the comparative catalyst after the heat deterioration treatment as previously described. The dotted broken line in FIG. 36 indicates the $NO_x$ purification ratio of the comparative catalyst. The space velocity was 25000 $h^{-1}$. According to FIG. 36, when Sr and Mg are used in addition to Ba and K, the heat resistance of the catalyst is improved. This is advantageous for regeneration. However, too excessive support amounts of Sr and Mg may be disadvantageous for improving the heat resistance.

The above results indicate that when the Sr support amount is 8 to 20 g/L (preferably, 8 to 15 g/L) and the Mg support amount is 8 to 12 g/L (preferably, 8 to 11 g/L), the sulfur poisoning resistance, and the heat resistance and the regeneration properties from sulfur poisoning are good.

Figure 37:
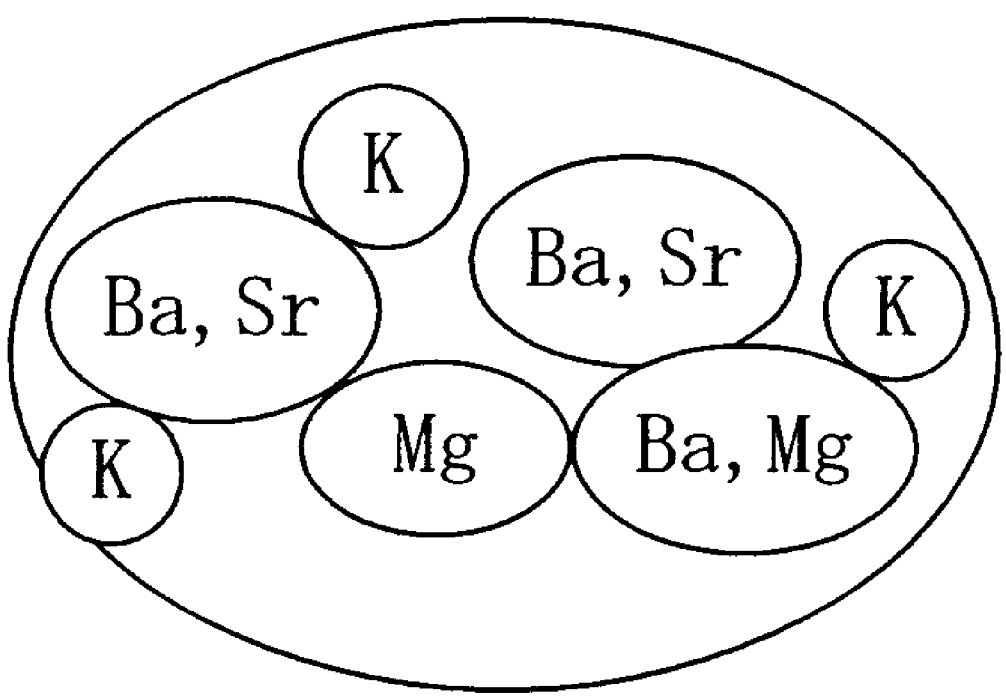
FIG. 37 is a schematic model diagram showing a state of the catalytic layer of Ba—K—Sr—Mg based-$NO_x$ storage material.

FIG. 37 schematically shows the state of the presence in the catalytic layer of the Ba—K—Sr—Mg based $NO_x$ storage material. It seems that a part of Ba and a part of Sr supported in the inner and outer coating layers form a compound (a mixed oxide or a double salt) constituted by Ba and Sr. It seems that a part of Ba and a part of Mg come close and are combined to be nearly amorphous. It seems that K is not combined with or not be compatible with Ba, Sr or Mg, and is dispersed around the Ba—Sr compound or the Ba—Mg coexisting substance.

It seems that the Ba—Sr compound (hereinafter, referred to as a double compound, if necessary) is less susceptible to sulfur poisoning than Ba alone, so that deterioration of the $NO_x$ absorption ability can be suppressed. It seems that the Ba—Mg coexisting substance suppresses sulfur poisoning of Ba (production of barium sulfate) than Ba alone, so that deterioration of the $NO_x$ absorption ability can be suppressed. It seems that K is relatively highly reactive with sulfur, so that when K surrounds the Ba—Sr compound or the Ba—Mg coexisting substance and prevents the Ba—Sr compound or the Ba—Mg coexisting substance from being sulfur-poisoned. [Support Amount of K]

The effect of the K support amount on the sulfur poisoning resistance, the regeneration properties from sulfur poisoning, and the heat resistance was examined.

More specifically, aqueous solutions of dinitrodiamine platinum nitrate, rhodium nitrate, barium acetate, potassium acetate, strontium acetate, and magnesium acetate were weighed and mixed so that the Pt support amount was 6.5 g/L, the Rh support amount was 0.1 g/L, the Ba support amount was 30 g/L, the Sr support amount was 10 g/L, and the Mg support amount was 10 g/L and the K support amount was 2 g/L, 6 g/L, 15 g/L and 30 g/L to prepare solutions for impregnation.

γ-alumina, Ce—Zr—Sr mixed oxide ($CeO_2 \cdot ZrO_2 \cdot SrO$ mixed oxide, the mass ratio of the three elements of Ce:Zr:Sr=75:25:1) and an alumina binder were weighed and mixed so that the support amount of γ-alumina was 160 g/L and the support amount of the Ce—Zr—Sr mixed oxide was 160 g/L, and the support amount of the binder was 30 g/L. Then, ion exchanged water was added thereto to prepare slurry.

A honeycomb carrier was wash-coated with a half amount of the slurry, and dried and calcined to form an inner coating layer. Then, the inner coating layer was wash-coated with the other half of the amount of the slurry, and dried and calcined in the same manner to form an outer coating layer. Thereafter, the inner coating layer and the outer coating layer were impregnated with each of the above obtained solutions and dried and calcined so that catalysts having different K support amounts were obtained.

Figure 38:
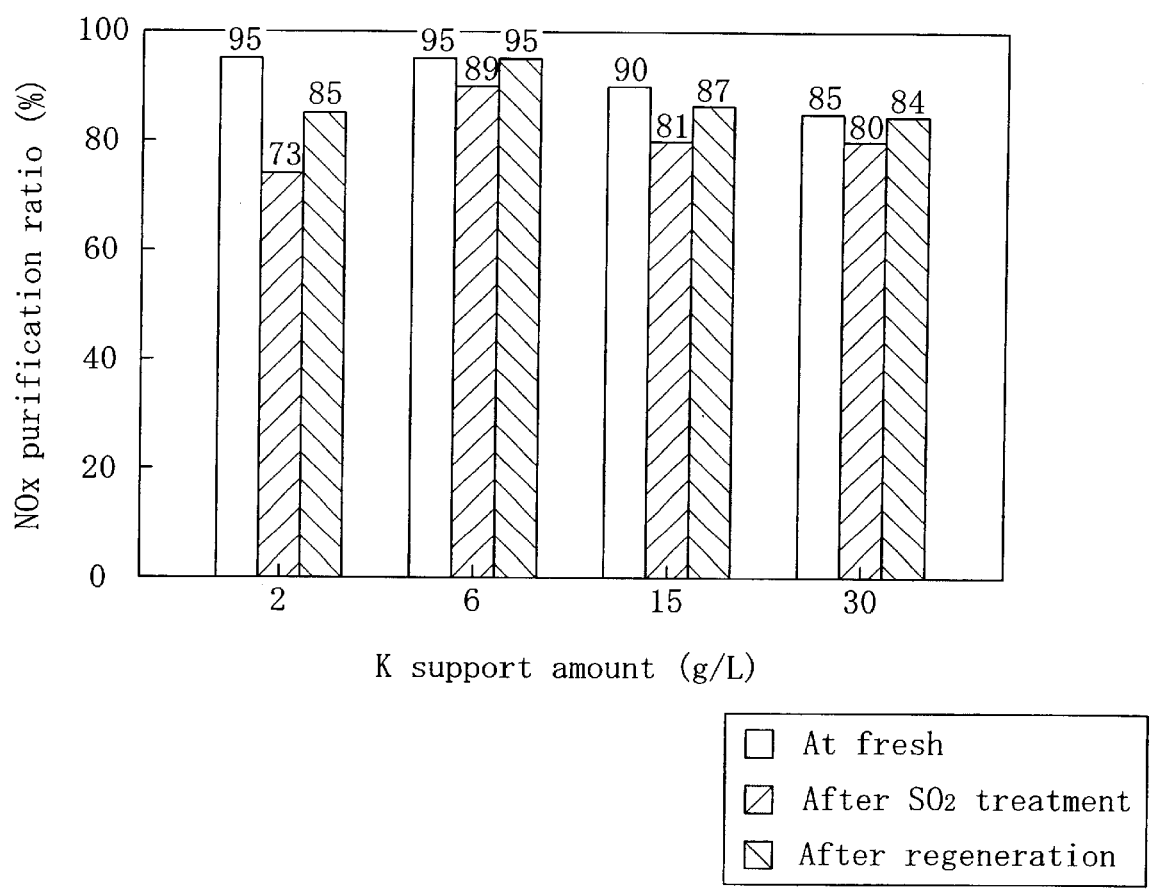
FIG. 38 is a graph showing the effects of the K support amount on the sulfur poisoning resistance and the regeneration properties from the sulfur poisoning of the catalyst.
Figure 39:
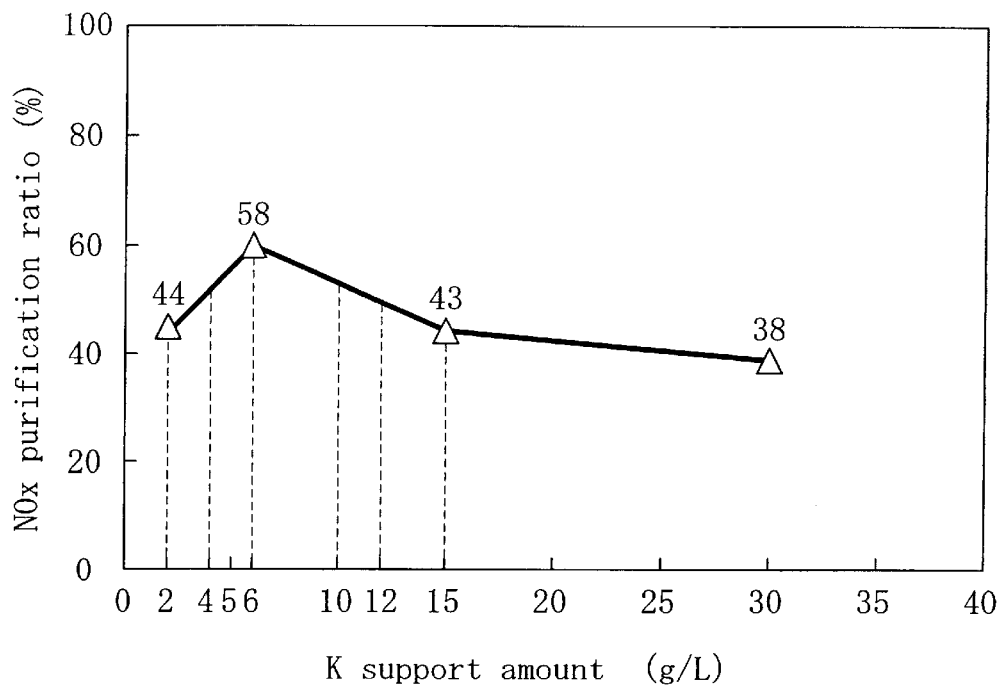
FIG. 39 is a graph showing the effects of the K support amount on the heat resistance of the catalyst (the $NO_x$ purifying ratio at a measurement temperature of 350° C.).
Figure 40:
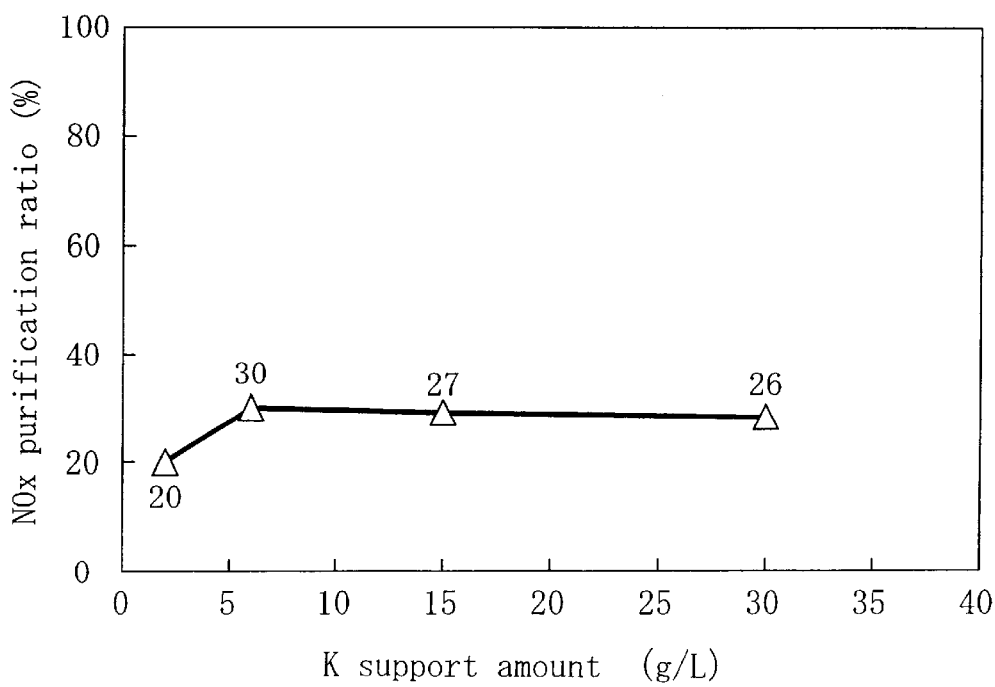
FIG. 40 is a graph showing the effects of the K support amount on the heat resistance of the catalyst (the $NO_x$ purifying ratio at a measurement temperature of 450° C.).

The $NO_x$ purification ratios of the catalysts when the catalysts were fresh, after the $SO_2$ treatment, and after the regeneration treatment after the $SO_2$ treatment were measured in the same manner as the $NO_x$ purification ratios described above. In this case, the temperature at which the $NO_x$ purification ratios were measured (the gas temperature at the inlet of the catalyst) was 350° C. FIG. 38 shows the results. Furthermore, the $NO_x$ purification ratios after the heat deterioration treatment were measured in the same manner as the $NO_x$ purification ratios described above. FIG. 39 shows the results when the temperature at which the $NO_x$ purification ratios were measured (the gas temperature at the inlet of the catalyst) was 350° C. FIG. 40 shows the results when the temperature at which the $NO_x$ purification ratios were measured was 450° C.

According to FIG. 38, the $NO_x$ purification ratio when the catalyst is fresh is high when the K support amount is 2 g/L and 6 g/L. However, when the amount is increased, such as 15 g/L and 30 g/L, the purification ratio is decreased. The results indicate that it is not preferable that the K support amount is 15 g/L or more.

The $NO_x$ purification ratio after $SO_2$ treatment is at the peak at a K support amount of 6 g/L, and the amount is further increased, the purification ratio is decreased. This decrease corresponds to the decrease of the $NO_x$ purification ratio when the catalyst is fresh, and a decrease of the $NO_x$ purification ratio due to sulfur poisoning is small. This indicates that K is effective for improving the sulfur poisoning resistance.

On the other hand, when the K support amount is 2 g/L, the $NO_x$ purification ratio after $SO_2$ treatment is low, but the $NO_x$ purification ratio after regeneration treatment is high. Therefore, it is preferable that the K support amount is 2 g/L or more.

According to FIG. 39 (the $NO_x$ purification ratio after heat deterioration treatment at a measurement temperature of 350° C.), the $NO_x$ purification ratio is at the peak in a K support amount of 6 g/L. This indicates that K is effective for improving the heat resistance of the catalyst. When the amount is increased, such as 15 g/L and 30 g/L, the purification ratio after heat deterioration treatment is decreased. This seems to correspond to the decrease of the $NO_x$ purification ratio when the catalyst is fresh (see FIG. 38). Such an effect of K on the heat resistance can be seen in FIG. 40 (the $NO_x$ purification ratio after heat deterioration treatment at a measurement temperature of 450° C.), although it is not significant.

The results above indicate that it is preferable that the K support amount is 2 to 15 g/L, more preferably 2 to 12 g/L, even more preferably 4 to 10 g/L.

Other examples for examining the effect of the K support amount on the performance of the catalyst will be described.

Catalysts were prepared by the same method and under the same conditions as in Example 1' described above, except that aqueous solutions of dinitrodiamine platinum nitrate, barium acetate and potassium acetate were weighed and mixed so that the Pt support amount was 6.0 g/L, the Ba support amount was 30 g/L and the K support amount was 0 g/L, 2 g/L, 4 g/L, 6 g/L, 8 g/L, 10 g/L, and 30 g/L to prepare mixed solutions, and these mixed solutions were used for impregnation.

The catalysts were heated in an ambient atmosphere at 900° C. for 24 hours. Thereafter, each catalyst was attached to a fixed floor flow-through reaction evaluation apparatus, and first a simulated exhaust gas having a lean air-fuel ratio (gas composition A in Table 1) was passed through the catalyst until the $NO_x$ purification ratio became stable. Then, the simulated exhaust gas with the gas composition switched to one having a rich air-fuel ratio (gas composition B in Table 3) was passed through the catalyst. Three minutes later, the gas composition was switched again to the lean air-fuel ratio (gas composition A), and for 130 seconds from this point of switching, the $NO_x$ purification ratio (lean $NO_x$ purification ratio) was measured. The temperature of the catalyst and the temperature of the simulated exhaust gas were 350° C. The space velocity SV was 25000 $h^{-1}$.

The catalysts were heated in an ambient atmosphere at 900° C. for 24 hours as in the case of measurement of the $NO_x$ purification ratio. Thereafter, each catalyst was attached to a fixed floor flow-through reaction evaluation apparatus, and first a simulated exhaust gas having a lean air-fuel ratio (gas composition A) was passed through the catalyst until the $NO_x$ purification ratio became stable. Then, the simulated exhaust gas with the gas composition switched to one having a rich air-fuel ratio (gas composition B) was passed through the catalyst. Three minutes later, the gas composition was switched again to the lean air-fuel ratio (gas composition A), and then three minutes later, the gas composition was switched again to the rich air-fuel ratio (gas composition B). For 130 seconds from this point of switching, the HC purification ratio was measured. The temperature of the catalyst and the temperature of the simulated exhaust gas were 350° C. The space velocity SV was 25000 $h^{-1}$.

Figure 41:
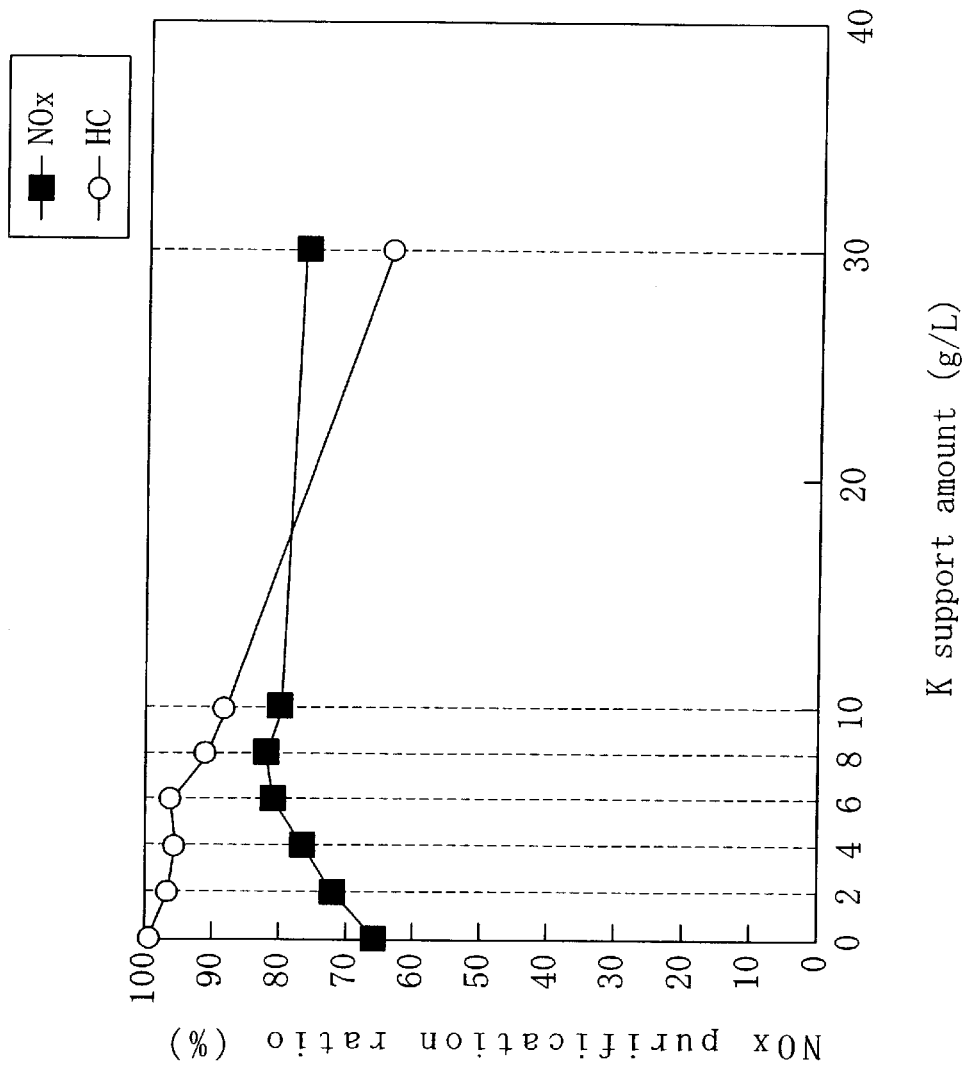
FIG. 41 is a graph showing the relationship between the K support amount and the purifying ratio of $NO_x$ and HC.

FIG. 41 shows the results. According to FIG. 41, when the K support amount is 2 g/L or more, the $NO_x$ purification ratio exceeds 70%, and until 10 g/L, the $NO_x$ purification ratio is gradually increased. However, when the K support amount is more than 10 g/L, the $NO_x$ purification ratio is not further improved.

Furthermore, there is a tendency that the larger the K support amount is, the lower the HC purification ratio is. In particular, until the K support amount is 6 g/L, the HC purification is kept at least 95%. However, at more than 6 g/L, the HC purification is dropped drastically to the 80% range. This seems to be because more K is disposed around the precious metals in a K support amount of more than 6 g/L, so that HC is inhibited from coming close to the precious metals.

Therefore, in order to balance between the $NO_x$ purification properties at lean ratios and the HC-form-chemical conversion at stoichiometric or rich ratios, it is preferable that the K support amount is 2 to 6 g/L. The results of this measurement are from the examples that contain no Sr or Mg as the $NO_x$ storage materials. However, it seems that regarding the K support amount, the same can be true for the examples that contain Sr and Mg. [Support Amount of Ba]

The effect of the Ba support amount on the performance of the catalyst was examined.

Catalysts were prepared by the same method and under the same conditions as in Example 1' described above, except that aqueous solutions of dinitrodiamine platinum nitrate, barium acetate, and potassium acetate were weighed and mixed so that the Pt support amount was 6.0 g/L, the K support amount was 6 g/L, the Ba support amount was 5 g/L, 10 g/L, 15 g/L, 20 g/L, 30 g/L, 40 g/L and 50 g/L to prepare mixed solutions, and these mixed solutions were used for impregnation.

The $NO_x$ purification ratios of the catalysts were measured under the same conditions in the same method. More specifically, the catalysts were heated in an ambient atmosphere at 900° C. for 24 hours. Thereafter, each catalyst was attached to a fixed floor flow-through reaction evaluation apparatus, and the air-fuel ratio was switched from a lean air-fuel ratio (gas composition A), to a rich air-fuel ratio (gas composition B) and to the lean air-fuel ratio (gas composition A), and for 130 seconds from this point of switching, the $NO_x$ purification ratio (lean $NO_x$ purification ratio) was measured. The temperature of the catalyst and the temperature of the simulated exhaust gas were 350° C. The space velocity SV was 25000 $h^{-1}$.

Figure 42:
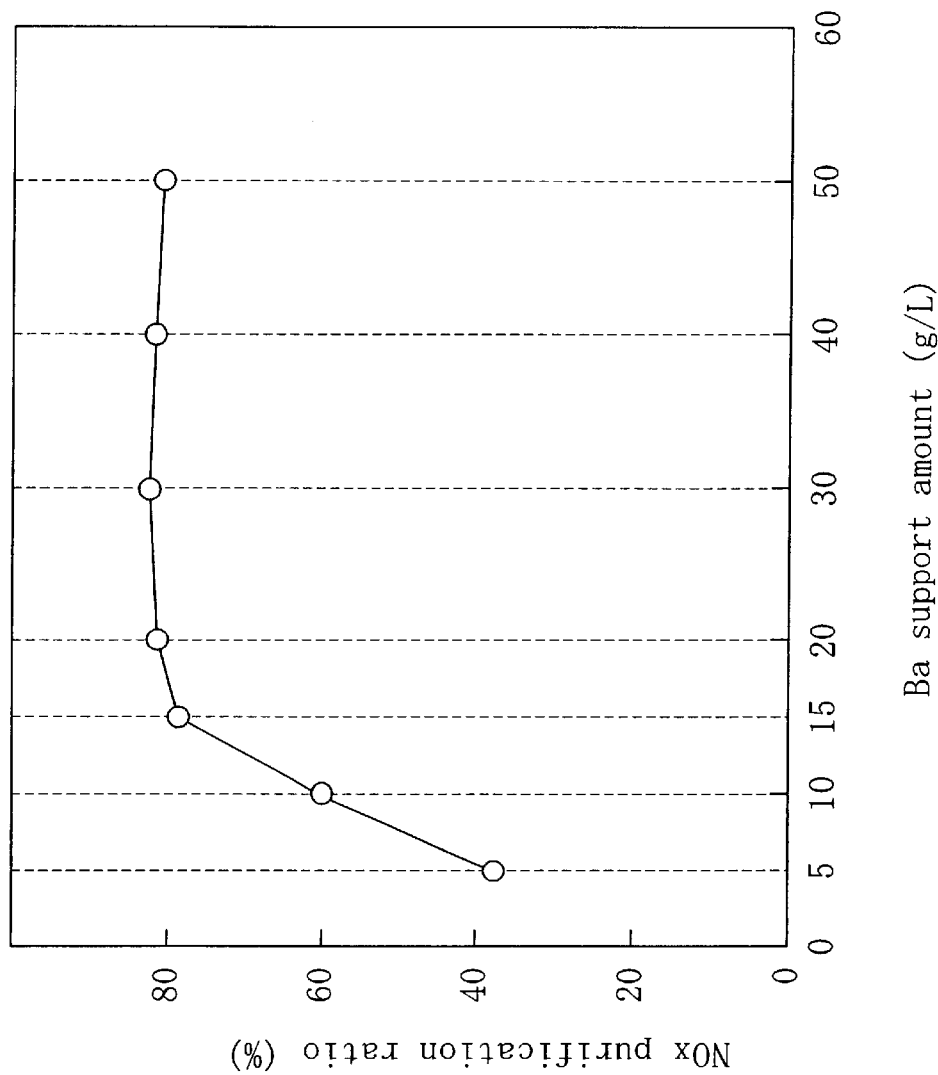
FIG. 42 is a graph showing the relationship between the Ba support amount and the purifying ratio of $NO_x$.

FIG. 42 shows the results. According to FIG. 42, as the Ba support amount is larger, the $NO_x$ purification ratio is improved significantly, when the Ba support amount is from 5 g/L to 15 g/L. When the Ba support amount is from 15 g/L to 30 g/L, the degree of improvement of the $NO_x$ purification ratio becomes smaller. When the Ba support amount is 30 g/L, the $NO_x$ purification ratio is at the peak. After that, even if the Ba support amount is increased, the $NO_x$ purification ratio about equal to that in a Ba support amount of 30 g/L only can be achieved. Therefore, it cannot be expected that the $NO_x$ purification ratio is improved even if the Ba support amount is increased to more than 30 g/L. It is preferable that the mass ratio of the Ba support amount to the K support amount is about 5 to 15. [Effect of Support Amount of Pt]

Aqueous solutions of dinitrodiamine platinum nitrate, rhodium nitrate, barium acetate, potassium acetate, strontium acetate, and magnesium acetate were weighed and mixed so that the Pt support amount was 6.5 g/L, the Rh support amount was 0.1 g/L, the Ba support amount was 30 g/L, the K support amount was 6 g/L, the Sr support amount was 10 g/L, and the Mg support amount was 10 g/L to prepare a mixed solution for impregnation.

γ-alumina, a Ce—Zr—Sr mixed oxide ($CeO_2 \cdot ZrO_2 \cdot SrO$ mixed oxide, the mass ratio of the three elements of Ce:Zr:Sr=75:25:1)and an alumina binder were weighed and mixed so that the support amount of γ-alumina was 160 g/L and the support amount of the Ce—Zr—Sr mixed oxide was 160 g/L, and the support amount of the binder was 30 g/L. Then, ion exchanged water was added thereto to prepare slurry.

A honeycomb carrier was wash-coated with a half amount of the slurry, and dried and calcined to form an inner coating layer. Then, the inner coating layer was wash-coated with the other half of the amount of the slurry, and dried and calcined to form an outer coating layer. Thereafter, the inner coating layer and the outer coating layer were impregnated with the above obtained solution, and dried and calcined so that a catalyst having a Pt support amount of 6.5 g was obtained.

Another catalyst was prepared by the same method and under the same conditions as in the catalyst having a Pt support amount of 6.5 g/L, except that the Pt support amount was 3.5 g/L.

Figure 43:
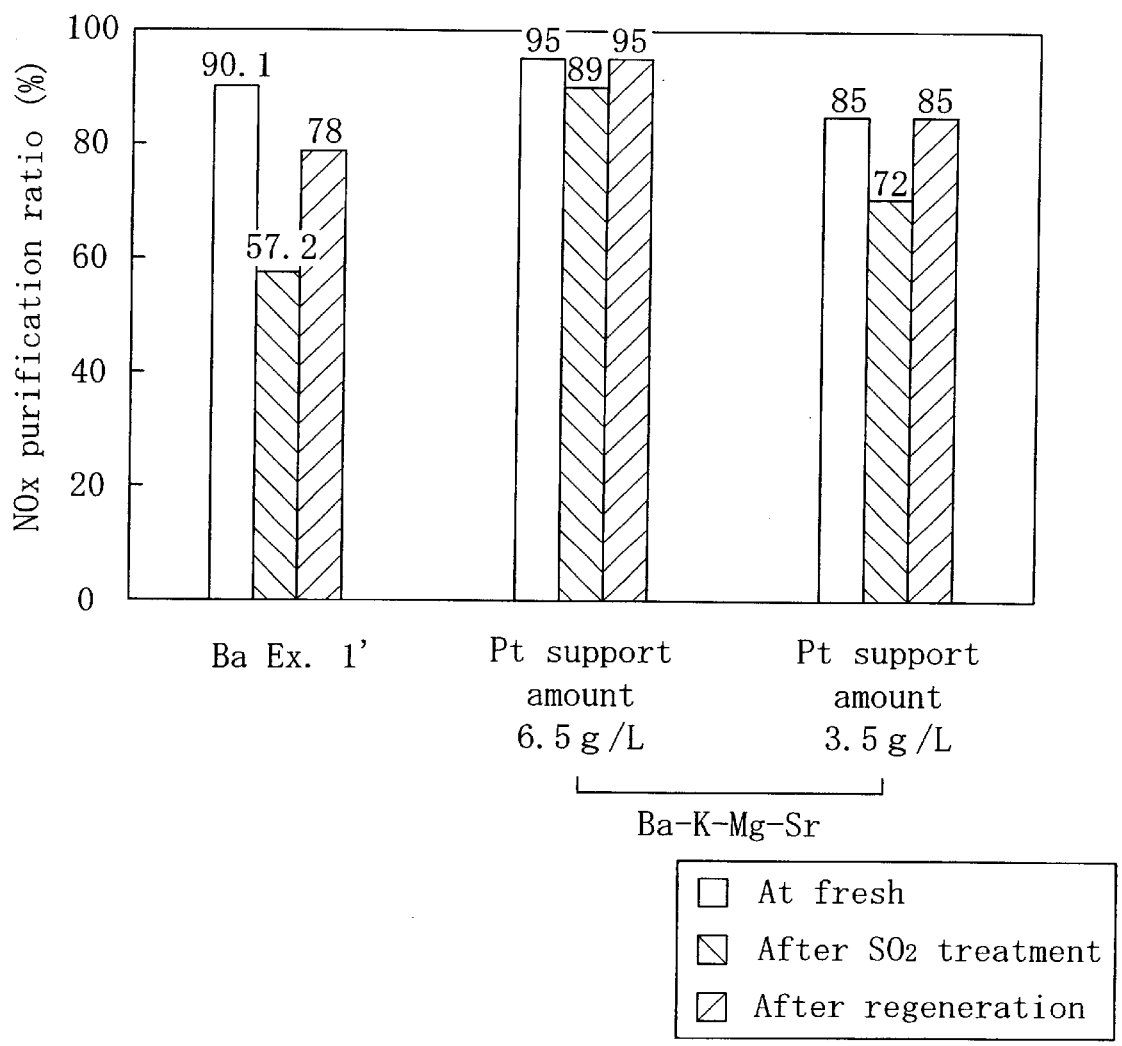
FIG. 43 is a graph showing the effects of the Pt support amount on the sulfur poisoning resistance and the regeneration properties from the sulfur poisoning of the catalyst.

The $NO_x$ purification ratios of the catalysts having Pt support amounts of 3.5 g/L and 6.5 g/L when the catalysts were fresh, after $SO_2$ treatment, and after regeneration treatment were measured in the same manner as the $NO_x$ purification ratios described above. In this case, the temperature at which the $NO_x$ purification ratios were measured (the gas temperature at the inlet of the catalyst) was 350° C. The space velocity was 55000 h$^{-1}$. FIG. 43 shows the results together with the results of Example 1'.

According to FIG. 43, for the catalyst having a Pt support amount of 6.5 g/L, the $NO_x$ purification ratio when the catalyst is fresh is high, and the $NO_x$ purification ratio after the $SO_2$ treatment and after the regeneration treatment are higher than those of Examples 1' to 11' (see FIG. 26). In particular, it is characteristic that the $NO_x$ purification ratio after regeneration treatment is equal to that when the catalyst is fresh.

On the other hand, for the catalyst having a Pt support amount of 3.5 g/L, the $NO_x$ purification ratio after regeneration treatment is equal to that when the catalyst is fresh, but the $NO_x$ purification ratios when the catalyst is fresh, after $SO_2$ treatment and after regeneration treatment are lower than those of the catalyst having a Pt support amount of 6.5 g/L. This seems to be because the amount of Pt present close to Ba is small because of the small support amount of Pt, and therefore even if $NO_x$ comes close to Ba, absorption and reduction of $NO_x$ by an interaction between Ba and Pt cannot be achieved sufficiently.

Figure 44:
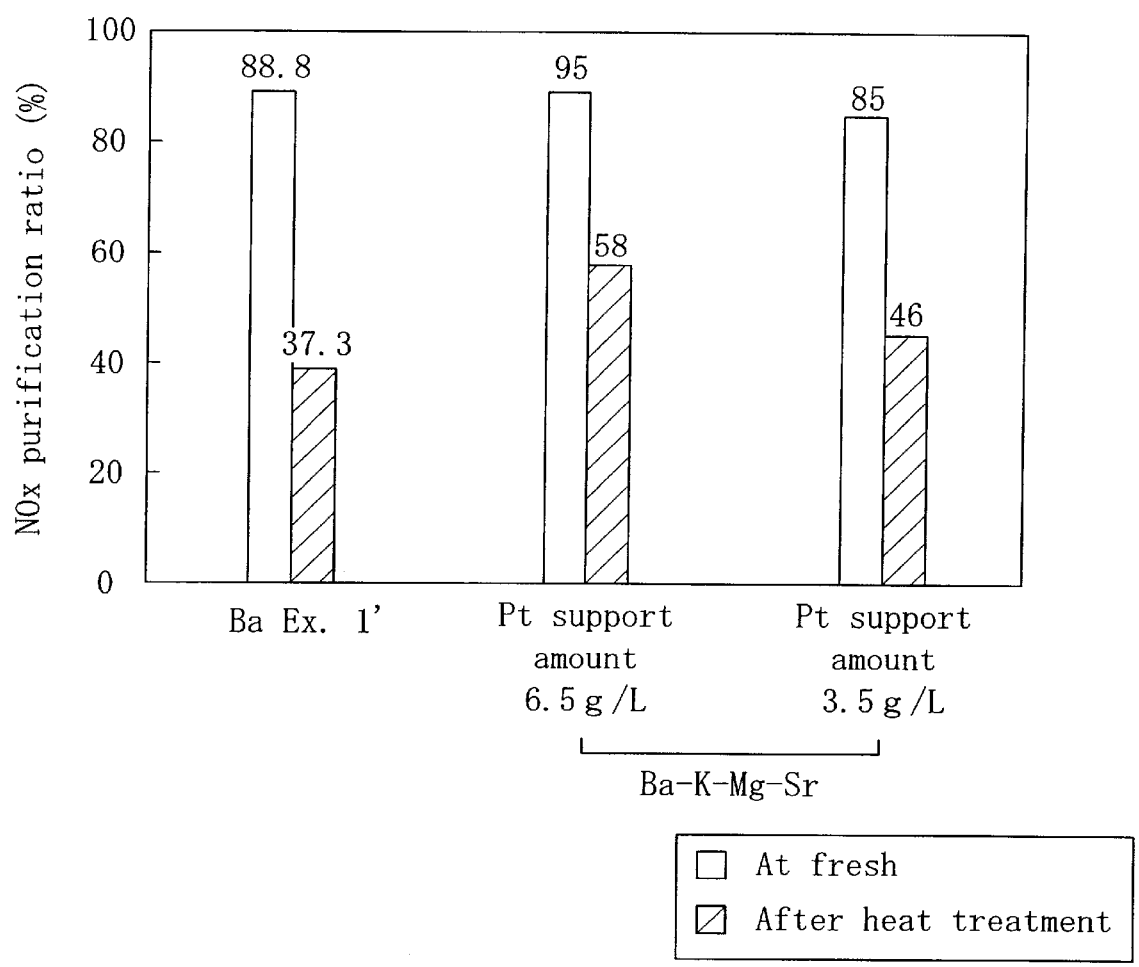
FIG. 44 is a graph showing the effects of the Pt support amount on the heat resistance of the catalyst (the $NO_x$ purifying ratio at a measurement temperature of 350° C.).
Figure 45:
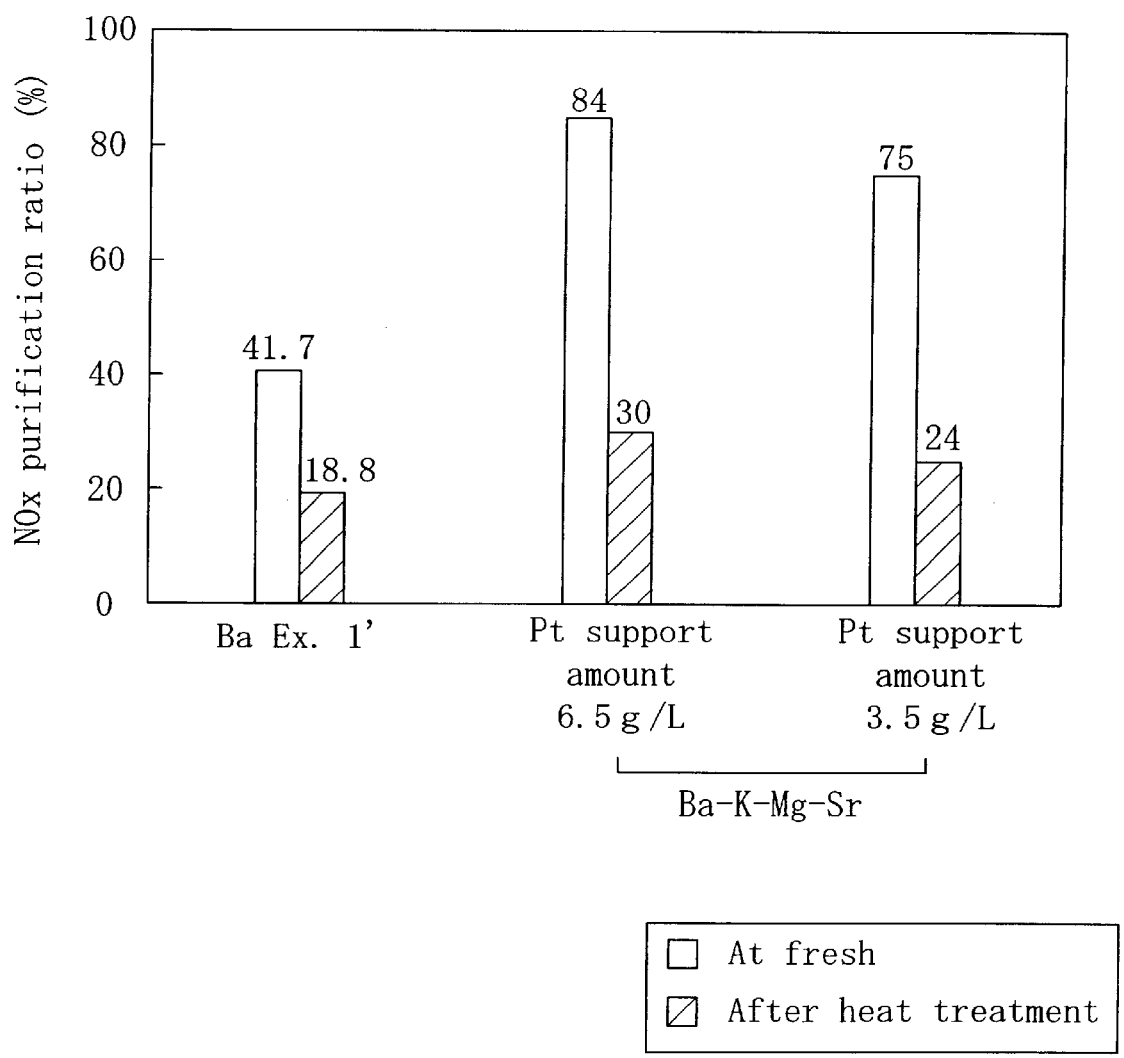
FIG. 45 is a graph showing the effects of the Pt support amount on the heat resistance of the catalyst (the $NO_x$ purifying ratio at a measurement temperature of 450° C.).

Nest, the $NO_x$ purification ratios of the catalysts having Pt support amounts of 3.5 g/L and 6.5 g/L when the catalysts were fresh and after heat deterioration treatment were measured in the same manner as the $NO_x$ purification ratios described above. In this case, the temperature at which the $NO_x$ purification ratios were measured (the gas temperature at the inlet of the catalyst) was two kinds of 350° C. and 450° C. The space velocity was 55000 h$^{-1}$. FIG. 44 shows the results at 350° C. together with the results of Example 1'. FIG. 45 shows the results at 450° C. together with the results of Example 1'.

According to FIGS. 44 and 45, for the catalyst having a Pt support amount of 6.5 g/L, the $NO_x$ purification ratio after heat deterioration treatment is higher than those of Examples 1' to 11' (see FIGS. 27 and 28). For the catalyst having a Pt support amount of 3.5 g/L as well, it can be said that the heat resistance is higher, in view of that fact that the Pt support amount is smaller than that (about 6 g/L) of Examples 1' to 11'.

[Order of Impregnation of Precious Metal and $NO_x$ Storage Material]

The effect of the order of impregnation of the precious metal and the $NO_x$ storage material on the performance of the catalyst was examined.

As mixed solutions for impregnation, aqueous solutions of strontium acetate and magnesium acetate were weighed and mixed so that the Sr support amount was 10 g/L and the Mg support amount was 10 g/L to prepare a first solution for impregnation. Aqueous solutions of dinitrodiamine platinum nitrate, rhodium nitrate, barium acetate, and potassium acetate were weighed and mixed so that the Pt support amount was 6.5 g/L, the Rh support amount was 0.1 g/L, the Ba support amount was 30 g/L, and the K support amount was 6 g/L to prepare a second solution. On the other hand, inner and outer coating layers were formed of γ-alumina, a Ce—Zr—Sr mixed oxide and an alumina binder on a honeycomb carrier by the method and under the same conditions as above.

Then, the inner and the outer coating layers were impregnated with the first solution, and dried and calcined, followed by impregnation with the second solution, drying and calcining so that a catalyst was obtained. This catalyst is referred to as Mg and Sr earlier impregnation catalyst.

Furthermore, as mixed solutions for impregnation, aqueous solutions of barium acetate and magnesium acetate were weighed and mixed so that the Ba support amount was 30 g/L and the Mg support amount was 10 g/L to prepare a first solution for impregnation. Aqueous solutions of dinitrodiamine platinum nitrate, rhodium nitrate, strontium acetate, and potassium acetate were weighed and mixed so that the Pt support amount was 6.5 g/L, the Rh support amount was 0.1 g/L, the Sr support amount was 10 g/L, and the K support amount was 6 g/L to prepare a second solution. On the other hand, inner and outer coating layers were formed of γ-alumina, a Ce—Zr—Sr mixed oxide and an alumina binder on a honeycomb carrier by the method and under the same conditions as above.

Then, the inner and the outer coating layers were impregnated with the first solution, and dried and calcined, followed by impregnation with the second solution, drying and calcining so that a catalyst was obtained. This catalyst is referred to as Ba and Mg earlier impregnation catalyst.

Figure 46:
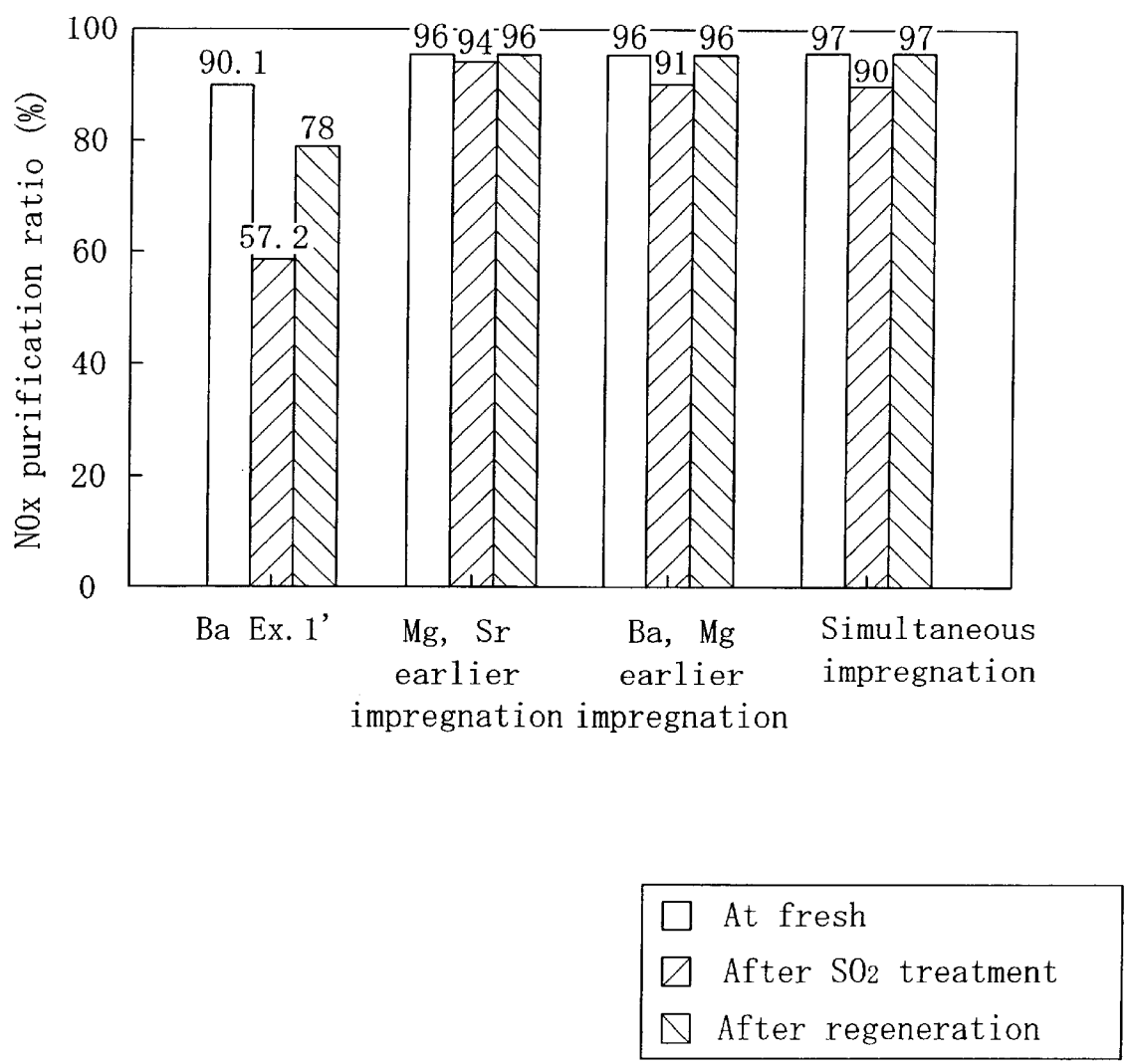
FIG. 46 is a graph showing the effects of the order of impregnation of the $NO_x$ storage material on the sulfur poisoning resistance and the regeneration properties from the sulfur poisoning of the catalyst.
Figure 47:
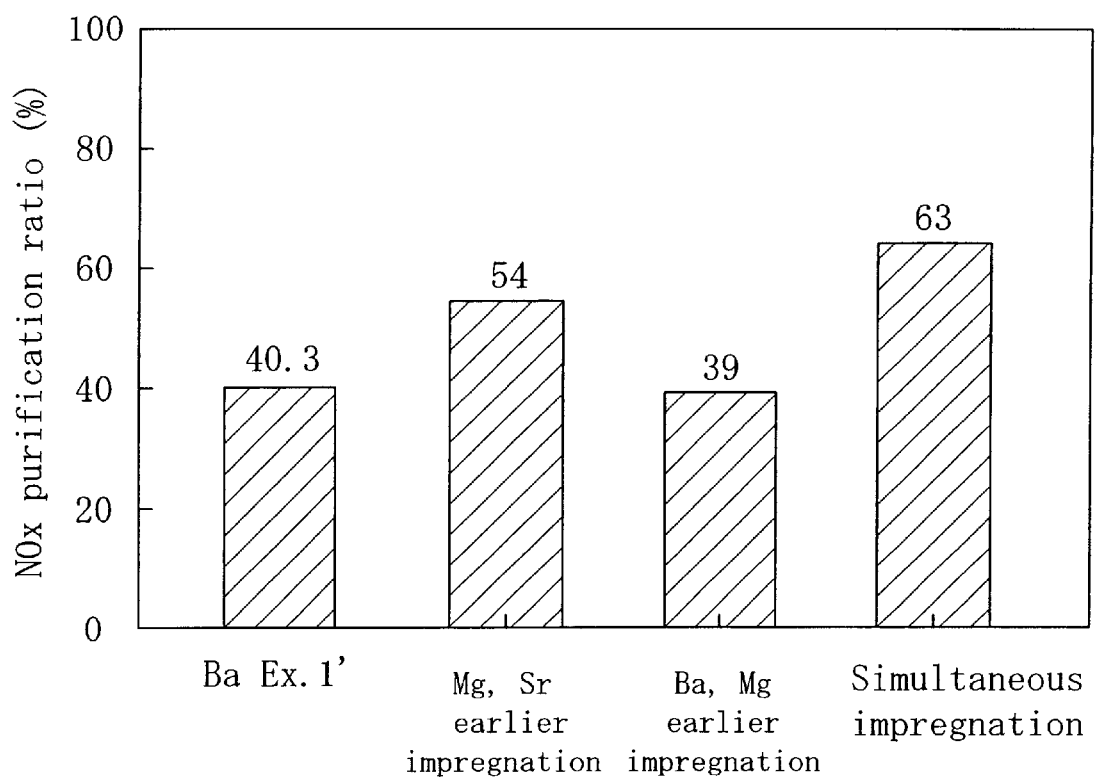
FIG. 47 is a graph showing the effects of the order of impregnation of the $NO_x$ storage material on the heat resistance of the catalyst.

The $NO_x$ purification ratios of the two kinds of catalysts having different orders of impregnation when the catalysts were fresh, after $SO_2$ treatment and after regeneration treatment, and after heat deterioration treatment were measured in the same manner as the $NO_x$ purification ratios described above. In this case, the temperature at which the $NO_x$ purification ratios were measured (the gas temperature at the inlet of the catalyst) was 350° C. The space velocity was 55000 h$^{-1}$. FIG. 46 shows the results of measurement of the $NO_x$ purification ratios when the catalysts were fresh, after $SO_2$ treatment and after regeneration treatment together with the results of Example 1' and a simultaneously impregnated catalyst. FIG. 47 shows the results of measurement of the $NO_x$ purification ratio after heat deterioration treatment together with the results of Example 1' and a simultaneously impregnated catalyst.

The simultaneously impregnated catalyst was a catalyst having a Pt support amount of 6.5 g/L (the catalyst indicated as "Pt support amount of 6.5 g/L" in FIGS. 31 to 33) obtained by simultaneously impregnating the inner and the outer coating layers comprising of γ-alumina, a Ce—Zr—S mixed oxide and an alumina binder with aqueous solutions of dinitrodiamine platinum nitrate, rhodium nitrate, barium acetate, potassium acetate, strontium acetate and magnesium acetate.

According to FIG. 46, the Mg and Sr earlier impregnation catalyst and the Ba and Mg earlier impregnation catalyst have slightly lower $NO_x$ purification ratios when the catalysts are fresh and after regeneration treatment than those of the simultaneously impregnated catalyst. However, the $NO_x$ purification ratios after $SO_2$ treatment thereof are higher. Furthermore, according to FIG. 47, the Mg and Sr earlier impregnation catalyst and the Ba and Mg earlier impregnation catalyst have slightly lower $NO_x$ purification ratio after heat deterioration treatment than that of the simultaneously impregnated catalyst. However, when the Mg and Sr earlier impregnation catalyst is compared with the Ba and Mg earlier impregnation catalyst, the former has a higher $NO_x$ purification ratio.

Therefore, when the inner and the outer coating layers should be impregnated with a large amount of solution, the solution can be divided into two for impregnation. In this case, it is preferable that the Sr solution is contained in the earlier impregnation solution, and the K solution is contained in the later impregnation solution.

The present invention can be applied not only to exhaust gases from automobile engines (lean burn engine or diesel engine), but also to industrial fixed engines. In this case, desired effects can be obtained by constituting the above-described embodiments. In this case, industrial engines refer to those utilized for air conditioning, for example, in buildings by heat exchange of heat of exhaust gases. In this case, when a heat exchanger is provided in the upstream of the catalyst, and when raising the temperature of the catalyst as in the above embodiments, the heat exchange efficiency is reduced by reducing the amount of water for heat exchange so that inhibition of raising the temperature can be prevented.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of purifying an exhaust gas, comprising the steps of:
   providing a lean $NO_x$ catalyst with a carrier; an inner catalytic layer which is disposed on the carrier and contains a mixed oxide of Ce, Zr and Sr and alumina, and on which Ba, K, Sr and Mg are supported as $NO_x$ storage materials, and Pt is supported as a catalytic metal; and an outer catalytic layer which is disposed on the inner catalytic layer and contains zeolite which supports Pt and Rh as catalytic metals, and on which Ba, K, Sr and Mr are supported as $NO_x$ storage materials, and Pt is supported as a catalytic metal;
   disposing the lean $NO_x$ catalyst at a portion of a passage of exhaust gas where a temperature of the catalyst becomes 900° C. or higher; and
   allowing an exhaust gas flowing through the passage of exhaust gas to be in contact with the lean $NO_x$ catalyst.

2. The method for purifying an exhaust gas of claim 1, further comprising the step of controlling a fuel injection valve for injecting fuel into a combustion chamber of an engine so that an air-fuel ratio becomes a theoretical air-fuel ratio for a predetermined period when, at estimation of an amount of absorbed $NO_x$ in the catalyst, the amount of the absorbed $NO_x$ becomes a predetermined value or larger.

3. The method for purifying an exhaust gas of claim 1, further comprising the step of:
   controlling a fuel injection valve for injecting fuel into a combustion chamber of an engine so that an air-fuel ratio becomes a theoretical air-fuel ratio for a predetermined period and the fuel injection into the combustion chamber of the engine is divided into an intake stroke and a compression stroke of the engine when, at estimation of an amount of absorbed $SO_x$ in the catalyst, the amount of the absorbed $SO_x$ becomes a predetermined value or larger and a temperature of the exhaust gas is a predetermined temperature or higher.

4. A lean $NO_x$ catalyst provided at a passage of exhaust gas of an engine driven at a lean air-fuel ratio, comprising:
   a carrier;
   an inner catalytic layer which is disposed on the carrier and contains a mixed oxide of Ce, Zr and Sr and alumina, and on which Ba, K, Sr and Mg are supported as $NO_x$ storage materials, and Pt is supported as a catalytic metal; and
   an outer catalytic layer which is disposed on the inner catalytic layer and contains zeolite which supports Pt and Rh as catalytic metals, and on which Ba, K, Sr and Mr are supported as $NO_x$ storage materials, and Pt is supported as a catalytic metal;
   wherein HC stored in the zeolite of the outer catalytic layer at a low catalytic temperature is discharged in association with rise in temperature of the catalytic, whereby the discharged HC is reacted with NO in an exhaust gas to purify NOR;
   $NO_2$ generated by oxidation of NO in an exhaust gas at the outer catalytic layer is stored at a lean air-fuel ratio into the $NO_x$ storage materials of the inner catalytic layer,
   the $NO_2$ stored in the $NO_2$ storage materials is discharged at a rich air-fuel ratio, and
   the discharged $NO_x$ is reacted with HC activated on the catalytic metals of the inner catalytic layer and the outer catalytic layer to be decomposed and purified.

5. A lean $NO_x$ catalyst of claim 4, wherein a mixed oxide contains Sr in an amount of 0.5 to 2.0 mass percent in terms of SrO.

6. The lean $NO_x$ catalyst of claim 4, wherein the mixed oxide contains Sr in an amount of I mass percent in terms of SrO.

7. The lean $NO_x$ catalyst of claim 4, wherein a K support amount per L of the carrier is in a range between 2 and 6 g, and a ratio of a Ba support amount to a K support amount per L of the carrier is Ba:K=(5 to 15):1.

* * * * *

UNITED STATES PATENT AND TRADEMARK OFFICE
CERTIFICATE OF CORRECTION

PATENT NO.    : 6,620,392 B2
DATED         : September 16, 2003
INVENTOR(S)   : Kenji Okamoto et al.

It is certified that error appears in the above-identified patent and that said Letters Patent is hereby corrected as shown below:

<u>Title page,</u>
Item [56], References Cited, FOREIGN PATENT DOCUMENTS, delete "06-315634" as it is listed twice.

<u>Column 48,</u>
Line 41, change "catalytic metal;" to -- catalytic metal, --;
Line 46, change "NOR" to -- $NO_x$ --;
Line 60, change "amount of I mass" to -- amount of 1 mass --.

Signed and Sealed this

Twenty-fourth Day of February, 2004

JON W. DUDAS
*Acting Director of the United States Patent and Trademark Office*